US010670039B2

(12) United States Patent
Takamura et al.

(10) Patent No.: US 10,670,039 B2
(45) Date of Patent: Jun. 2, 2020

(54) COMPRESSOR ROTOR, COMPRESSOR, AND GAS TURBINE

(71) Applicant: MITSUBISHI HITACHI POWER SYSTEMS, LTD., Yokohama-shi, Kanagawa (JP)

(72) Inventors: Keita Takamura, Yokohama (JP); Masanori Yuri, Yokohama (JP); Shinya Hashimoto, Yokohama (JP); Junichiro Masada, Yokohama (JP); Yuji Komagome, Yokohama (JP); Masato Araki, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 205 days.

(21) Appl. No.: 15/567,788

(22) PCT Filed: Apr. 18, 2016

(86) PCT No.: PCT/JP2016/062236
§ 371 (c)(1),
(2) Date: Oct. 19, 2017

(87) PCT Pub. No.: WO2016/175072
PCT Pub. Date: Nov. 3, 2016

(65) Prior Publication Data
US 2018/0051710 A1    Feb. 22, 2018

(30) Foreign Application Priority Data
Apr. 27, 2015    (JP) .................................. 2015-090289

(51) Int. Cl.
*F04D 29/32*    (2006.01)
*F02C 7/18*     (2006.01)
(Continued)

(52) U.S. Cl.
CPC .............. *F04D 29/324* (2013.01); *F02C 7/18* (2013.01); *F04D 29/321* (2013.01);
(Continued)

(58) Field of Classification Search
CPC .... F04D 29/324; F04D 29/584; F04D 29/321; F04D 29/582; F04D 19/02; F02C 7/18; F02C 3/04; F05D 2240/35; F05D 2220/32
(Continued)

(56) References Cited

U.S. PATENT DOCUMENTS

| | | | |
|---|---|---|---|
| 6,053,701 | A | 4/2000 | Ichiryu et al. |
| 6,361,277 | B1 | 3/2002 | Bulman et al. |

(Continued)

FOREIGN PATENT DOCUMENTS

| | | |
|---|---|---|
| JP | 22-000208 | 3/1947 |
| JP | 58-047199 | 3/1983 |

(Continued)

OTHER PUBLICATIONS

International Search Report dated Jul. 12, 2016 in International Application No. PCT/JP2016/062236, with English translation.
(Continued)

*Primary Examiner* — J. Todd Newton
(74) *Attorney, Agent, or Firm* — Wenderoth, Lind & Ponack, L.L.P.

(57) ABSTRACT

A rotor shaft has: an inlet flow passage through which gas inside a gas compression flow passage flows into an outer cavity of a downstream-side cavity group; a radial flow passage that provides communication between the outer cavity and an axial communication cavity of the downstream-side cavity group; an axial flow passage that provides communication between the axial communication cavity of the downstream-side cavity group and the axial communication cavity of an upstream-side cavity group; another
(Continued)

radial flow passage that provides communication between the axial communication cavity and the outer cavity of the upstream-side cavity group; and an outlet flow passage through which the gas inside the outer cavity of the upstream-side cavity group flows out into the gas compression flow passage.

13 Claims, 25 Drawing Sheets

(51) Int. Cl.
   *F04D 29/58* (2006.01)
   *F02C 3/04* (2006.01)
   *F04D 19/02* (2006.01)

(52) U.S. Cl.
   CPC ......... *F04D 29/582* (2013.01); *F04D 29/584* (2013.01); *F02C 3/04* (2013.01); *F04D 19/02* (2013.01); *F05D 2220/32* (2013.01); *F05D 2240/35* (2013.01)

(58) Field of Classification Search
   USPC ........................................................ 415/115
   See application file for complete search history.

(56) References Cited

U.S. PATENT DOCUMENTS

| | | |
|---|---|---|
| 6,435,831 B1 | 8/2002 | Ichiryu |
| 2012/0183398 A1 | 7/2012 | Are et al. |
| 2013/0259685 A1 | 10/2013 | Are et al. |

FOREIGN PATENT DOCUMENTS

| | | | |
|---|---|---|---|
| JP | 62-029701 | | 2/1987 |
| JP | 10-205302 | | 8/1998 |
| JP | 11-311128 | | 11/1999 |
| JP | 2001-003702 | | 1/2001 |
| JP | 2001-214891 | | 8/2001 |
| JP | 2004-060544 | | 2/2004 |
| JP | 2004060544 A | * | 2/2004 |
| JP | 2012-145109 | | 8/2012 |
| JP | 2013-204593 | | 10/2013 |

OTHER PUBLICATIONS

Written Opinion of the International Searching Authority dated Jul. 12, 2016 in International Application No. PCT/JP2016/062236, with English translation.

* cited by examiner

COMPRESSOR ROTOR, COMPRESSOR, AND GAS TURBINE

CROSS-REFERENCE TO RELATED APPLICATION

The present application claims priority based on Japanese Patent Application No. 2015-090289 filed on Apr. 27, 2015, the contents of which are incorporated herein by reference.

TECHNICAL FIELD

The present invention relates to a compressor rotor that rotates along an axis inside a compressor casing, a compressor, and a gas turbine.

BACKGROUND ART

A compressor includes a casing and a rotor that rotates around an axis inside the casing. A rotor of an axial-flow compressor has a rotor shaft that extends around an axis in an axial direction, and a plurality of blade rows that are fixed to an outer circumference of the rotor shaft and arrayed in the axial direction.

Examples of such a rotor of an axial-flow compressor include the one disclosed in Japanese Patent Publication No. 2013-204593. In this rotor, a plurality of chambers (or cavities) are formed for the purpose of rotor weight reduction etc. Of the plurality of chambers, a first chamber and a second chamber are located side by side in the axial direction at the same position in the radial direction. The second chamber is located on the upstream side in the axial direction relative to the first chamber. Of the plurality of chambers, a third chamber is formed at a position between the first chamber and the second chamber in the axial direction, on the radially inner side of the first chamber and the second chamber. Both the first chamber and the second chamber communicate with an air compression flow passage that is formed by an annular space between the outer circumferential side of the rotor shaft and the inner circumferential side of the casing. The third chamber communicates with both the first chamber and the second chamber.

Part of air inside the air compression flow passage flows into the first chamber that is located on the downstream side of the second chamber. This air flows from the first chamber into the third chamber, and then returns into the air compression flow passage through the second chamber.

CITATION LIST

Patent Literature

Patent Literature 1: Japanese Patent Laid-Open No. 2013-204593

SUMMARY OF INVENTION

Technical Problem

The technique disclosed in Japanese Patent Publication No. 2013-204593 enhances the thermal responsiveness of the rotor shaft to changes in temperature of air flowing through the air compression flow passage by passing part of the air inside the air compression flow passage through the chambers and returning this air into the air compression flow passage.

SUMMARY OF INVENTION

An object of the present invention is to provide a compressor rotor that can further enhance the thermal responsiveness of the rotor shaft to changes in temperature of gas flowing through the gas compression flow passage, a compressor including this compressor rotor, and a gas turbine including this compressor.

Solution to Problem

A compressor rotor as a first aspect according to the present invention to achieve the above object is a compressor rotor that rotates around an axis inside a compressor casing, and includes a rotor shaft that extends around the axis in an axial direction, and a plurality of blade rows that are fixed to an outer circumference of the rotor shaft and arrayed in the axial direction. A cavity group composed of a plurality of cavities that each have an annular shape around the axis and are separated from one another in a radial direction of the axis is formed inside the rotor shaft at each position between adjacent ones of the plurality of blade rows in the axial direction. A side on which a pressure of gas flowing through a gas compression flow passage is low constitutes an upstream side in the axial direction, and a side which is the opposite side from the upstream side and on which the pressure of the gas is high constitutes a downstream side in the axial direction, the gas compression flow passage being located on an outer circumferential side of the rotor shaft and being where the plurality of blade rows are present in the axial direction. Of the plurality of cavities composing the cavity group, a cavity located farthest on a radially outer side constitutes an outer cavity, and another cavity located on a radially inner side of the outer cavity constitutes an axial communication cavity. Of at least two cavity groups, one or more cavity groups located on the upstream side constitute upstream-side cavity groups, and the other cavity groups located on the downstream side relative to the upstream-side cavity groups constitute downstream-side cavity groups. The rotor shaft further has: an inlet flow passage through which the gas inside the gas compression flow passage flows into the outer cavity of the downstream-side cavity group; a radial flow passage that extends in a direction including the radial direction, and provides communication between two cavities adjacent to each other in the radial direction among the plurality of cavities from the outer cavity to the axial communication cavity of the downstream-side cavity group, so that the gas having flowed into the outer cavity of the downstream-side cavity group reaches the axial communication cavity of the downstream-side cavity group; an axial flow passage that extends in a direction including the axial direction, and provides communication between the axial communication cavity of the downstream-side cavity group and the axial communication cavity of the upstream-side cavity group; a radial flow passage that extends in a direction including the radial direction, and provides communication between two cavities adjacent to each other in the radial direction among the plurality of cavities from the axial communication cavity to the outer cavity of the upstream-side cavity group, so that the gas inside the axial communication cavity of the upstream-side cavity group reaches the outer cavity of the upstream-side cavity group; and an outlet flow passage through which the gas inside the outer cavity of the upstream-side cavity group flows out into the gas compression flow passage. A radially outer-side edge of an inlet opening that is an opening of the axial flow passage to the axial communication cavity of the downstream-side cavity group is located on the radially inner side of a radially outer-side inner circumferential surface of inner circumferential surfaces defining the annular axial communication cavity. A radially outer-side edge of an outlet opening that is an opening of the axial flow passage to the axial communication cavity of the upstream-side cavity group is located on the radially inner side of a radially outer-side inner circumferential surface of inner circumferential surfaces defining the annular axial communication cavity.

In this compressor rotor, a pressure difference in the axial direction inside the gas compression flow passage is used as a driving force to allow part of the gas inside the gas compression flow passage to flow into the outer cavity of the downstream-side cavity group through the inlet flow passage. The gas having flowed into the outer cavity flows into the axial communication cavity of the downstream-side cavity group through the radial flow passage, and in some cases, further through one or more cavities. The gas having flowed into the axial communication cavity of the downstream-side cavity group flows into the axial communication cavity of the upstream-side cavity group through the axial flow passage. The gas having flowed into the axial communication cavity of the upstream-side cavity group flows into the outer cavity of the upstream-side cavity group through the radial flow passage, and in some cases, further through one or more cavities. The gas having flowed into the outer cavity of the upstream-side cavity group returns to the gas compression flow passage through the outlet flow passage.

Thus, in this compressor rotor, the pressure difference in the axial direction inside the air compression flow passage can be used as a driving force to efficiently ventilate the inside each of the outer cavity of the downstream-side cavity group, the cavity between the outer cavity and the axial communication cavity of the downstream-side cavity group, the outer cavity of the upstream-side cavity group, and the cavity between the outer cavity and the axial communication cavity of the upstream-side cavity group, with part of the gas inside the gas compression flow passage. Moreover, in this compressor rotor, the part of the axial communication cavity of the downstream-side cavity group from the radially outer-side edge to a position in the radial direction at which the axial flow passage is open, and the part of the axial communication cavity of the upstream-side cavity group from the radially outer-side edge to a position in the radial direction at which the axial flow passage is open can also be efficiently ventilated with the gas inside the gas compression flow passage. Furthermore, in this compressor rotor, the heat transfer coefficient of wall surfaces defining the cavities can be increased using a difference in circumferential velocity between the cavities and the air flowing through the cavities.

Thus, in this compressor rotor, the thermal responsiveness of the compressor rotor to changes in temperature of the gas flowing through the gas compression flow passage can be enhanced.

A compressor rotor as a second aspect according to the present invention to achieve the above object is the compressor rotor of the first aspect, wherein the radially outer-side edge of the inlet opening of the axial flow passage is located on the radially inner side of a center position in the radial direction of the axial communication cavity of the downstream-side cavity group, and the radially outer-side edge of the outlet opening of the axial flow passage is located on the radially inner side of a center position in the radial direction of the axial communication cavity of the upstream-side cavity group.

In this compressor rotor, the inside of the axial communication cavity of the downstream-side cavity group and the inside of the axial communication cavity of the upstream-side cavity group can be ventilated extensively and efficiently with the gas inside the gas compression flow passage. Moreover, in this compressor rotor, the heat transfer coefficient of the wall surfaces defining the cavities can be increased using the difference in circumferential velocity between the cavities and the air flowing through the cavities. Thus, in this compressor rotor, the thermal responsiveness of the compressor rotor to changes in temperature of the gas flowing through the gas compression flow passage can be further enhanced.

A compressor rotor as a third aspect according to the present invention to achieve the above object is the compressor rotor of the first or second aspect, wherein the rotor shaft has a plurality of the axial flow passages that are separated from one another in a circumferential direction of the axis.

In this compressor rotor, the circumferential velocity of the gas flowing through the axial flow passage is restricted by the circumferential velocity of the rotor shaft, and thus becomes substantially equal to the circumferential velocity of the rotor shaft. On the other hand, as the axial communication cavities communicating with the axial flow passage are formed annularly around the axis, the circumferential velocity of the gas flowing through these axial communication cavities is basically not restricted by the circumferential velocity of the rotor shaft. Accordingly, the circumferential velocity of the gas flowing through the axial communication cavities differs from the circumferential velocity of the rotor shaft. In particular, the difference in circumferential velocity from the rotor shaft is larger on the radially outer side than on the radially inner side inside the axial communication cavity of the upstream-side cavity group. Accordingly, the heat transfer coefficient between the air and a surface of a constituent member of the rotor shaft defining the cavity can be increased.

Thus, in this compressor rotor, the thermal responsiveness of the compressor rotor to changes in temperature of the gas flowing through the gas compression flow passage can be further enhanced.

A compressor rotor as a fourth aspect according to the present invention to achieve the above object is the compressor rotor of any one of the first to third aspects, including at least one of the following inlet-side parts: an inlet-side part of the radial flow passage of the upstream-side cavity group including an inlet opening that is a radially inner-side opening and is inclined toward a rotation direction side of the rotor shaft; and an inlet-side part of the axial flow passage including an inlet opening that is inclined toward the opposite side from the rotation direction side of the rotor shaft.

In one of the above compressor rotors, at least one of the following inlet-side parts may be inclined toward the rotation direction side of the rotor shaft: an inlet-side part of the radial flow passage that provides communication between the outer cavity of the downstream-side cavity group and the cavity adjacent to the outer cavity in the radial direction, the inlet-side part including an inlet opening that is a radially outer-side opening of the radial flow passage; and an inlet-side part of the radial flow passage of the upstream-side cavity group including an inlet opening that is a radially inner-side opening of the radial flow passage.

In one of the above compressor rotors, the inlet-side part of the axial flow passage including the inlet opening of the axial flow passage may be inclined toward the opposite side from the rotation direction side of the rotor shaft.

A compressor rotor as a fifth aspect according to the present invention to achieve the above object is the compressor rotor of any one of the first to fourth aspects, wherein the downstream-side cavity group has three or more cavities, and, in the radial flow passage that provides communication between two or more cavities of the three or more cavities except for the outer cavity, an inlet-side part of the radial flow passage including an inlet opening that is a radially outer-side opening is inclined toward the opposite side from the rotation direction side of the rotor shaft.

In this compressor rotor, even when there is a difference in circumferential velocity between the gas and the flow passage, this gas is faced and received by the inlet opening of the flow passage, so that the gas can flow smoothly into the flow passage.

A compressor rotor as a sixth aspect according to the present invention to achieve the above object is the compressor rotor of any one of the first to fifth aspects, wherein at least one of the following outlet-side parts may be inclined toward the rotation direction side of the rotor shaft or toward the opposite side from the rotation direction side of the rotor shaft: an outlet-side part of the radial flow passage of the downstream-side cavity group including an outlet opening that is a radially inner-side opening of the radial flow passage; an outlet-side part of the radial flow passage of the upstream-side cavity group including an outlet opening that is a radially outer-side opening of the radial flow passage; and an outlet-side part of the axial flow passage including the outlet opening of the axial flow passage.

A compressor rotor as a seventh aspect according to the present invention to achieve the above object is the compressor rotor of any one of the first to sixth aspects, wherein a flow passage inside diameter of an inlet-side part of a flow passage including the inlet opening decreases gradually in a direction from the inlet opening toward an outlet opening located on the opposite side of the flow passage from the inlet opening.

A compressor rotor as an eighth aspect according to the present invention to achieve the above object is the compressor rotor of any one of the first to seventh aspects, wherein the rotor shaft has a plurality of rotor discs stacked in the axial direction, and a torque pin that extends in the radial direction and engages with each of two rotor discs adjacent to each other in the axial direction to restrain the adjacent rotor discs from rotating relative to each other; the torque pin is disposed at positions between the cavities adjacent to each other in the radial direction among the plurality of cavities composing the downstream-side cavity group, and at positions between the cavities adjacent to each other in the radial direction among the plurality of cavities composing the upstream-side cavity group; and the torque pin has a through-hole that extends through the torque pin in the radial direction, and the through-hole forms the radial flow passage.

In this compressor rotor, forming the through-hole in the torque pin can eliminate the need for forming the radial flow passage in the rotor disc. Thus, in this compressor rotor, an increase in the number of processes on the rotor disc can be avoided.

A compressor rotor as a ninth aspect according to the present invention to achieve the above object is the compressor rotor according to any one of the first to eighth aspects, wherein the rotor shaft has a plurality of rotor discs that are stacked in the axial direction, and a spindle bolt that extends in the axial direction through the plurality of rotor discs, the axial communication cavity of the downstream-side cavity group, and the axial communication cavity of the upstream-side cavity group; there is a gap extending in the axial direction left between the spindle bolt and a bolt through-hole which is formed in the rotor disc present between the axial communication cavity of the downstream-side cavity group and the axial communication cavity of the upstream-side cavity group and through which the spindle bolt extends; and the gap in the bolt through-hole forms the axial flow passage.

A compressor rotor as a tenth aspect according to the present invention to achieve the above object is the compressor rotor of the ninth aspect, wherein the gap in the bolt through-hole that forms the axial flow passage is located on the radially inner side of the spindle bolt.

A compressor rotor as an eleventh aspect according to the present invention to achieve the above object is the compressor rotor of any one of the first to tenth aspects, wherein the cavity located farthest on the radially inner side of the plurality of cavities composing the cavity group forms the axial communication cavity.

In this compressor rotor, the inside of all the plurality of cavities composing the cavity group can be efficiently ventilated with the gas inside the gas compression flow passage. Thus, in this compressor rotor, the thermal responsiveness of the compressor rotor to changes in temperature of the gas flowing through the gas compression flow passage can be further enhanced.

A compressor rotor as a twelfth aspect according to the present invention to achieve the above object is the compressor rotor according to any one of the first to eleventh aspects, wherein, of two cavity groups adjacent to each other in the axial direction, the cavity group located on the upstream side constitutes an upstream-side cavity group, and the cavity group located on the downstream side constitutes a downstream-side cavity group.

A compressor as a thirteenth aspect according to the present invention to achieve the above object includes the compressor rotor of any one of the first to twelfth aspects, and the compressor casing.

A gas turbine as a fourteenth aspect according to the present invention to achieve the above object includes: the compressor of the thirteenth aspect; a combustor that generates combustion gas by combusting fuel in air compressed by the compressor; and a turbine that is driven by the combustion gas.

Advantageous Effects of Invention

According to one aspect of the present invention, the thermal responsiveness of the rotor shaft to changes in temperature of gas flowing through the gas compression flow passage can be further enhanced.

BRIEF DESCRIPTION OF DRAWINGS

FIG. 3 is a view showing rotor discs in the first embodiment according to the present invention, in which FIG. 3(A) is a sectional view of the rotor discs, and FIG. 3(B) is a view taken along the arrow B in FIG. 3(A).

FIG. 11 is a view showing rotor discs in the second embodiment according to the present invention, in which FIG. 11(A) is a sectional view of the rotor discs, and FIG. 11(B) is a view taken along the arrow B in FIG. 11(A).

DESCRIPTION OF EMBODIMENTS

Various embodiments according to the present invention will be described below in detail with reference to the drawings.

Embodiment of Gas Turbine

An embodiment of a gas turbine will be described with reference to FIG. 1.

Figure 1:
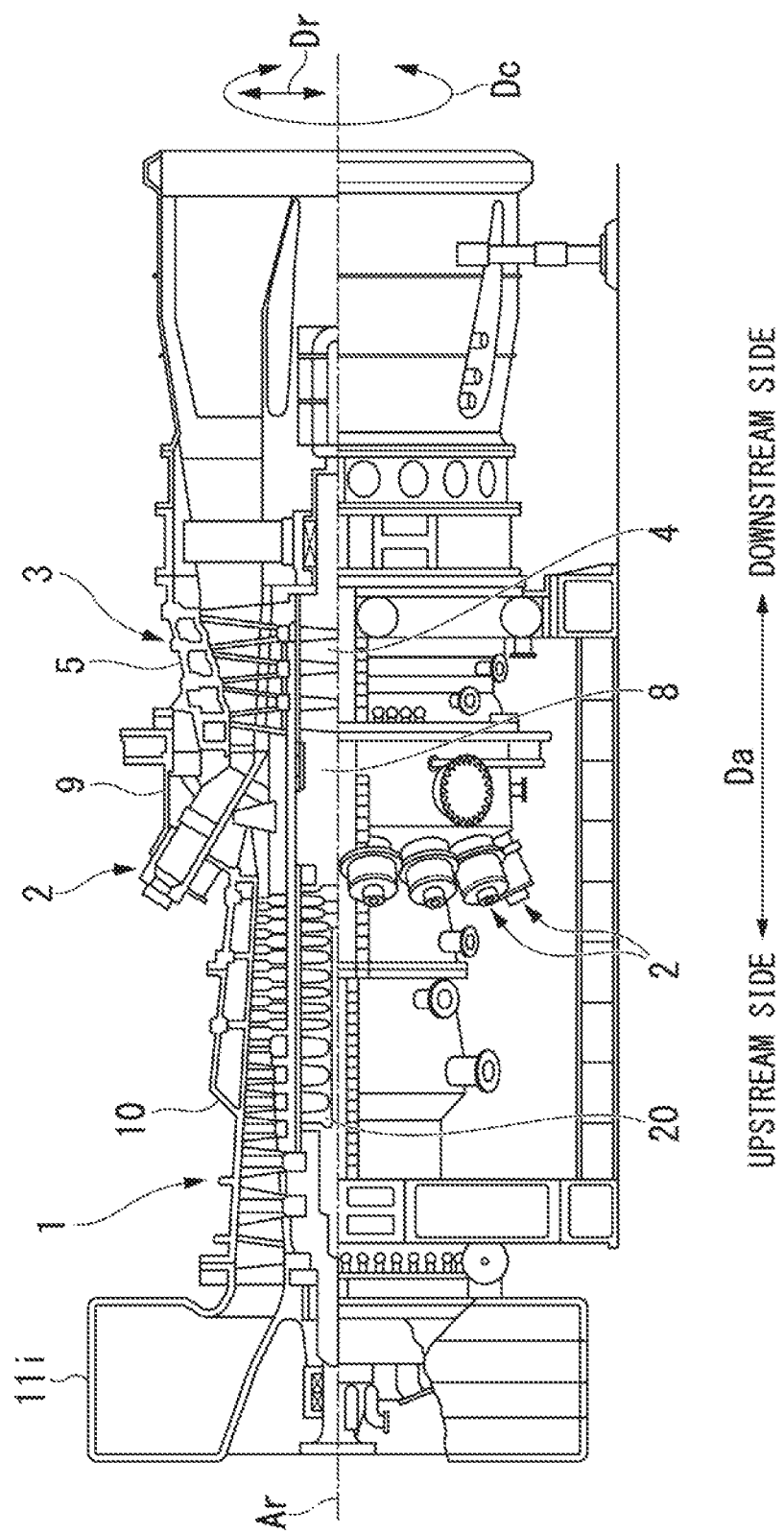
FIG. 1 is a cutaway side view of main parts of a gas turbine in an embodiment according to the present invention.

As shown in FIG. 1, a gas turbine of this embodiment includes a compressor 1, a combustor 2, and a turbine 3. The compressor 1 generates compressed air by compressing outside air. The combustor 2 generates combustion gas by mixing fuel from a fuel supply source into the compressed air and combusting the mixture. The turbine 3 is driven by the combustion gas.

The compressor 1 has a compressor rotor 20 that rotates around an axis Ar, and a cylindrical compressor casing 10 that covers the compressor rotor 20. Hereinafter, a direction in which the axis Ar extends will be referred to as an axial direction Da. One side in the axial direction Da and the other side in the axial direction will be referred to as an upstream side and a downstream side, respectively. A radial direction based on the axis Ar will be referred to simply as a radial direction Dr. A side farther away from the axis Ar in the radial direction Dr and a side closer to the axis Ar in the radial direction Dr will be referred to as a radially outer side and a radially inner side, respectively. An opening is formed on the upstream side of the compressor casing 10. This opening constitutes an intake opening 11i through which the compressor 1 takes in air from the outside.

The turbine 3 is disposed on the downstream side of the compressor 1. The turbine 3 has a turbine rotor 4 that rotates around the axis Ar, and a cylindrical turbine casing 5 that covers the turbine rotor 4. The compressor rotor 20 and the turbine rotor 4 rotate around the same axis Ar, and are coupled together to form a gas turbine rotor 8. The compressor casing 10 and the turbine casing 5 are coupled together to constitute a gas turbine casing 9. The combustor 2 is fixed to the gas turbine casing 9.

First Embodiment of Compressor

A first embodiment of a compressor will be described with reference to FIG. 2 to FIG. 9.

The compressor of this embodiment is the compressor 1 of the gas turbine described above. Therefore, the compressor 1 of this embodiment has the compressor rotor 20 that rotates around the axis Ar, and the cylindrical compressor casing 10 that covers the compressor rotor 20.

Figure 2:
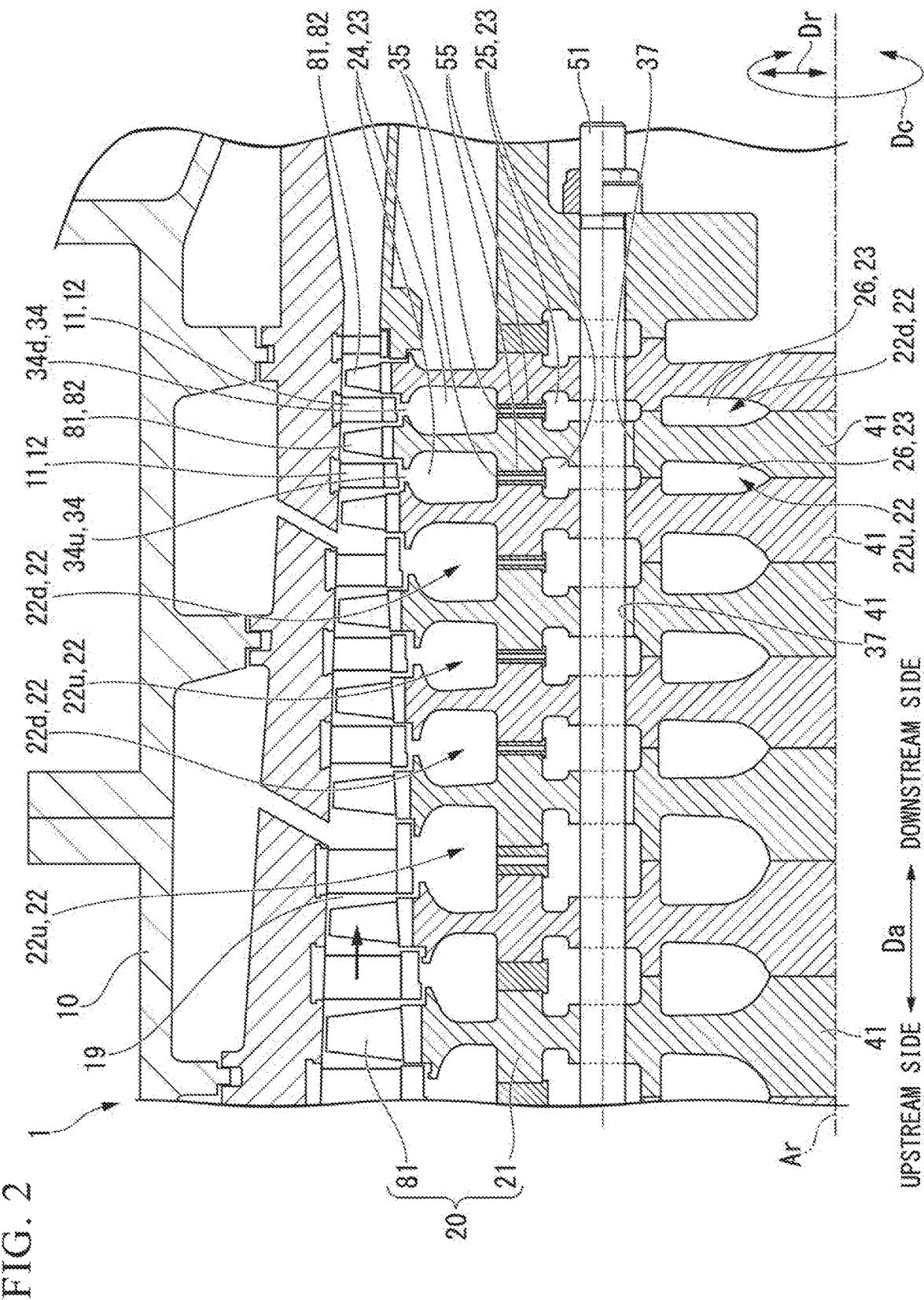
FIG. 2 is a sectional view of main parts of a compressor in a first embodiment according to the present invention.

As shown in FIG. 2, the compressor 1 is an axial-flow compressor. The compressor rotor 20 has a rotor shaft 21 and a plurality of blade rows 81. The rotor shaft 21 extends around the axis Ar in the axial direction Da. The plurality of blade rows 81 are fixed to an outer circumference of the rotor shaft 21 and arrayed in the axial direction Da. Vane rows 11 are fixed on the inner circumferential side of the compressor casing 10, respectively at positions on the downstream side of the blade rows 81.

One vane row 11 has a plurality of vanes 12. The plurality of vanes 12 are arrayed in the circumferential direction Dc around the axis Ar and compose one vane row 11. One blade row 81 has a plurality of blades 82. The plurality of blades 82 are arrayed in the circumferential direction Dc around the axis Ar and compose one blade row 81.

Figure 4:
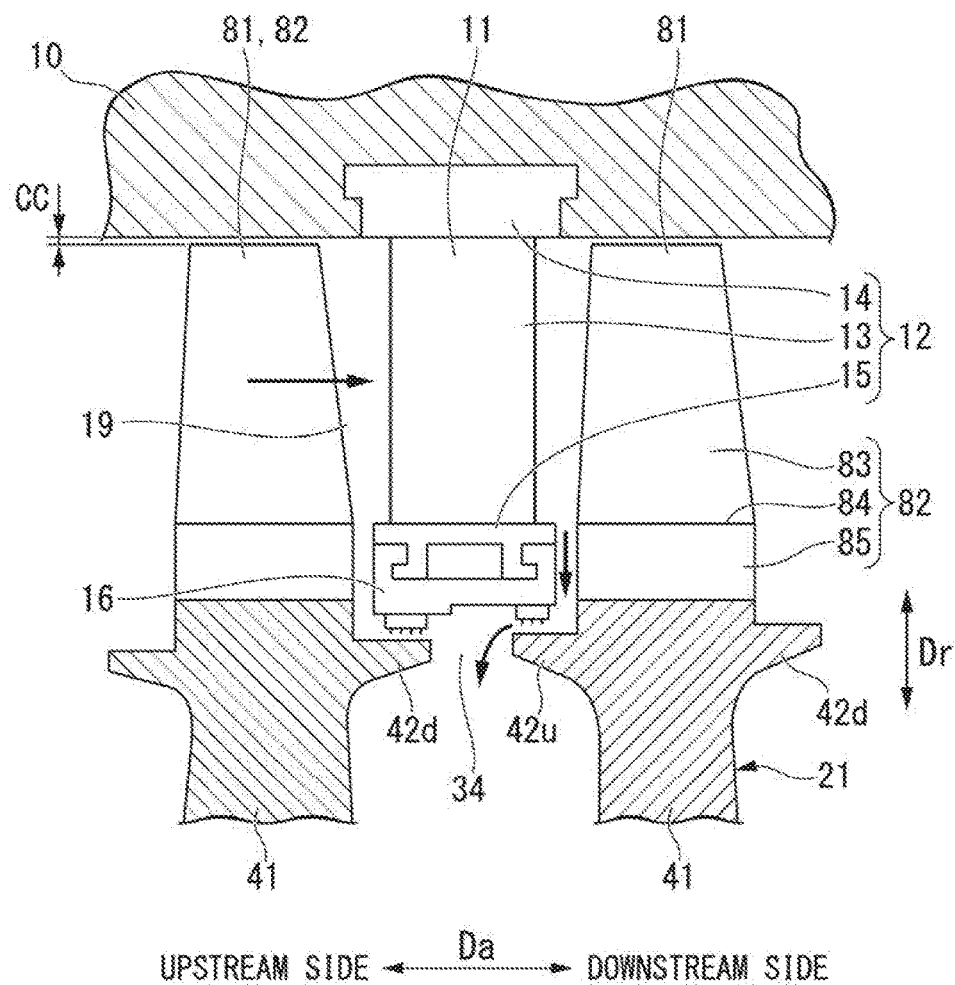
FIG. 4 is a sectional view of main parts around blades and a vane of the compressor in the first embodiment according to the present invention.

As shown in FIG. 4, the vane 12 has a vane body 13 extending in the radial direction Dr, an outer shroud 14 provided on the outer side in the radial direction Dr of the vane body 13, and an inner shroud 15 provided on the inner side in the radial direction Dr of the vane body 13. The outer shroud 14 is mounted on the inner circumferential side of the compressor casing 10. A seal ring 16 is provided on the inner side in the radial direction Dr of the inner shroud 15. The blade 82 has a blade body 83 extending in the radial direction Dr, a platform 84 provided on the inner side in the radial direction Dr of the blade body 83, and a blade root 85 provided on the inner side in the radial direction Dr of the platform 84. The blade root 85 is embedded in the rotor shaft 21.

An air compression flow passage 19 of the compressor 1 through which air in a compression process passes has an annular shape around the axis Ar. The outer circumferential side of the air compression flow passage 19 is defined by the compressor casing 10 and the outer shrouds 14 of the vanes 12. The inner circumferential side of the air compression flow passage 19 is defined by the platforms 84 of the blades 82 and the inner shrouds 15 of the vanes 12. As the compressor rotor 20 rotates, air flows through the air compression flow passage 19 from the upstream side to the downstream side while being compressed.

As shown in FIG. 2, a plurality of cavities 23 are formed inside the rotor shaft 21, at positions between adjacent ones of the plurality of blade rows 81 in the axial direction Da, in other words, at positions of the plurality of vane rows 11 in the axial direction Da. The plurality of cavities 23 each have an annular shape around the axis Ar and are separated from one another in the radial direction Dr. The plurality of cavities 23 formed at a position in the axial direction Da between two blade rows 81 adjacent to each other in the axial direction Da compose one cavity group 22. Thus, a plurality of cavity groups 22 are formed inside the rotor shaft 21 so as to be arrayed in the axial direction Da.

One cavity group 22 is composed of three cavities: an outer cavity 24, an intermediate cavity 25, and an inner cavity 26. Of the plurality of cavities, the outer cavity 24 is formed farthest on the outer side in the radial direction Dr inside the rotor shaft 21. The intermediate cavity 25 is formed on the inner side in the radial direction Dr of the outer cavity 24. Of the plurality of cavities, the inner cavity 26 is formed farthest on the inner side in the radial direction Dr inside the rotor shaft 21.

The rotor shaft 21 further has a radially outer flow passage 34 that provides communication between the outer cavity 24 and the air compression flow passage 19, and a plurality of radially intermediate flow passages 35 that provide communication between the outer cavity 24 and the intermediate cavity 25. The radially outer flow passage 34 is a flow passage that extends annularly around the axis Ar. The plurality of radially intermediate flow passages 35 are separated from one another in the circumferential direction Dc.

The rotor shaft 21 has a plurality of rotor discs 41, spindle bolts 51, and torque pins 55. The plurality of rotor discs 41 are stacked in the axial direction Da. The spindle bolt 51 extends through the plurality of rotor discs 41 and the plurality of intermediate cavities 25 in the axial direction Da. The torque pin 55 restrains the adjacent rotor discs 41 from rotating relative to each other.

One blade row 81 is mounted on each rotor disc 41. Thus, there are the rotor discs 41 respectively for the plurality of blade rows 81.

Figure 3:
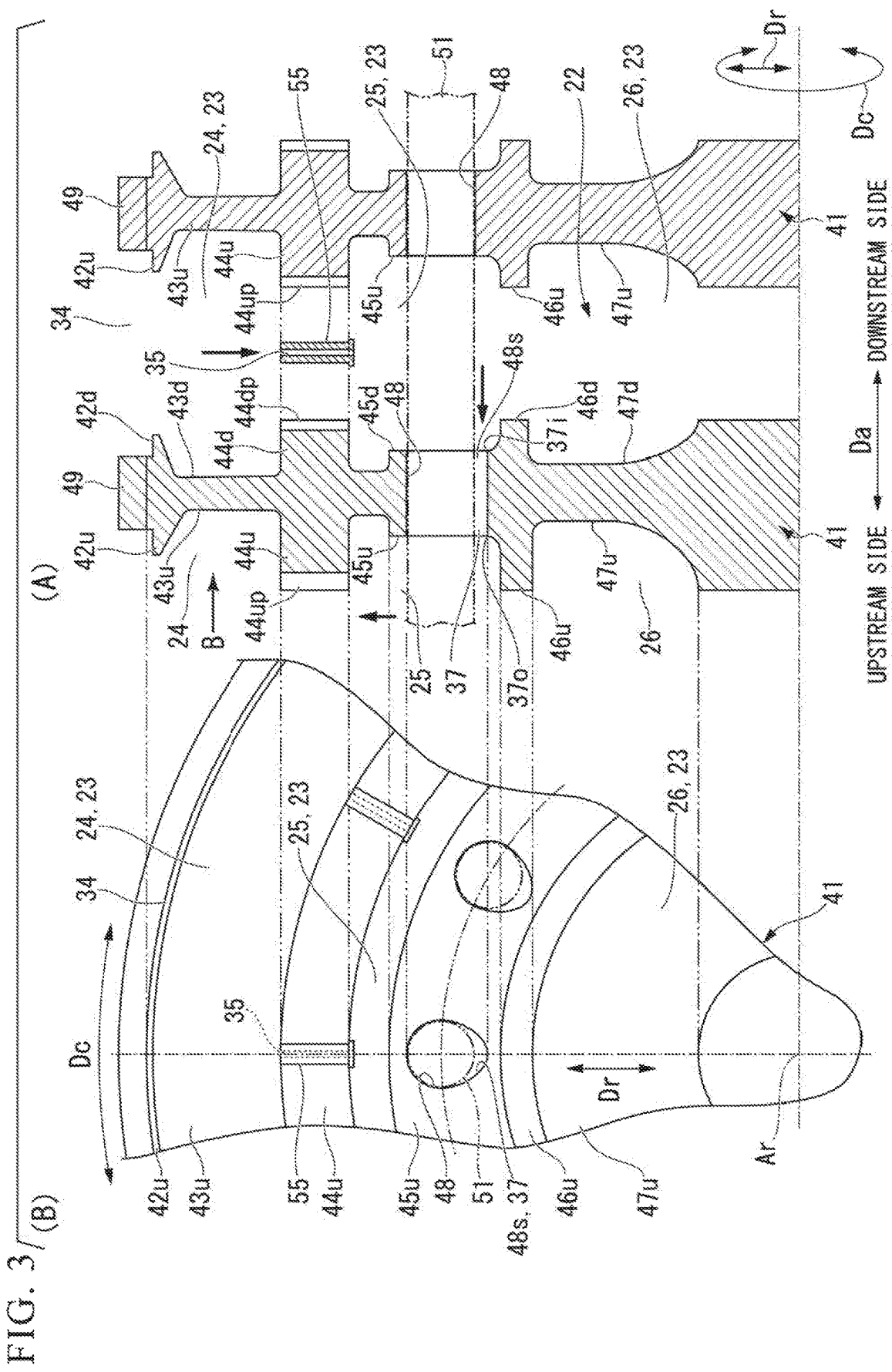

As shown in FIG. 3, the plurality of cavities 23 composing one cavity group 22, the radially outer flow passage 34 that provides communication between the outer cavity 24 of this cavity group 22 and the air compression flow passage 19, and the radially intermediate flow passages 35 that provide communication between the outer cavity 24 and the intermediate cavity 25 of this cavity group 22 are all formed between two rotor discs 41 that are adjacent to each other in the axial direction Da. FIG. 3(A) is a sectional view of the rotor discs 41, and FIG. 3(B) is a view taken along the arrow B in FIG. 3(A).

On the upstream side of one rotor disc 41, an upstream-side first recess 43u, an upstream-side second recess 45u, and an upstream-side third recess 47u are formed. The upstream-side first recess 43u is recessed toward the downstream side to form the outer cavity 24 on the upstream side of this rotor disc 41. The upstream-side second recess 45u is recessed toward the downstream side to form the intermediate cavity 25 on the upstream side of this rotor disc 41. The upstream-side third recess 47u is recessed toward the downstream side to form the inner cavity 26 on the upstream side of this rotor disc 41. Thus, on the outer side in the radial direction Dr of the upstream-side first recess 43u, an annular upstream-side first arm 42u is formed that protrudes toward the upstream side in the axial direction Da relative to a bottom surface of the upstream-side first recess 43u. Between the upstream-side first recess 43u and the upstream-side second recess 45u, an annular upstream-side second arm 44u is formed that protrudes toward the upstream side in the axial direction Da relative to the bottom surface of the upstream-side first recess 43u and a bottom surface of the upstream-side second recess 45u. Between the upstream-side second recess 45u and the upstream-side third recess 47u, an annular upstream-side third arm 46u is formed that protrudes toward the upstream side in the axial direction Da relative to the bottom surface of the upstream-side second recess 45u and a bottom surface of the upstream-side third recess 47u.

The annular upstream-side second arm 44u has a plurality of upstream-side pin grooves 44up that are recessed toward the downstream side and provide communication between the upstream-side first recess 43u and the upstream-side second recess 45u.

On the downstream side of one rotor disc 41, a downstream-side first recess 43d, a downstream-side second recess 45d, and a downstream-side third recess 47d are formed. The downstream-side first recess 43d is recessed toward the upstream side to form the outer cavity 24 on the downstream side of this rotor disc 41. The downstream-side second recess 45d is recessed toward the upstream side to form the intermediate cavity 25 on the downstream side of this rotor disc 41. The downstream-side third recess 47d is recessed toward the upstream side to form the inner cavity 26 on the downstream side of this rotor disc 41. Thus, on the outer side in the radial direction Dr of the downstream-side first recess 43d, an annular downstream-side first arm 42d is formed that protrudes toward the downstream side in the axial direction Da relative to a bottom surface of the downstream-side first recess 43d. Between the downstream-side first recess 43d and the downstream-side second recess 45d, an annular downstream-side second arm 44d is formed that protrudes toward the downstream side in the axial direction Da relative to the bottom surface of the downstream-side first recess 43d and a bottom surface of the downstream-side second recess 45d. Between the downstream-side second recess 45d and the downstream-side third recess 47d, an annular downstream-side third arm 46d is formed that protrudes toward the downstream side in the axial direction Da relative to the bottom surface of the downstream-side second recess 45d and a bottom surface of the downstream-side third recess 47d.

The annular downstream-side second arm 44d has a plurality of downstream-side pin grooves 44dp that are recessed toward the upstream side and provide communication between the downstream-side first recess 43d and the downstream-side second recess 45d.

The outer cavity 24 is defined by the downstream-side first recess 43d of one rotor disc 41, located on the upstream side, of two rotor discs 41 adjacent to each other in the axial direction Da, and by the upstream-side first recess 43u of the other rotor disc 41 located on the downstream side. The intermediate cavity 25 is defined by the downstream-side second recess 45d of one rotor disc 41, located on the upstream side, of two rotor discs 41 adjacent to each other in the axial direction Da, and by the upstream-side second recess of the other rotor disc 41 located on the downstream side. The inner cavity 26 is defined by the downstream-side third recess 47d of one rotor disc 41, located on the upstream side, of two rotor discs 41 adjacent to each other in the axial direction Da, and by the upstream-side third recess 47u of the other rotor disc 41 located on the downstream side.

The downstream-side first arm 42d of one rotor disc 41, located on the upstream side, of two rotor discs 41 adjacent to each other in the axial direction Da, and the upstream-side first arm 42u of the other rotor disc 41 located on the downstream side face each other and are separated from each other in the axial direction Da. The radially outer flow passage 34 is defined by the downstream-side first arm 42d of one rotor disc 41, located on the upstream side, of two rotor discs 41 adjacent to each other in the axial direction Da, and by the upstream-side first arm 42u of the other rotor disc 41 located on the downstream side.

The plurality of downstream-side pin grooves 44dp of one rotor disc 41, located on the upstream side, of two rotor discs 41 adjacent to each other in the axial direction Da, and the plurality of upstream-side pin grooves 44up of the other rotor disc 41 located on the downstream side face each other in the axial direction Da. Pin holes in which the torque pins 55 are mounted are defined by the downstream-side pin grooves 44dp and the upstream-side pin grooves 44up. The pin holes in which the torque pins 55 are mounted each have a columnar shape corresponding to the shape of the columnar torque pin 55.

The rotor disc 41 has bolt through-holes 48 which each extend through the rotor disc 41 from the bottom surface of the upstream-side second recess 45u to the bottom surface of the downstream-side second recess 45d and through which the spindle bolts 51 are inserted. A blade mounting part 49 in which the blade root 85 (see FIG. 4) of the blade 82 is mounted is formed on the outer side in the radial direction Dr of the rotor disc 41, between the upstream-side first arm 42u and the downstream-side second arm 44d.

Figure 5:
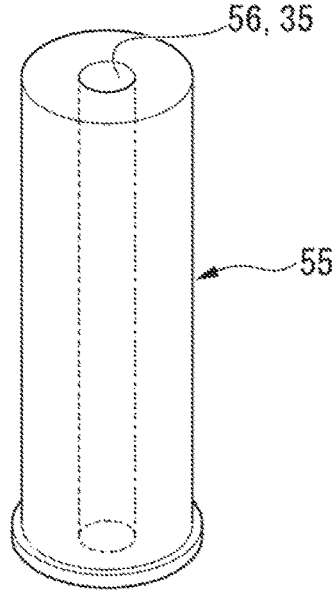
FIG. 5 is a perspective view of a torque pin in the first embodiment according to the present invention.

As shown in FIG. 5, the columnar torque pin 55 has a through-hole 56 that extends through the torque pin 55 from one end surface to the other end surface of the column. The through-hole 56 forms the radially intermediate flow passage 35.

As shown in FIG. 2, a first cavity group 22 located farthest on the downstream side inside the rotor shaft 21 and a second cavity group 22 located on the upstream side of and adjacent to the first cavity group 22 in the axial direction Da make a set. In this set, the first cavity group 22 constitutes the downstream-side cavity group 22d and the second cavity group 22 constitutes the upstream-side cavity group 22u. A third cavity group 22 located on the upstream side of and adjacent to the second cavity group 22 in the axial direction Da and a fourth cavity group 22 located on the upstream side of and adjacent to the third cavity group 22 in the axial direction Da make a set. In this set, the third cavity group 22 constitutes the downstream-side cavity group 22d and the fourth cavity group 22 constitutes the upstream-side cavity group 22u. A fifth cavity group 22 located on the upstream side of and adjacent to the fourth cavity group 22 in the axial direction Da and a sixth cavity group 22 located on the upstream side of and adjacent to the fifth cavity group 22 in the axial direction Da make a set. In this set, the fifth cavity group 22 constitutes the downstream-side cavity group 22d and the sixth cavity group 22 constitutes the upstream-side cavity group 22u.

The radially outer flow passage 34 that provides communication between the outer cavity 24 of the downstream-side cavity group 22d and the air compression flow passage 19 constitutes an inlet flow passage 34d through which air inside the air compression flow passage 19 flows into the outer cavity 24. The radially outer flow passage 34 that provides communication between the outer cavity 24 of the upstream-side cavity group 22u and the air compression flow passage 19 constitutes an outlet flow passage 34u through which air inside the outer cavity 24 flows out into the air compression flow passage 19.

In the rotor disc 41 between the downstream-side cavity group 22d and the upstream-side cavity group 22u, axial flow passages 37 are formed that provide communication between the intermediate cavity 25 of the downstream-side cavity group 22d and the intermediate cavity 25 of the upstream-side cavity group 22u. As shown in FIG. 3, there is a gap 48s extending in the axial direction Da left between the bolt through-hole 48 of the rotor disc 41 and a surface on the inner side in the radial direction Dr of the spindle bolt 51 inserted through the bolt through-hole 48. The gap 48s forms the axial flow passage 37. An opening of the axial flow passage 37 to the intermediate cavity 25 of the downstream-side cavity group 22d constitutes an inlet opening 37i. An opening of the axial flow passage 37 to the intermediate cavity 25 of the upstream-side cavity group 22u constitutes an outlet opening 37o. An edge on the outer side in the radial direction Dr of the inlet opening 37i of the axial flow passage 37 is located on the inner side in the radial direction Dr of a center position in the radial direction Dr of the intermediate cavity 25 of the downstream-side cavity group 22d. Similarly, an edge on the outer side in the radial direction Dr of the outlet opening 37o of the axial flow passage 37 is also located on the inner side in the radial direction Dr of a center position in the radial direction Dr of the intermediate cavity 25 of the upstream-side cavity group 22u. The center position in the radial direction Dr of the intermediate cavity 25 refers to a position corresponding to half the height in the radial direction Dr from a radially inner-side inner circumferential surface to a radially outer-side inner circumferential surface of inner circumferential surfaces defining the annular intermediate cavity 25.

Thus, in this embodiment, the axial flow passages 37 are formed that provide communication between the intermediate cavity 25 of the downstream-side cavity group 22d and the intermediate cavity 25 of the upstream-side cavity group 22u. In this embodiment, therefore, both the intermediate cavity 25 of the downstream-side cavity group 22d and the intermediate cavity 25 of the upstream-side cavity group 22u constitute axial communication cavities. In the rotor disc 41, the plurality of bolt through-holes 48 through which the spindle bolts 51 are inserted are formed so as to be arrayed in the circumferential direction Dc around the axis Ar. Accordingly, in the rotor disc 41, the plurality of axial flow passages 37 are also formed so as to be arrayed in the circumferential direction Dc around the axis Ar.

Figure 6:
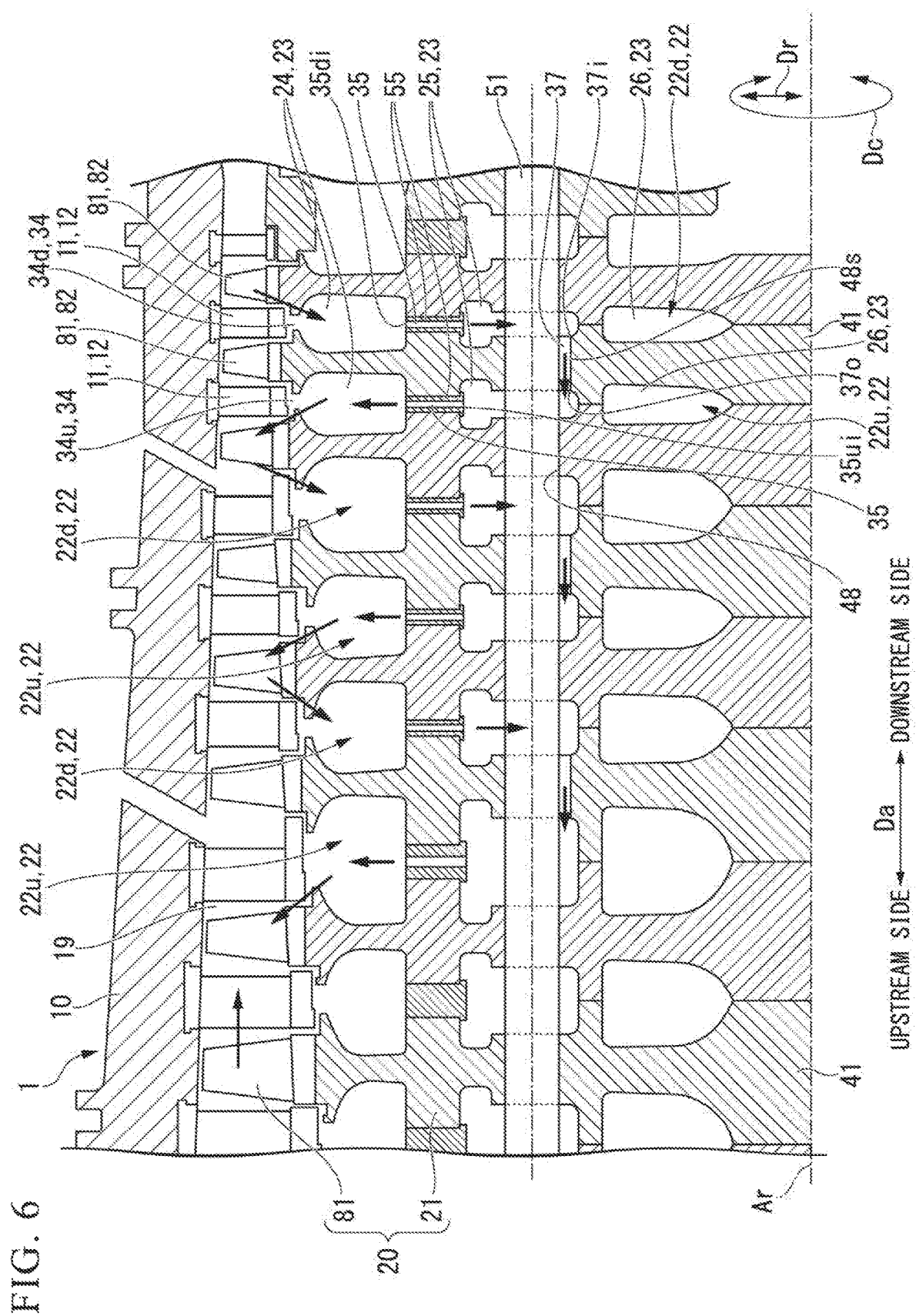
FIG. 6 is a view illustrating a flow of gas inside the compressor in the first embodiment according to the present invention.

Next, a flow of air inside the compressor casing 10 will be described using FIG. 6.

When air supplied from the intake opening Hi of the compressor casing 10 flows into the air compression flow passage 19, this air is gradually compressed while flowing through the air compression flow passage 19 toward the downstream side. Thus, the pressure inside the air compression flow passage 19 is higher on the downstream side. Accordingly, the pressure inside the radially outer flow passage 34 of the downstream-side cavity group 22d that communicates with the air compression flow passage 19 on the downstream side based on one blade row 81 is higher than the pressure inside the radially outer flow passage 34 of the upstream-side cavity group 22u that communicates with the air compression flow passage 19 on the upstream side based on this one blade row 81. Accordingly, the air inside the air compression flow passage 19 flows into the radially outer flow passage 34 of the downstream-side cavity group 22d. Thus, as described above, this radially outer flow passage 34 functions as the inlet flow passage 34d.

The air having flowed into the inlet flow passage 34d flows into the outer cavity 24 of the downstream-side cavity group 22d. This air flows into the intermediate cavity 25 through the radially intermediate flow passage 35 that is formed inside the torque pin 55. The air having flowed into the intermediate cavity 25 flows into the intermediate cavity 25 of the upstream-side cavity group 22u through the axial flow passage 37 that is formed by the gap 48s between the bolt through-hole 48 of the rotor disc 41 and the spindle bolt 51. This air flows into the outer cavity 24 of the upstream-side cavity group 22u through the radially intermediate flow passage 35 that is formed inside the torque pin 55. The air having flowed into the outer cavity 24 flows out into the air compression flow passage 19 from the radially outer flow passage 34 that provides communication between the outer cavity 24 of the upstream-side cavity group 22u and the air compression flow passage 19. Thus, as described above, this radially outer flow passage 34 functions as the outlet flow passage 34u.

Thus, in this embodiment, the pressure difference in the axial direction Da inside the air compression flow passage 19 is used as a driving force to generate a circulating flow of part of the air inside the air compression flow passage 19 flowing through the downstream-side cavity group 22d and the upstream-side cavity group 22u and returning into the air compression flow passage 19. This circulating flow promotes ventilation inside the cavities of the rotor shaft 21.

As shown in FIG. 4, there is a clearance between a radially outer end of the blade 82 and an inner circumferential surface of the compressor casing 10 facing this radially outer end in the radial direction Dr. This clearance is commonly called a tip clearance CC, and is preferably as small as possible from the viewpoint of the compressor performance.

The dimension in the radial direction Dr of the compressor rotor 20, particularly the rotor shaft 21, is large relative to the thickness of the compressor casing 10 in the radial direction Dr. Accordingly, the heat capacity of the compressor rotor 20 is larger than that of the compressor casing 10, and the thermal responsiveness of the compressor rotor 20 to changes in temperature of the air flowing through the air compression flow passage 19 is lower than that of the compressor casing 10. Thus, when the temperature of the air flowing through the air compression flow passage 19 changes, a change occurs in the tip clearance CC due to the difference in thermal responsiveness between the compressor rotor 20 and the compressor casing 10.

If there is a significant change in the tip clearance CC, it is necessary to provide a large steady-state clearance. The steady-state clearance refers to the tip clearance CC in a state where stable operation of the gas turbine continues and the temperatures of the compressor rotor 20 and the compressor casing 10 are continuously equal to each other. If this steady-state clearance is large, a larger amount of air passes between the radially outer end of the blade 82 and the inner circumferential surface of the compressor casing 10 during steady operation of the gas turbine. Thus, a large steady-state clearance not only degrades the compressor performance during steady operation of the gas turbine but also degrades the gas turbine performance.

In this embodiment, therefore, as described above, the air inside the air compression flow passage 19 is passed through the rotor shaft 21 to thereby enhance the thermal responsiveness of the compressor rotor 20 to changes in temperature of the air flowing through the air compression flow passage 19 and to reduce the change in the tip clearance CC. As the change in the tip clearance CC is thus reduced in this embodiment, the steady-state clearance can be reduced. Accordingly, in this embodiment, the compressor performance during steady operation of the gas turbine can be enhanced, and as a result, the gas turbine performance can be enhanced.

Figure 7:
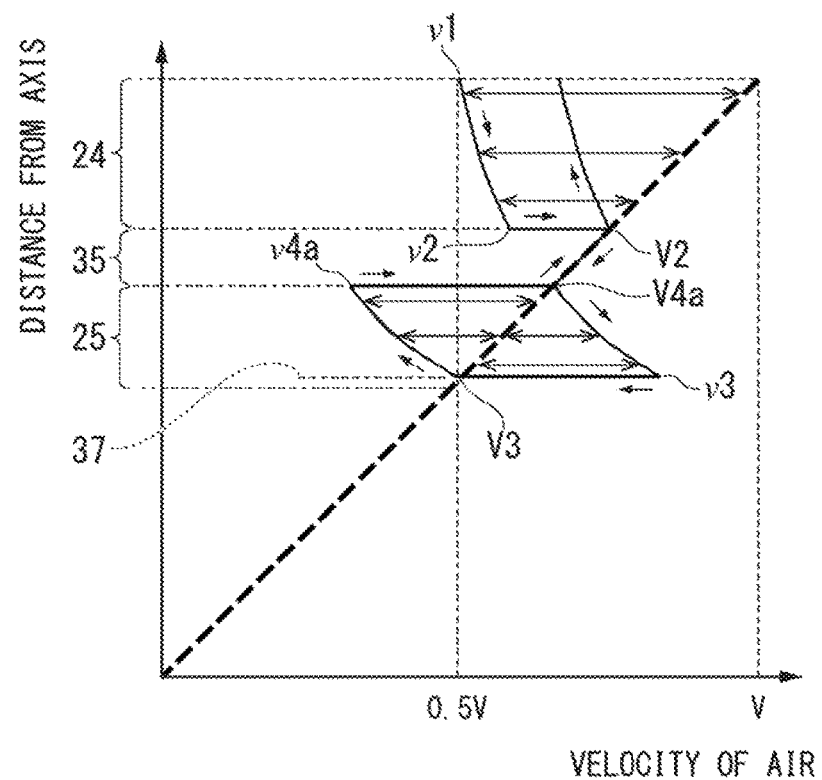
FIG. 7 is a graph showing changes in circumferential velocity of gas inside a rotor shaft in the first embodiment according to the present invention.
Figure 8:
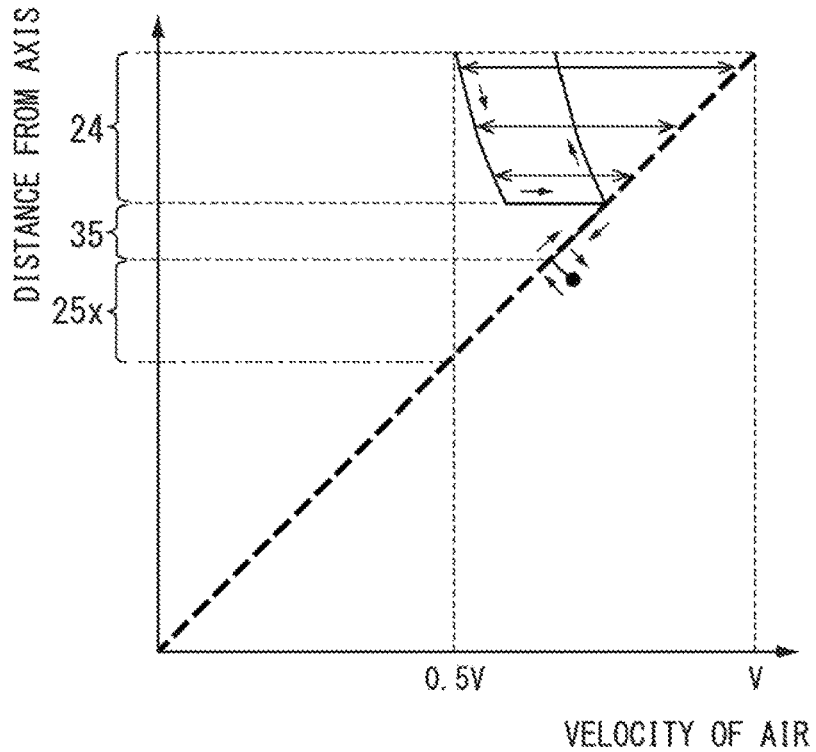
FIG. 8 is a graph showing changes in circumferential velocity of gas inside a rotor shaft in a comparative example of the first embodiment according to the present invention.

Next, the reason why the thermal responsiveness of the compressor rotor 20 is improved in this embodiment will be described using FIG. 7 and FIG. 8. In FIG. 7 and FIG. 8, the horizontal axis and the vertical axis respectively represent the circumferential velocity of air and the distance from the axis Ar in the radial direction Dr. In FIG. 7 and FIG. 8, the thick dashed line and the thin solid lines respectively indicate the circumferential velocity of the rotor shaft 21 and the circumferential velocity of the air inside the rotor shaft 21.

FIG. 7 shows changes in circumferential velocity of the air inside the rotor shaft 21 in this embodiment. As shown in FIG. 7, the circumferential velocity of the rotor shaft 21 is zero at a position on the axis Ar. As the distance from the axis Ar increases, the circumferential velocity of the rotor shaft 21 increases in proportion to the distance from the axis Ar. Thus, the rotor shaft 21 reaches a maximum circumferential velocity V at the outer circumferential surface thereof.

As described above using FIG. 6, the air inside the air compression flow passage 19 flows into the outer cavity 24 of the downstream-side cavity group 22d through the inlet flow passage 34d. A circumferential velocity v1 of the air immediately after flowing into the outer cavity 24 can be represented as 0.5V, which is roughly half the circumferential velocity V of the rotor shaft 21 at the outer circumferential surface. Although the circumferential velocity v1 of the air immediately after flowing into the outer cavity 24 is represented here as 0.5V, this is merely an example, and the circumferential velocity v1 can be changed through adjustment of a clearance etc. The air having flowed into the outer cavity 24 flows through the outer cavity 24 toward the inner side in the radial direction Dr while flowing in the circumferential direction Dc relative to the outer cavity 24. The circumferential velocity of the air increases in inverse proportion to the distance from the axis Ar by the law of conservation of angular momentum. Thus, as the air flows through the outer cavity 24 toward the inner side in the radial direction Dr, the circumferential velocity of the air increases. When the air reaches an end on the inner side in the radial direction Dr of the outer cavity 24, the circumferential velocity of the air becomes v2. The circumferential velocity v2 is higher than the circumferential velocity v1 of the air immediately after flowing into the outer cavity 24. The air flows into one of the plurality of radially intermediate flow passages 35 that are open at the end. The air having flowed into the radially intermediate flow passage 35 flows through the radially intermediate flow passage 35 toward the inner side in the radial direction Dr, and flows into the intermediate cavity 25. The air inside the radially intermediate flow passage 35 rotates integrally with the rotor shaft 21 around the axis Ar, so that the circumferential velocity of the air inside the radially intermediate flow passage 35 becomes roughly equal to the circumferential velocity of the radially intermediate flow passage 35.

There is a difference in circumferential velocity (v2−V2) between the circumferential velocity v2 of the air having reached the end on the inner side in the radial direction Dr of the outer cavity 24 and a circumferential velocity V2 of an inlet opening 35di (see FIG. 6) that is a radially outer-side opening of the radially intermediate flow passage 35. Thus, immediately after the air has flowed from the outer cavity 24 into the radially intermediate flow passage 35, the circumferential velocity of the air matches the circumferential velocity of the inlet opening 35di and this difference in circumferential velocity (v2−V2) becomes zero.

When the air flows into the intermediate cavity 25, the air flows through the intermediate cavity 25 toward the inner side in the radial direction Dr while flowing in the circumferential direction Dc relative to the intermediate cavity 25. Inside the intermediate cavity 25, too, as the air flows through the intermediate cavity 25 toward the inner side in the radial direction Dr, the circumferential velocity of the air increases by the law of conservation of angular momentum. Thus, as the air flows through the intermediate cavity 25 toward the inner side in the radial direction Dr, the difference in circumferential velocity from the intermediate cavity 25 increases. The circumferential velocity of the air becomes v3 immediately before the air reaches one inlet opening 37i of the inlet openings 37i of the plurality of axial flow passages 37. The air flows into the axial flow passage 37 through the inlet opening 37i. The air flows through the axial flow passage 37 toward the upstream side, and flows into the intermediate cavity 25 of the upstream-side cavity group 22u. The air inside the axial flow passage 37 rotates integrally with the rotor shaft 21 around the axis Ar, so that the circumferential velocity of the air inside the axial flow passage 37 becomes roughly equal to a circumferential velocity V3 of the axial flow passage 37.

There is a difference in circumferential velocity (v3−V3) between the circumferential velocity v3 of the air immediately before reaching the inlet opening 37i (see FIG. 6) of the axial flow passage 37 and the circumferential velocity V3 of the inlet opening 37i of the axial flow passage 37. Thus, immediately after the air has flowed from the intermediate cavity 25 into the axial flow passage 37, the circumferential velocity of the air matches the circumferential velocity of the inlet opening 37i and this difference in circumferential velocity (v3−V3) becomes zero.

When the air flows into the intermediate cavity 25 of the upstream-side cavity group 22u, the air flows through the intermediate cavity 25 toward the outer side in the radial direction Dr while flowing in the circumferential direction Dc relative to the intermediate cavity 25. Inside the intermediate cavity 25, as the air flows through the intermediate cavity 25 toward the outer side in the radial direction Dr, the circumferential velocity of the air decreases by the law of conservation of angular momentum. Thus, as the air flows through the intermediate cavity 25 toward the outer side in the radial direction Dr, the difference in circumferential velocity from the intermediate cavity 25 increases. When the air reaches an end on the outer side in the radial direction Dr of the intermediate cavity 25, the circumferential velocity of the air becomes v4a. The air flows into one of the plurality of radially intermediate flow passages 35 that are open at the end. The air flows through the radially intermediate flow passage 35 toward the outer side in the radial direction Dr, and flows into the outer cavity 24 of the upstream-side cavity group 22u. The air inside the radially intermediate flow passage 35 rotates integrally with the rotor shaft 21 around the axis Ar, so that the circumferential velocity of the air inside the radially intermediate flow passage 35 becomes roughly equal to a circumferential velocity V4a of the radially intermediate flow passage 35.

There is a difference in circumferential velocity (v4a−V4a) between the circumferential velocity v4a of the air having reached the end on the outer side in the radial direction Dr of the intermediate cavity 25 and the circumferential velocity V4a of an inlet opening 35ui (see FIG. 6) that is a radially outer-side opening of the radially intermediate flow passage 35. Thus, immediately after the air has flowed from the intermediate cavity 25 into the radially intermediate flow passage 35, the circumferential velocity of the air matches the circumferential velocity of the inlet opening 35ui and the difference in circumferential velocity (v4a−V4a) becomes zero.

When the air flows into the outer cavity 24, the air flows through the outer cavity 24 toward the outer side in the radial direction Dr while flowing in the circumferential direction Dc relative to the outer cavity 24. Inside the outer cavity 24, too, as the air flows through the outer cavity 24 toward the outer side in the radial direction Dr, the circumferential velocity of the air decreases by the law of conservation of angular momentum. Thus, as the air flows through the outer cavity 24 toward the outer side in the radial direction Dr, the difference in circumferential velocity from the outer cavity 24 increases.

This air returns into the air compression flow passage 19 through the outlet flow passage 34u.

Thus, in this embodiment, as described above, the pressure difference in the axial direction Da inside the air compression flow passage 19 is used as a driving force to generate a circulating flow of part of the air inside the air compression flow passage 19 flowing from the air compression flow passage 19 through the downstream-side cavity group 22d and the upstream-side cavity group 22u and returning to the air compression flow passage 19. Specifically, in this embodiment, part of the air inside the air compression flow passage 19 flows through the outer cavity 24 of the downstream-side cavity group 22d, the intermediate cavity 25 of the downstream-side cavity group 22d, the intermediate cavity 25 of the upstream-side cavity group 22u, and the outer cavity 24 of the upstream-side cavity group 22u in this order, and returns to the air compression flow passage 19. Thus, in this embodiment, as long as the rotor shaft 21 rotates, the inside each of the outer cavity 24 of the downstream-side cavity group 22d, the intermediate cavity 25 of the downstream-side cavity group 22d, the intermediate cavity 25 of the upstream-side cavity group 22u, and the outer cavity 24 of the upstream-side cavity group 22u can be ventilated with the circulating flow of the air flowing through these cavities.

Moreover, in this embodiment, there is a difference in circumferential velocity between the air and the cavities 23 inside the cavities 23 through which the air from the air compression flow passage 19 flows. Thus, the heat transfer coefficient of surfaces of the rotor discs 41 defining the cavities 23 can be increased.

In short, in this embodiment, the inside of each cavity 23 can be ventilated with the air flowing through the air compression flow passage 19. Moreover, in this embodiment, the heat transfer coefficient of wall surfaces of the rotor discs 41 can be increased. In this embodiment, therefore, the thermal responsiveness of the compressor rotor 20 to changes in temperature of the air flowing through the air compression flow passage 19 can be enhanced.

A circumferential flow passage that provides communication among the plurality of axial flow passages 37 formed so as to be arrayed in the circumferential direction Dc around the axis Ar may be formed in the rotor disc 41, at an intermediate position of the plurality of axial flow passages 37 in the axial direction Da. This circumferential flow passage is formed annularly around the axis Ar. If this circumferential flow passage is formed, the air having flowed into the inlet opening 37i of the axial flow passage 37 flows through the axial flow passage 37 toward the upstream side in the axial direction Da and reaches the circumferential flow passage. Then, this air flows through the circumferential flow passage in the circumferential direction, and flows into the intermediate cavity 25 on the upstream side from one of the axial flow passages 37. Adopting this form can produce the same enhancing effect on the thermal responsiveness of the compressor rotor 20 as in this embodiment.

Next, changes in circumferential velocity of air inside a rotor shaft in a comparative example of the above embodiment will be described using FIG. 8 and FIG. 9.

Figure 9:
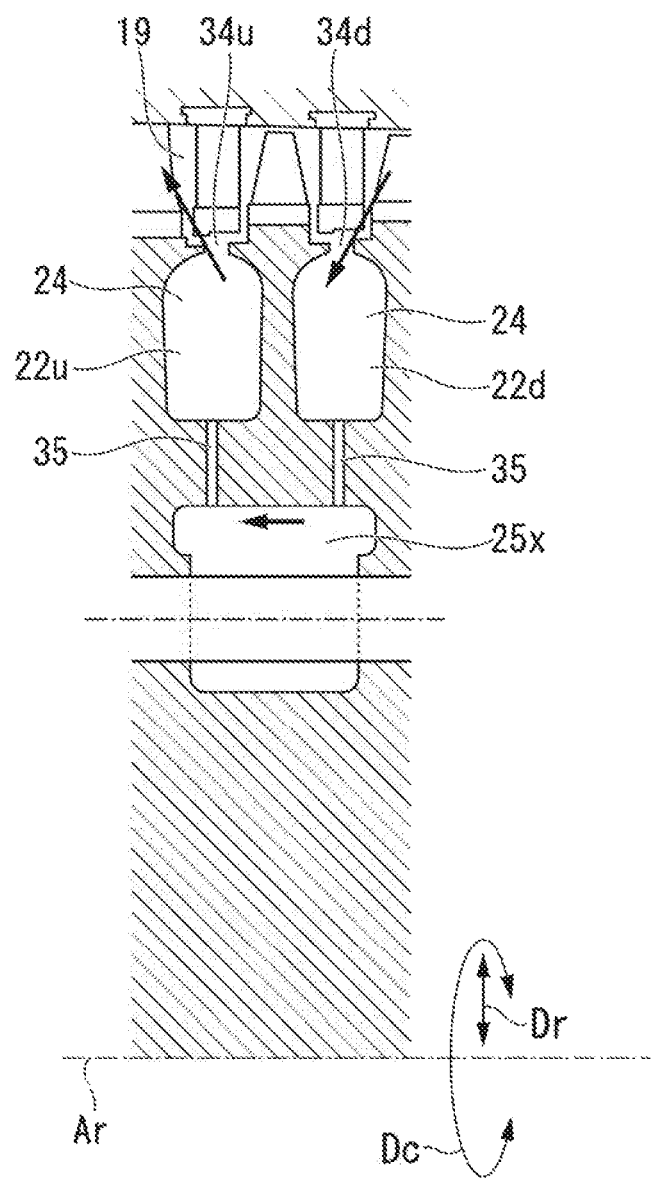
FIG. 9 is a sectional view of main parts of the rotor shaft in the comparative example of the first embodiment according to the present invention.

As shown in FIG. 9, in this comparative example, the intermediate cavity 25 of the downstream-side cavity group 22d and the intermediate cavity 25 of the upstream-side cavity group 22u of the above embodiment are integrated to constitute one cavity 23. Here, for the convenience of the following description, a cavity into which the intermediate cavity 25 of the downstream-side cavity group 22d and the intermediate cavity 25 of the upstream-side cavity group 22u are integrated will be referred to as a common cavity 25x.

In this comparative example, the air inside the air compression flow passage 19 flows inside the rotor shaft 21 through the inlet flow passage 34d, the outer cavity 24 of the downstream-side cavity group 22d, the radially intermediate flow passage 35 of the downstream-side cavity group 22d, the common cavity 25x, the radially intermediate flow passage 35 of the upstream-side cavity group 22u, the outer cavity 24 of the upstream-side cavity group 22u, and the outlet flow passage 34u in this order, and returns to the air compression flow passage 19.

Changes in circumferential velocity of the air from inside the air compression flow passage 19 until immediately before the air reaches the common cavity 25x are the same as in the above embodiment. Thus, the circumferential velocity of the air immediately before reaching the common cavity 25x, i.e., the air at the end on the inner side in the radial direction Dr of the radially intermediate flow passage 35 of the downstream-side cavity group 22d, is roughly equal to the circumferential velocity of the rotor shaft 21 at that position.

The air having flowed from the radially intermediate flow passage 35 of the downstream-side cavity group 22d into the common cavity 25x flows into the radially intermediate flow passage 35 of the upstream-side cavity group 22u. An outlet opening of the radially intermediate flow passage 35 of the downstream-side cavity group 22d is formed at an edge on the outer side in the radial direction Dr of a downstream-side part of the common cavity 25x, and an inlet opening of the radially intermediate flow passage 35 of the upstream-side cavity group 22u is formed at an edge on the outer side in the radial direction Dr of an upstream-side part of the common cavity 25x. On the other hand, no opening of a flow passage is formed in a region of the common cavity 25x on the inner side in the radial direction Dr. Accordingly, the air having flowed from the radially intermediate flow passage 35 of the downstream-side cavity group 22d into the common cavity 25x flows through a region of the common cavity 25x on the outer side in the radial direction Dr toward the upstream side, and flows into the radially intermediate flow passage 35 of the upstream-side cavity group 22u. Thus, the air is stagnant in the region of the common cavity 25x on the inner side in the radial direction Dr, and there is almost no flow of the air from the air compression flow passage 19.

Subsequent changes in circumferential velocity of the air having flowed into the radially intermediate flow passage 35 of the upstream-side cavity group 22u are the same as in the above embodiment.

In this comparative example, although the air inside the air compression flow passage 19 flows into the common cavity 25x, as described above, this air flows through the region of the common cavity 25x on the outer side in the radial direction Dr toward the upstream side, while the air is stagnant in the region of the common cavity 25x on the inner side in the radial direction Dr. Thus, in this comparative example, the region of the common cavity 25x on the inner side in the radial direction Dr cannot be effectively ventilated. Moreover, in this comparative example, the air having flowed into the common cavity 25x does not flow much in the radial direction Dr inside the common cavity 25x, so that there is little difference in circumferential velocity between the air and the cavity 23 occurring as the air flows in the radial direction Dr.

In the above embodiment, therefore, the inlet opening 37i and the outlet opening 37o of the axial flow passage 37 that provides communication between the intermediate cavity 25 of the downstream-side cavity group 22d and the intermediate cavity 25 of the upstream-side cavity group 22u, which correspond to the common cavity 25x of this comparative example, are formed at the positions as described above. Specifically, in the above embodiment, as shown in FIG. 6, the edge on the outer side in the radial direction Dr of the inlet opening 37i of the axial flow passage 37 is located on the inner side in the radial direction Dr of the center position in the radial direction Dr of the intermediate cavity 25 of the downstream-side cavity group 22d, and the edge on the outer side in the radial direction Dr of the outlet opening 37o of the axial flow passage 37 is also located on the inner side in the radial direction Dr of the center position in the radial direction Dr of the intermediate cavity 25 of the upstream-side cavity group 22u.

Second Embodiment of Compressor

A second embodiment of the compressor will be described with reference to FIG. 10 to FIG. 13.

Figure 10:
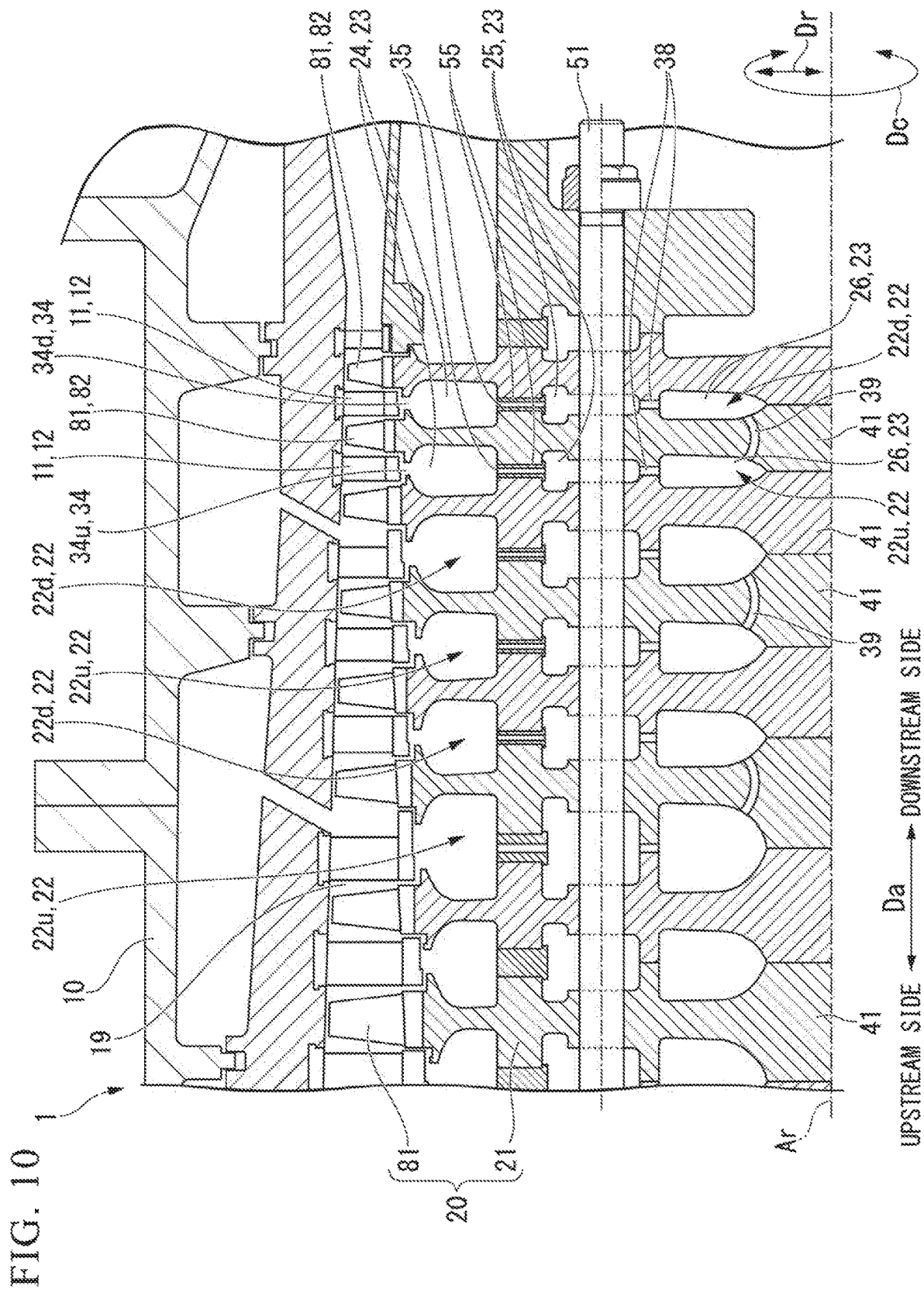
FIG. 10 is a sectional view of main parts of a compressor in a second embodiment according to the present invention.

In the compressor according to the first embodiment, the intermediate cavity 25 of the downstream-side cavity group 22d and the intermediate cavity 25 of the upstream-side cavity group 22u communicate with each other through the axial flow passages 37. In this embodiment, as shown in FIG. 10, the inner cavity 26 of the downstream-side cavity group 22d and the inner cavity 26 of the upstream-side cavity group 22u communicate with each other through axial flow passages 39. Thus, in this embodiment, the inner cavity 26 of the downstream-side cavity group 22d and the inner cavity 26 of the upstream-side cavity group 22u constitute the axial communication cavities.

In the rotor shaft 21 of this embodiment, a plurality of radially inner flow passages 38 are formed other than the radially outer flow passage 34 and the plurality of radially intermediate flow passages 35. The radially outer flow passage 34 provides communication between the outer cavity 24 and the air compression flow passage 19, The plurality of radially intermediate flow passages 35 provide communication between the outer cavity 24 and the intermediate cavity 25. The plurality of radially inner flow passages 38 provide communication between the intermediate cavity 25 and the inner cavity 26. As with the plurality of radially intermediate flow passages 35 of the first embodiment, the plurality of radially intermediate flow passages 35 of this embodiment are also separated from one another in the circumferential direction Dc. As with the plurality of radially intermediate flow passages 35 of the first embodiment, the plurality of radially inner flow passages 38 of this embodiment are also separated from one another in the circumferential direction Dc.

Figure 11:
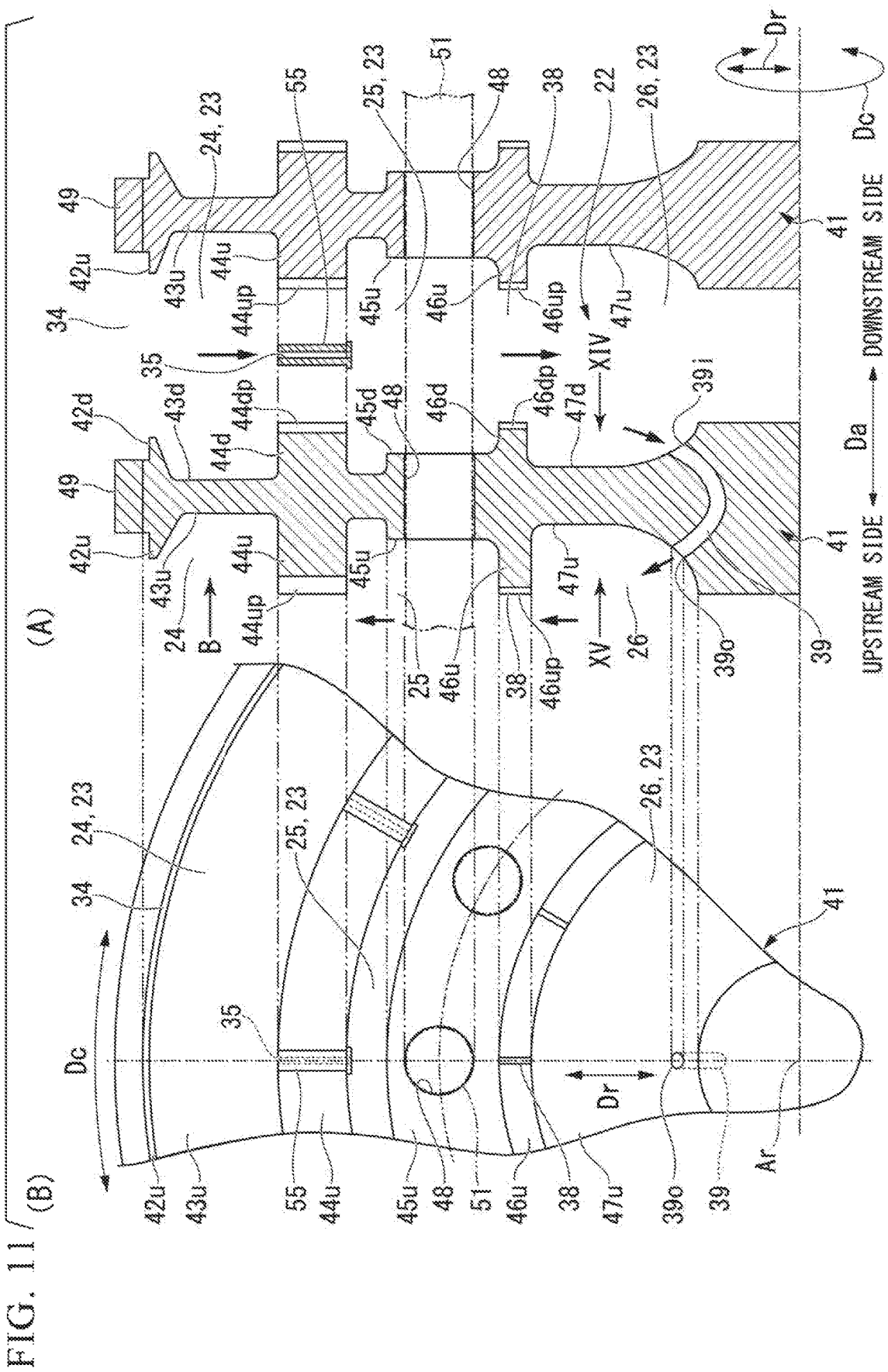

As shown in FIG. 11, the plurality of cavities 23 composing one cavity group 22, the radially outer flow passage 34 that provides communication between the outer cavity 24 of this cavity group 22 and the air compression flow passage 19, the radially intermediate flow passages 35 that provide communication between the outer cavity 24 and the intermediate cavity 25 of this cavity group 22, and the radially inner flow passages 38 that provide communication between the intermediate cavity 25 and the inner cavity 26 of this cavity group 22 are all formed between two rotor discs 41 that are adjacent to each other in the axial direction Da. FIG. 11(A) is a sectional view of the rotor discs 41, and FIG. 11(B) is a view taken along the arrow B in FIG. 11(A).

As in the first embodiment, the upstream-side first arm 42u, the upstream-side first recess 43u, the upstream-side second arm 44u, the upstream-side second recess 45u, the upstream-side third arm 46u, and the upstream-side third recess 47u are formed on the upstream side of one rotor disc 41. As in the first embodiment, the plurality of upstream-side pin grooves 44up that are recessed toward the downstream side and provide communication between the upstream-side first recess 43u and the upstream-side second recess 45u are formed in the annular upstream-side second arm 44u. Moreover, a plurality of upstream-side flow passage grooves 46up that are recessed toward the downstream side and provide communication between the upstream-side second recess 45u and the upstream-side third recess 47u are formed in the annular upstream-side third arm 46u.

On the downstream side of one rotor disc 41, the downstream-side first arm 42d, the downstream-side first recess 43d, the downstream-side second arm 44d, the downstream-side second recess 45d, the downstream-side third arm 46d, and the downstream-side third recess 47d are formed. As in the first embodiment, the plurality of downstream-side pin grooves 44dp that are recessed toward the upstream side and provide communication between the downstream-side first recess 43d and the downstream-side second recess 45d are formed in the annular downstream-side second arm 44d. Moreover, a plurality of downstream-side flow passage grooves 46dp that are recessed toward the upstream side and provide communication between the downstream-side second recess 45d and the downstream-side third recess 47d are formed in the annular downstream-side third arm 46d.

In this embodiment, too, as in the first embodiment, the outer cavity 24 is defined by the downstream-side first recess 43d of one rotor disc 41, located on the upstream side, of two rotor discs 41 adjacent to each other in the axial direction Da, and by the upstream-side first recess 43u of the other rotor disc 41 located on the downstream side. The intermediate cavity 25 is defined by the downstream-side second recess 45d of one rotor disc 41, located on the upstream side, of two rotor discs 41 adjacent to each other in the axial direction Da, and by the upstream-side second recess 45u of the other rotor disc 41 located on the downstream side. The inner cavity 26 is defined by the downstream-side third recess 47d of one rotor disc 41, located on the upstream side, of two rotor discs 41 adjacent to each other in the axial direction Da, and by the upstream-side third recess 47u of the other rotor disc 41 located on the downstream side.

The radially outer flow passage 34 is defined by the downstream-side first arm 42d of one rotor disc 41, located on the upstream side, of two rotor discs 41 adjacent to each other in the axial direction Da, and by the upstream-side first arm 42u of the other rotor disc 41 located on the downstream side.

The pin holes in which the torque pins 55 are mounted are defined by the downstream-side pin grooves 44dp and the upstream-side pin grooves 44up. As in the first embodiment, the through-hole 56 constituting the radially intermediate flow passage 35 is formed inside the torque pin 55.

The radially outer flow passage 34 that provides communication between the air compression flow passage 19 and the outer cavity 24 of the downstream-side cavity group 22d of the cavity groups 22 making a set in the rotor shaft 21 constitutes the inlet flow passage 34d through which the air inside the air compression flow passage 19 flows into the outer cavity 24. The radially outer flow passage 34 that provides communication between the air compression flow passage 19 and the outer cavity 24 of the upstream-side cavity group 22u constitutes the outlet flow passage 34u through which the air inside the outer cavity 24 flows out into the air compression flow passage 19.

In the rotor disc 41 between the downstream-side cavity group 22d and the upstream-side cavity group 22u, the axial flow passages 39 are formed that provide communication between the inner cavity 26 of the downstream-side cavity group 22*d* and the inner cavity 26 of the upstream-side cavity group 22*u*. Thus, unlike the first embodiment, the axial flow passages 37 that provide communication between the intermediate cavity 25 of the downstream-side cavity group 22*d* and the intermediate cavity 25 of the upstream-side cavity group 22*u* are not formed in the rotor disc 41 between the downstream-side cavity group 22*d* and the upstream-side cavity group 22*u*.

An opening of the axial flow passage 39 to the inner cavity 26 of the downstream-side cavity group 22*d* constitutes an inlet opening 39*i*. An edge on the outer side in the radial direction Dr of the inlet opening 39*i* of the axial flow passage 39 is located on the inner side in the radial direction Dr of a center position in the radial direction Dr of the inner cavity 26 of the downstream-side cavity group 22*d*. An opening of the axial flow passage 39 to the inner cavity 26 of the upstream-side cavity group 22*u* constitutes an outlet opening 39*o*. An edge on the outer side in the radial direction Dr of the outlet opening 39*o* of the axial flow passage 39 is also located on the inner side in the radial direction Dr of a center position in the radial direction Dr of the inner cavity 26 of the upstream-side cavity group 22*u*. The center position in the radial direction Dr of the inner cavity 26 refers to a position corresponding to half the height in the radial direction Dr from a radially inner-side inner circumferential surface to a radially outer-side inner circumferential surface of inner circumferential surfaces defining the annular inner cavity 26.

Figure 12:
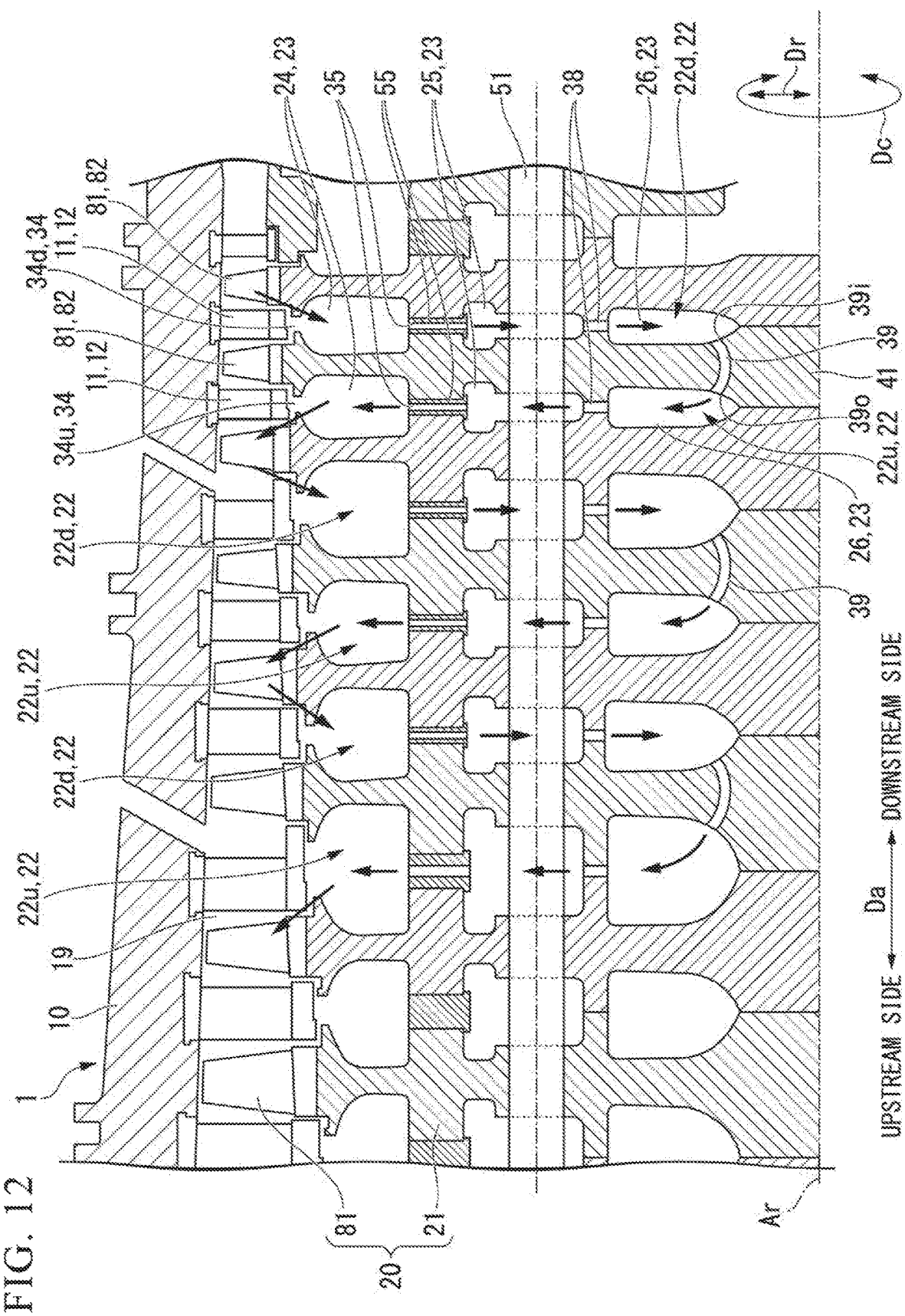
FIG. 12 is a view illustrating a flow of gas inside the compressor in the second embodiment according to the present invention.

Next, a flow of air inside the compressor casing 10 will be described using FIG. 12.

In this embodiment, too, as in the first embodiment, the radially outer flow passage 34 that provides communication between the outer cavity 24 of the downstream-side cavity group 22*d* and the air compression flow passage 19 functions as the inlet flow passage 34*d*, and the air inside the air compression flow passage 19 flows into the inlet flow passage 34*d*.

In this embodiment, too, as in the above embodiment, the air inside the air compression flow passage 19 flows inside the rotor shaft 21 through the inlet flow passage 34*d*, the outer cavity 24 of the downstream-side cavity group 22*d*, the radially intermediate flow passage 35 of the downstream-side cavity group 22*d*, and the intermediate cavity 25 of the downstream-side cavity group 22*d* in this order. Thereafter, the air having flowed into the intermediate cavity 25 of the downstream-side cavity group 22*d* flows through the radially inner flow passage 38 of the downstream-side cavity group 22*d* and the inner cavity 26 of the downstream-side cavity group 22*d* in this order. The air having flowed into the inner cavity 26 of the downstream-side cavity group 22*d* flows into the inner cavity 26 of the upstream-side cavity group 22*u* through the axial flow passage 39. The air having flowed into the inner cavity 26 of the upstream-side cavity group 22*u* flows into the intermediate cavity 25 of the upstream-side cavity group 22*u* through the radially inner flow passage 38 of the upstream-side cavity group 22*u*. As in the above embodiment, the air having flowed into the intermediate cavity 25 of the upstream-side cavity group 22*u* flows through the radially intermediate flow passage 35 of the upstream-side cavity group 22*u*, the outer cavity 24 of the upstream-side cavity group 22*u*, and the outlet flow passage 34*u* in this order, and returns to the air compression flow passage 19.

Figure 13:
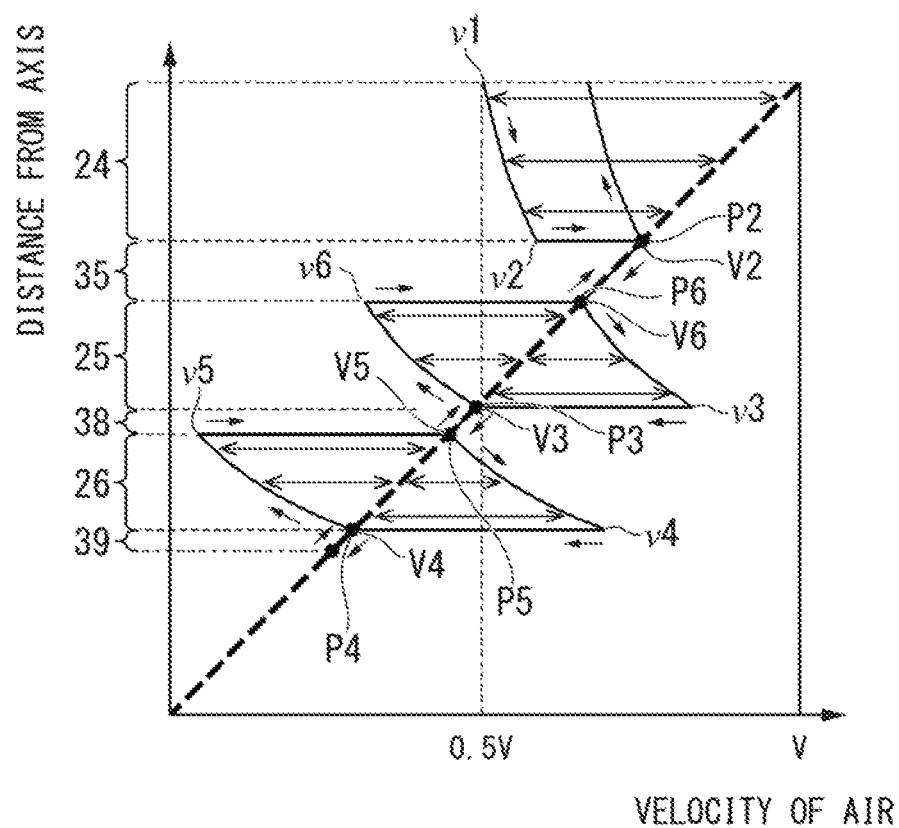
FIG. 13 is a graph showing changes in circumferential velocity of gas inside a rotor shaft in the second embodiment according to the present invention.

Next, changes in circumferential velocity of the air inside the rotor shaft 21 in this embodiment will be described using FIG. 13.

Changes in circumferential velocity of the air from inside the air compression flow passage 19 until the air reaches the intermediate cavity 25 of the downstream-side cavity group 22*d* are the same as in the above embodiment. When the air flows into the intermediate cavity 25 of the downstream-side cavity group 22*d*, the air flows through the intermediate cavity 25 toward the inner side in the radial direction Dr while flowing in the circumferential direction Dc relative to the intermediate cavity 25. Inside the intermediate cavity 25, as the air flows through the intermediate cavity 25 toward the inner side in the radial direction Dr, the circumferential velocity of the air increases by the law of conservation of angular momentum. Thus, as the air flows through the intermediate cavity 25 toward the inner side in the radial direction Dr, the difference in circumferential velocity from the intermediate cavity 25 increases. When the air reaches an end on the inner side in the radial direction Dr of the intermediate cavity 25, the air flows into one of the plurality of radially inner flow passages 38 opening at the edge. The air flows through the radially inner flow passage 38 toward the inner side in the radial direction Dr, and flows into the inner cavity 26 of the downstream-side cavity group 22*d*. The air inside the radially inner flow passage 38 rotates integrally with the rotor shaft 21 around the axis Ar, so that the circumferential velocity of the air inside the radially inner flow passage 38 becomes roughly equal to the circumferential velocity of the radially inner flow passage 38.

When the air flows into the inner cavity 26, the air flows through the inner cavity 26 toward the inner side in the radial direction Dr while flowing in the circumferential direction Dc relative to the inner cavity 26. Inside the inner cavity 26, too, as the air flows through the inner cavity 26 toward the inner side in the radial direction Dr, the circumferential velocity of the air increases by the law of conservation of angular momentum. Thus, as the air flows through the inner cavity 26 toward the inner side in the radial direction Dr, the difference in circumferential velocity from the inner cavity 26 increases. When the air reaches one opening of the openings of the plurality of axial flow passages 39, the air flows through this opening into the axial flow passage 39. The air flows through the axial flow passage 39 toward the upstream side, and flows into the inner cavity 26 of the upstream-side cavity group 22*u*. The air inside the axial flow passage 39 rotates integrally with the rotor shaft 21 around the axis Ar, so that the circumferential velocity of the air inside the axial flow passage 39 becomes roughly equal to the circumferential velocity of the axial flow passage 39.

When the air flows into the inner cavity 26 of the upstream-side cavity group 22*u*, the air flows through the inner cavity 26 toward the outer side in the radial direction Dr while flowing in the circumferential direction Dc relative to the inner cavity 26. Inside the inner cavity 26, as the air flows through the inner cavity 26 toward the outer side in the radial direction Dr, the circumferential velocity of the air decreases by the law of conservation of angular momentum. Thus, as the air flows through the inner cavity 26 toward the outer side in the radial direction Dr, the difference in circumferential velocity from the inner cavity 26 increases. When the air reaches an end on the outer side in the radial direction Dr of the inner cavity 26, the air flows into one of the plurality of radially inner flow passages 38 opening at the end.

The air flows through the radially inner flow passage 38 toward the outer side in the radial direction Dr, and flows into the intermediate cavity 25 of the upstream-side cavity group 22*u*. The air inside the radially inner flow passage 38 rotates integrally with the rotor shaft 21 around the axis Ar, so that the circumferential velocity of the air inside the radially inner flow passage 38 becomes roughly equal to the circumferential velocity of the radially inner flow passage 38.

Subsequent changes in circumferential velocity of the air until the air returns to the air compression flow passage 19 after flowing through the intermediate cavity 25, the radially intermediate flow passage 35, the outer cavity 24, and the outlet flow passage 34u of the upstream-side cavity group 22u are the same as in the above embodiment.

As has been described above, in this embodiment, as in the first embodiment, the pressure difference in the axial direction Da inside the air compression flow passage 19 is used as a driving force to generate a circulating flow of part of the air inside the air compression flow passage 19 flowing from the air compression flow passage 19 through the downstream-side cavity group 22d and the upstream-side cavity group 22u and returning to the air compression flow passage 19. Specifically, in this embodiment, part of the air inside the air compression flow passage 19 flows through the outer cavity 24 of the downstream-side cavity group 22d, the intermediate cavity 25 of the downstream-side cavity group 22d, the inner cavity 26 of the downstream-side cavity group 22d, the inner cavity 26 of the upstream-side cavity group 22u, the intermediate cavity 25 of the upstream-side cavity group 22u, and the outer cavity 24 of the upstream-side cavity group 22u in this order, and returns into the air compression flow passage 19. Thus, in this embodiment, as long as the rotor shaft 21 rotates, the inside each of the cavities of the downstream-side cavity group 22d and the cavities of the upstream-side cavity group 22u can be ventilated with the circulating flow of the air flowing through these cavities. In particular, in this embodiment, as the circulating flow also passes through the inside of the inner cavity 26 of the downstream-side cavity group 22d and the inner cavity 26 of the upstream-side cavity group 22u, the inside of these cavities can also be ventilated.

In this embodiment, too, there is a difference in circumferential velocity between the air and the cavities 23 inside the cavities 23 through which the air from the air compression flow passage 19 flows. Thus, the heat transfer coefficient of the surfaces of the rotor discs 41 defining the cavities 23 can be increased.

In this embodiment, therefore, the thermal responsiveness of the compressor rotor 20 to changes in temperature of the air flowing through the air compression flow passage 19 can be enhanced more than in the first embodiment.

First Modified Example of Second Embodiment

A first modified example of the second embodiment will be described with reference to FIG. 14 to FIG. 22.

In the first and second embodiments, if there is a large difference in circumferential velocity between the air and the radial flow passage or the axial flow passage when the air flows from one of the cavities 23 into this flow passage, the air cannot flow smoothly into this flow passage, which results in a pressure loss of the flow of air.

In this modified example, therefore, the pressure loss of the flow of air is reduced by allowing the air to flow smoothly into the flow passage even when there is a difference in circumferential velocity between the air and the flow passage. For this purpose, in this modified example, an inlet-side part of the flow passage including the inlet opening is formed so that, as the inlet-side part extends toward the inlet opening, the inlet-side part is directed toward the opposite side from a direction, relative to the inlet opening, of the air flowing into the inlet opening in the circumferential direction Dc.

Figure 14:
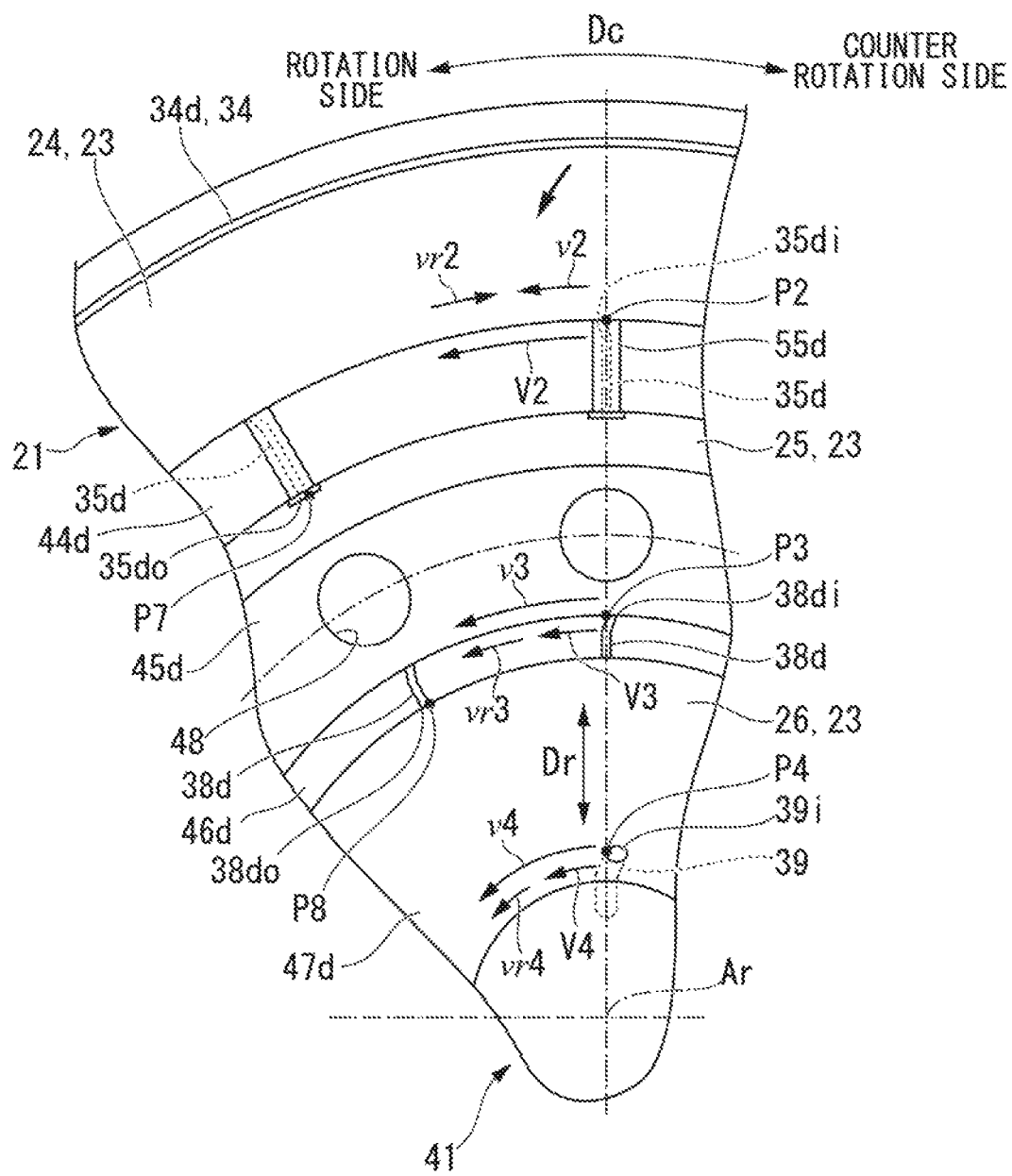
FIG. 14 is an arrow view corresponding to a view taken along the arrow XIV in FIG. 11, showing a rotor disc in a first modified example of the second embodiment according to the present invention.
Figure 16:
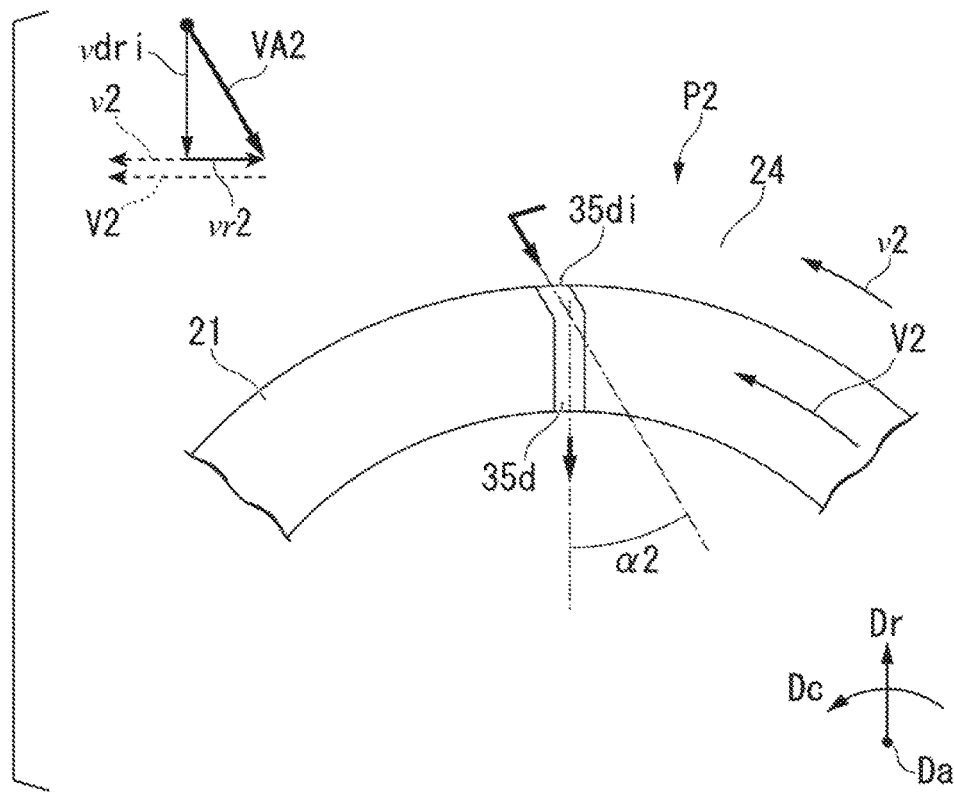
FIG. 16 is a schematic view showing details around the position P2 in FIG. 14.

Specifically, as shown in FIG. 14 and FIG. 16, an inlet-side part including the inlet opening 35di that is an opening on the outer side in the radial direction Dr of a radially intermediate flow passage 35d that provides communication between the outer cavity 24 and the intermediate cavity 25 of the downstream-side cavity group 22d is formed so as to be directed toward a rotation side of the rotor shaft 21 in the circumferential direction Dc as the inlet-side part extends toward the inlet opening 35di. FIG. 14 is an arrow view of a main part of the rotor disc 41 of this modified example that is a modification of a view taken along the arrow XIV in FIG. 11. In other words, FIG. 14 is a view of the rotor disc 41 of this modified example as seen in the axial direction Da from the downstream side toward the upstream side. FIG. 16 is a schematic view showing details around the position P2 of the inlet opening 35di of the radially intermediate flow passage 35d in FIG. 14.

As described using FIG. 7, the circumferential velocity v1 of the air immediately after flowing from the air compression flow passage 19 through the inlet flow passage 34d into the outer cavity 24 of the downstream-side cavity group 22d can be represented as 0.5V, which is roughly half the circumferential velocity V of the rotor shaft 21 at the outer circumferential surface. This air flows through the outer cavity 24 toward the inner side in the radial direction Dr while flowing in the circumferential direction Dc relative to the outer cavity 24. As the air flows through the outer cavity 24 toward the inner side in the radial direction Dr, the circumferential velocity of the air increases by the law of conservation of angular momentum. Thus, as the air flows through the outer cavity 24 toward the inner side in the radial direction Dr, the circumferential velocity of the air approaches the circumferential velocity of the inlet opening 35di of the radially intermediate flow passage 35d. However, as shown in FIG. 7 and FIG. 14, even at the point when the air reaches the end on the inner side in the radial direction Dr of the outer cavity 24, the circumferential velocity v2 of the air is lower than the circumferential velocity V2 of the inlet opening 35di of the radially intermediate flow passage 35d.

Thus, as shown in FIG. 14 and FIG. 16, the direction of a relative circumferential velocity vr2 ($=v2-V2<0$) of the air flowing into the inlet opening 35di relative to the inlet opening 35di is toward a counter rotation side that is opposite from the rotation side of the rotor shaft 21 in the circumferential direction Dc. As described above, in the process of flowing from the outer cavity 24 into the radially intermediate flow passage 35d, the air increases its circumferential velocity so that the relative circumferential velocity vr2 ($=v2-V2<0$) becomes zero. In this example, therefore, the inlet-side part including the inlet opening 35di is formed so as to be directed toward the rotation side in the circumferential direction Dc as the inlet-side part extends toward the inlet-side opening so that the air flowing toward the counter rotation side in the circumferential direction Dc relative to the inlet opening 35di is faced and received by the inlet opening 35di. Specifically, the inlet part of the radially intermediate flow passage 35d is inclined relative to the other part thereof at an inclination angle α2 toward the rotation side (rotation direction side). More specifically, when the relative velocity of the air in the vicinity of the inlet opening 35di inside the outer cavity 24 is VA2, and the relative flow velocity of the air in the radial direction Dr, which is a component of this relative velocity VA2 in the radial direction, is vdri, it is preferable that the equation $\tan^{-1}\alpha2=vr2/vdri$ be satisfied. This inclination angle $\alpha2$ coincides with the direction of the vector of the relative flow velocity VA2. Compared with simply inclining the inlet-side part, selecting such an inclination angle $\alpha2$ can further reduce the pressure loss of the air in the process of flowing from the outer cavity 24 into the radially intermediate flow passage 35d.

As described above, the flow velocity V1 of the air immediately after flowing into the outer cavity 24 through the inlet flow passage 34d varies according to the structure of the inlet flow passage 34d, the operation conditions of the compressor, etc. Thus, the direction of the relative circumferential velocity vr2 (=v2−V2) of the air relative to the inlet opening 35di may be toward the rotation side of the rotor shaft 21. In this case, it is desirable that the inlet-side part including the inlet opening 35di of the radially intermediate flow passage 35d is inclined toward the counter rotation side (counter rotation direction side) opposite from the rotation side (rotation direction side) at a predetermined angle.

Figure 21:
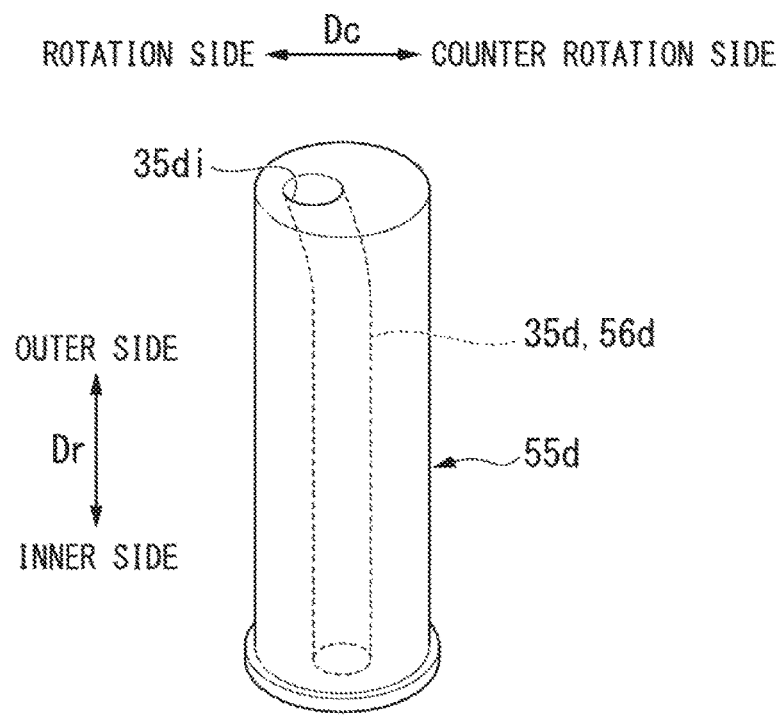
FIG. 21 is a perspective view of a torque pin of a downstream-side cavity group in the first modified example of the second embodiment according to the present invention.

In this embodiment, the radially intermediate flow passage 35d is formed inside a torque pin 55d. Therefore, as shown in FIG. 21, a through-hole 56d of the torque pin 55d constituting the radially intermediate flow passage 35d is formed so that an inlet-side part including the inlet opening 35di that is the opening on the outer side in the radial direction Dr is directed toward the rotation side in the circumferential direction Dc as the inlet-side part extends toward the inlet opening 35di.

Figure 17:
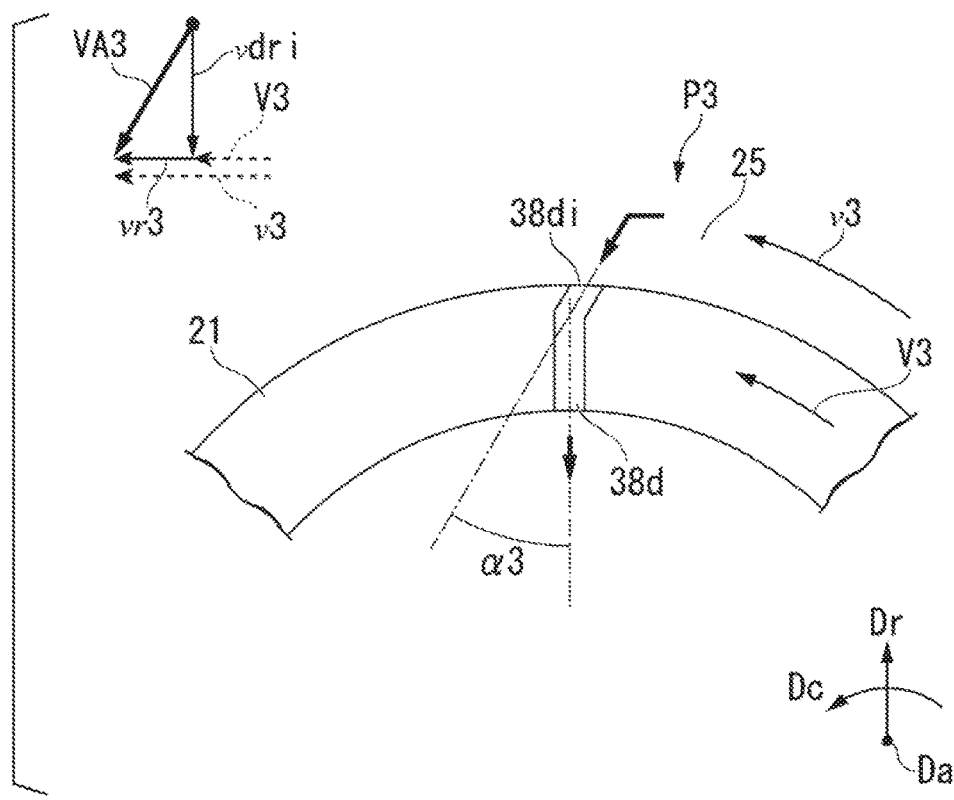
FIG. 17 is a schematic view showing details around the position P3 in FIG. 14.
Figure 18:
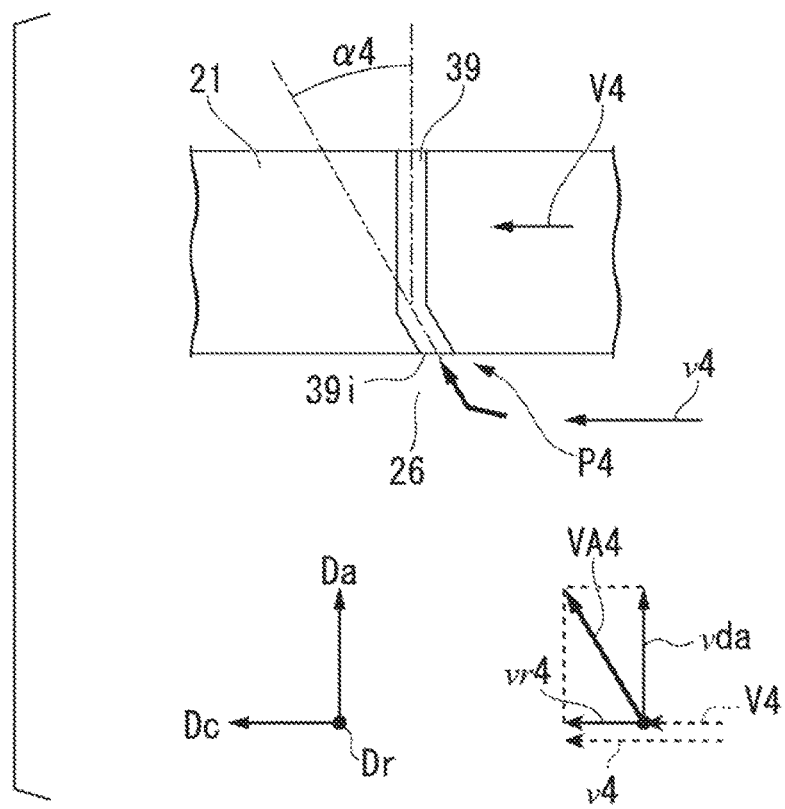
FIG. 18 is a schematic view showing details around the position P4 in FIG. 14.

As shown in FIG. 14 and FIG. 17, in this modified example, an inlet-side part including an inlet opening 38di that is an opening on the outer side in the radial direction Dr of a radially inner flow passage 38d that provides communication between the intermediate cavity 25 and the inner cavity 26 of the downstream-side cavity group 22d is formed so as to be directed toward the counter rotation side in the circumferential direction Dc as the inlet-side part extends toward the inlet opening 38di. Moreover, as shown in FIG. 14 and FIG. 18, an inlet-side part including the inlet opening 39i that is the opening of the axial flow passage 39 to the inner cavity 26 of the downstream-side cavity group 22d is formed so as to be directed toward the counter rotation side in the circumferential direction Dc as the inlet-side part extends toward the inlet opening 39i. FIG. 17 is a schematic view showing details around the position P3 of the inlet opening 38di of the radially inner flow passage 38d in FIG. 14. FIG. 18 is a schematic view showing details around the position P4 of the inlet opening 39i of the axial flow passage 39 in FIG. 14.

As described above using FIG. 13, the circumferential velocity of the air increases as the air flows through the intermediate cavity 25 of the downstream-side cavity group 22d toward the inner side in the radial direction Dr. Thus, at the point when the air reaches the end on the inner side in the radial direction Dr of the intermediate cavity 25, the circumferential velocity v3 of the air is higher than the circumferential velocity V3 of the inlet opening 38di of the radially inner flow passage 38d.

Thus, as shown in FIG. 14 and FIG. 17, the direction of a relative circumferential velocity vr3 (=v3−V3>0) of the air flowing into the inlet opening 38di of the radially inner flow passage 38d relative to the inlet opening 38di is toward the rotation side in the circumferential direction Dc. As described above, in the process of flowing from the intermediate cavity 25 into the radially inner flow passage 38d, the air reduces its circumferential velocity so that the relative circumferential velocity vr3 (=v3−V3>0) becomes zero. In this example, therefore, the inlet-side part including the inlet opening 38di of the radially inner flow passage 38d is formed so as to be directed toward the counter rotation side in the circumferential direction Dc as the inlet-side part extends toward the inlet opening 38di so that the air flowing toward the rotation side in the circumferential direction Dc relative to the inlet opening 38di is faced and received by the inlet opening 38di. Specifically, the inlet part of the radially inner flow passage 38d is inclined relative to the other part thereof at an inclination angle $\alpha3$ toward the counter rotation side (counter rotation direction side). More specifically, when the relative velocity of the air in the vicinity of the inlet opening 38di inside the intermediate cavity 25 is VA3, and the relative flow velocity of the air in the radial direction Dc, which is a component in the radial direction of this relative velocity VA3, is vdri, it is preferable that the equation $\tan^{-1}\alpha3=vr3/vdri$ be satisfied. This inclination angle $\alpha3$ matches the direction of the vector of the relative flow velocity VA3. Compared with simply inclining the inlet-side part, selecting such an inclination angle $\alpha3$ can further reduce the pressure loss of the air in the process of flowing from the intermediate cavity 25 into the radially inner flow passage 38d.

As described above using FIG. 13, the circumferential velocity of the air increases as the air flows through the inner cavity 26 of the downstream-side cavity group 22d toward the inner side in the radial direction Dr Thus, a circumferential velocity v4 of the air immediately before the air reaches the inlet opening 39i of the axial flow passage 39 inside the inner cavity 26 is higher than a circumferential velocity V4 of the inlet opening 39i of the axial flow passage 39.

Thus, as shown in FIG. 14 and FIG. 18, the direction of a relative circumferential velocity vr4 (=v4−V4>0) of the air immediately before flowing into the inlet opening 39i of the axial flow passage 39 relative to the inlet opening 39i is toward the rotation side in the circumferential direction Dc. As described above, in the process of flowing from the inner cavity 26 into the axial flow passage 39, the air reduces its circumferential velocity so that the relative circumferential velocity vr4 (=v4−V4>0) becomes zero. In this example, therefore, the inlet-side part including the inlet opening 39i of the axial flow passage 39 is formed so as to be directed toward the counter rotation side in the circumferential direction Dc as the inlet-side part extends toward the inlet opening 39i so that the air flowing toward the rotation side in the circumferential direction Dc relative to the inlet opening 39i is faced and received by the inlet opening 39i. Specifically, the inlet part of the axial flow passage 39 is inclined relative to the other part thereof at an inclination angle $\alpha4$ toward the counter rotation side (counter rotation direction side). More specifically, when the relative velocity of the air in the vicinity of the inlet opening 39di inside the inner cavity 26 is VA4, and the relative flow velocity of the air in the axial direction Da, which is a component in the axial direction of this relative velocity VA4, is vda, it is preferable that the equation $\tan^{-1}\alpha4=vr4/vda$ be satisfied. This inclination angle $\alpha4$ matches the direction of the vector of the relative flow velocity VA4. Compared with simply inclining the inlet-side part, selecting such an inclination angle $\alpha4$ can further reduce the pressure loss of the air in the process of flowing from the inner cavity 26 into the axial flow passage 39.

Figure 15:
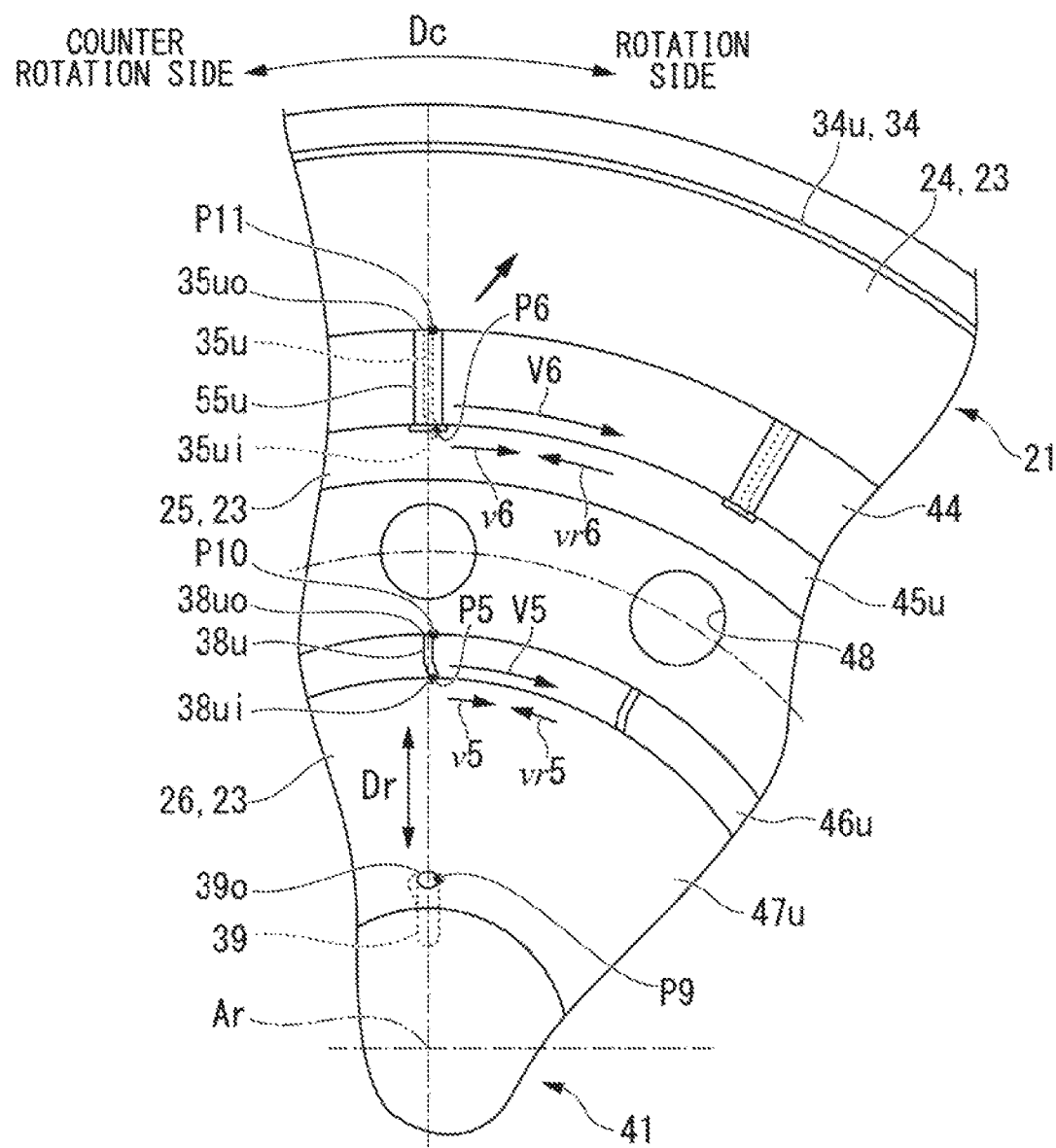
FIG. 15 is an arrow view corresponding to a view taken along the arrow XV in FIG. 11, showing the rotor disc in the first modified example of the second embodiment according to the present invention.
Figure 19:
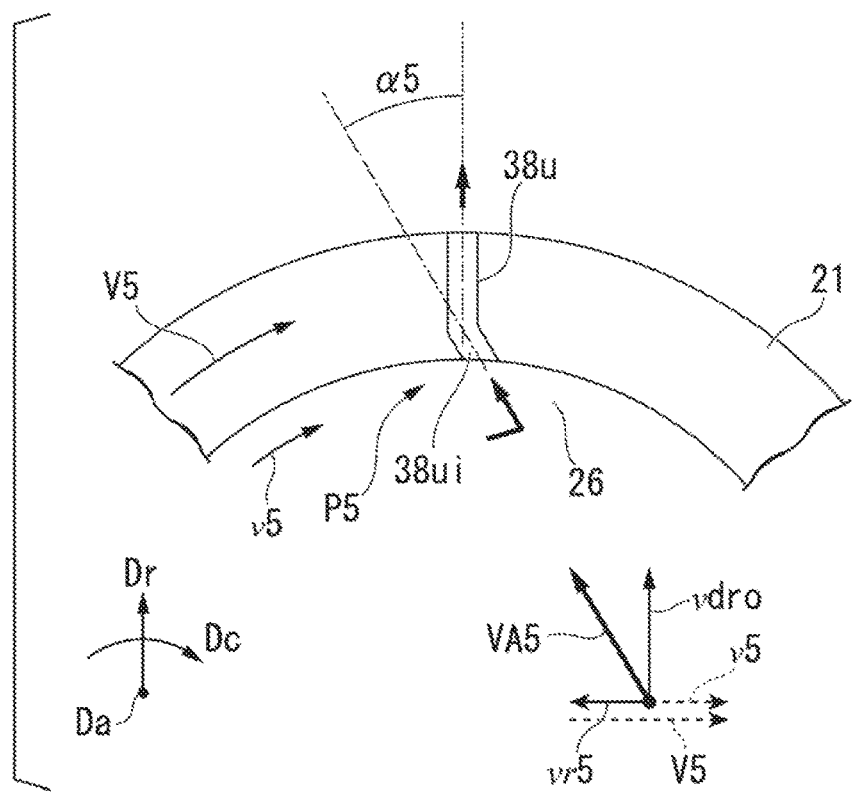
FIG. 19 is a schematic view showing details around the position P5 in FIG. 15.
Figure 20:
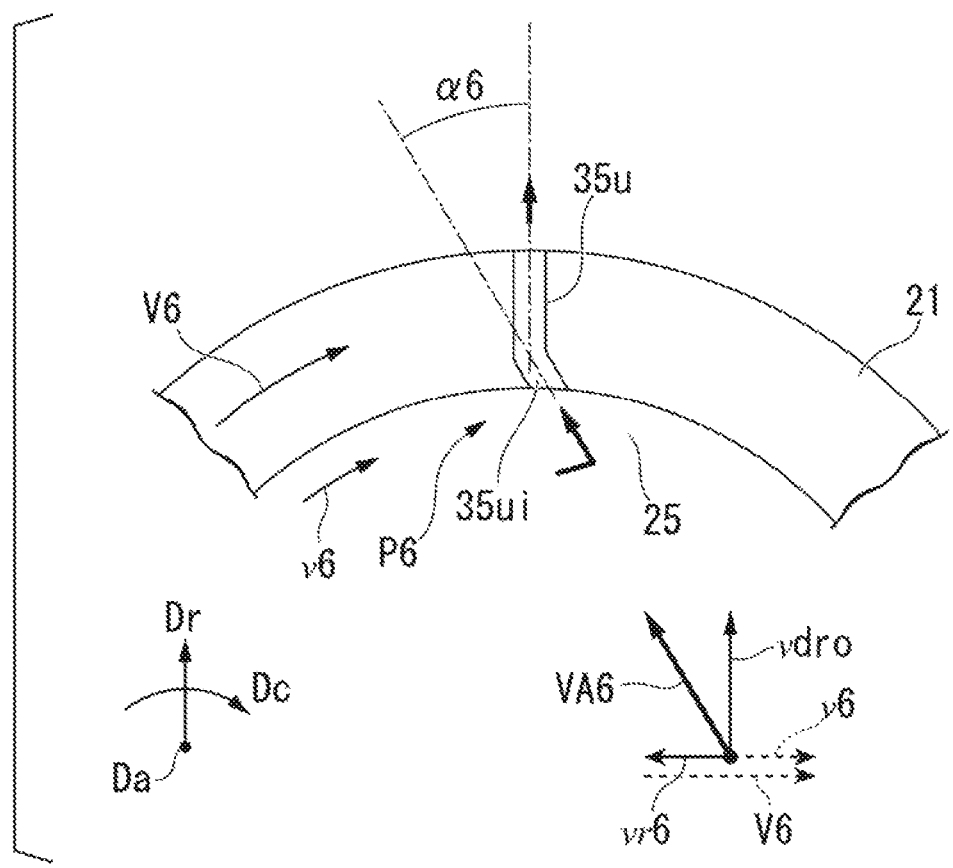
FIG. 20 is a schematic view showing details around the position P6 in FIG. 16 FIG. 15.

As shown in FIG. 15 and FIG. 19, in this modified example, an inlet-side part including an inlet opening 38ui that is an opening on the inner side in the radial direction Dr of a radially inner flow passage 38u that provides communication between the inner cavity 26 and the intermediate cavity 25 of the upstream-side cavity group 22u is formed so as to be directed toward the rotation side in the circumferential direction Dc as the inlet-side part extends toward the inlet opening 38ui. Moreover, as shown in FIG. 15 and FIG. 20, an inlet-side part including the inlet opening 35ui that is an opening on the inner side in the radial direction Dr of a radially intermediate flow passage 35u that provides communication between the intermediate cavity 25 and the outer cavity 24 of the upstream-side cavity group 22u is also formed so as to be directed toward the rotation side in the circumferential direction Dc as the inlet-side part extends toward the inlet opening 35ui. FIG. 15 is an arrow view of a main part of the rotor disc 41 of this modified example that is a modification of a view taken along the arrow XV in FIG. 11. In other words, FIG. 15 is a view of the rotor disc 41 of this modified example as seen in the axial direction Da from the upstream side toward the downstream side. Accordingly, the rotation side in the circumferential direction Dc depicted in FIG. 15 is the opposite side from the rotation side in the circumferential direction Dc depicted in FIG. 14. FIG. 19 is a schematic view showing details around the position P5 of the inlet opening 38ui of the radially inner flow passage 38u in FIG. 15. FIG. 20 is a schematic view showing details around the position P6 of the inlet opening 35ui of the radially intermediate flow passage 35u in FIG. 15.

As described above using FIG. 13, the circumferential velocity of the air decreases as the air flows through the inner cavity 26 of the upstream-side cavity group 22u toward the outer side in the radial direction Dr. Thus, at the point when the air reaches the end on the outer side in the radial direction Dr of the inner cavity 26, a circumferential velocity v5 of the air is lower than a circumferential velocity V5 of the inlet opening 38ui of the radially inner flow passage 38u.

Thus, as shown in FIG. 15 and FIG. 19, the direction of a relative circumferential velocity vr5 (=v5−V5<0) of the air flowing into the inlet opening 38ui of the radially inner flow passage 38u of the upstream-side cavity group 22u relative to the inlet opening 38ui is toward the counter rotation side in the circumferential direction Dc. As described above, in the process of flowing from the inner cavity 26 into the radially inner flow passage 38u, the air increases its circumferential velocity so that the relative circumferential velocity vr5 (=v5−V5<0) becomes zero. In this example, therefore, the inlet-side part including the inlet opening 38ui of the radially inner flow passage 38u is formed so as to be directed toward the rotation side in the circumferential direction Dc as the inlet-side part extends toward the inlet opening 38ui so that the air flowing toward the counter rotation side in the circumferential direction Dc relative to the inlet opening 38ui is faced and received by the inlet opening 38ui. Specifically, the inlet part of the radially inner flow passage 38u is inclined relative to the other part thereof at an inclination angle α5 toward the rotation side (rotation direction side). More specifically, when the relative velocity of the air in the vicinity of the inlet opening 38ui inside the inner cavity 26 is VA5, and the relative flow velocity of the air in the radial direction Dc, which is a component in the radial direction of this relative velocity VA5, is vdro, it is preferable that the equation $\tan^{-1}\alpha5=vr5/vdro$ be satisfied. This inclination angle α5 matches the direction of the vector of the relative flow velocity VA5. Compared with simply inclining the inlet-side part, selecting such an inclination angle α5 can further reduce the pressure loss of the air in the process of flowing from the inner cavity 26 into the radially inner flow passage 38u.

As described above using FIG. 13, the circumferential velocity of the air decreases as the air flows through the intermediate cavity 25 of the upstream-side cavity group 22u toward the outer side in the radial direction Dr. Thus, at the point when the air reaches the end on the outer side in the radial direction Dr of the intermediate cavity 25, a circumferential velocity v6 of the air is lower than a circumferential velocity V6 of the inlet opening 35ui of the radially intermediate flow passage 35u.

Thus, as shown in FIG. 15 and FIG. 20, the direction of a relative circumferential velocity vr6 (=v6−V6<0) of the air flowing into the inlet opening 35ui of the radially intermediate flow passage 35u of the upstream-side cavity group 22u relative to the inlet opening 35ui is toward the counter rotation side in the circumferential direction Dc. As described above, in the process of flowing from the intermediate cavity 25 into the radially intermediate flow passage 35u, the air increases its circumferential velocity so that the relative circumferential velocity vr6 (=v6−V6) becomes zero. In this example, therefore, the inlet-side part including the inlet opening 35ui of the radially intermediate flow passage 35u is formed so as to be directed toward the rotation side in the circumferential direction Dc as the inlet-side part extends toward the inlet opening 35ui so that the air flowing toward the counter rotation side in the circumferential direction Dc relative to the inlet opening 35ui is faced and received by the inlet opening 35ui. Specifically, the inlet part of the radially intermediate flow passage 35u is inclined relative to the other part thereof at an inclination angle α6 toward the rotation side (rotation direction side). More specifically, when the relative velocity of the air in the vicinity of the inlet opening 35ui inside the intermediate cavity 25 is VA6, and the relative flow velocity of the air in the radial direction Dc, which is a component in the radial direction of this relative velocity VA6, is vdro, it is preferable that the equation $\tan^{-1}\alpha6=vr6/vdro$ be satisfied. This inclination angle α6 matches the direction of the vector of the relative flow velocity VA6. Compared with simply inclining the inlet-side part, selecting such an inclination angle α6 can further reduce the pressure loss of the air in the process of flowing from the intermediate cavity 25 into the radially intermediate flow passage 35u.

Figure 22:
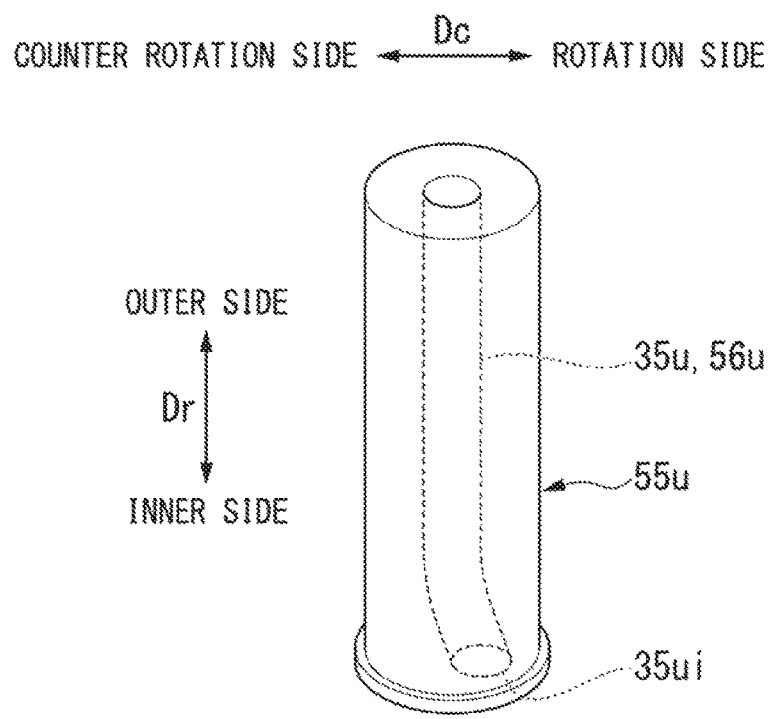
FIG. 22 is a perspective view of a torque pin of an upstream-side cavity group in the first modified example of the second embodiment according to the present invention.

In this embodiment, the radially intermediate flow passage 35u is formed inside a torque pin 55u. Accordingly, as shown in FIG. 22, a through-hole 56u of the torque pin 55u constituting the radially intermediate flow passage 35u is formed so that an inlet-side part including the inlet opening 35ui that is the opening on the inner side in the radial direction Dr is directed toward the rotation side in the circumferential direction Dc as the inlet-side part extends toward the inlet opening 35ui.

Although this modified example is a first modified example of the second embodiment, the same modifications may be made to the first embodiment.

Second Modified Example of Second Embodiment

Next, a second modified example of the second embodiment will be described with reference to FIG. 23 to FIG. 29.

This modified example is an example in which an outlet part of the radial flow passage or the axial flow passage is inclined toward the rotation direction side of the rotor shaft 21 or toward the counter rotation side opposite from the rotation direction side. In this example, the outlet parts of the flow passages, namely, the radial flow passages of the downstream-side cavity group 22d, the radial flow passages of the upstream-side cavity group 22u, and the axial flow passage, shown in the first modified example are open in the direction coinciding with the radial direction Dr or the axial direction Da, without being inclined relative to the rotation direction. However, these outlet parts may be inclined toward the rotation direction side or toward the opposite side from the rotation direction side (counter rotation side).

Figure 23:
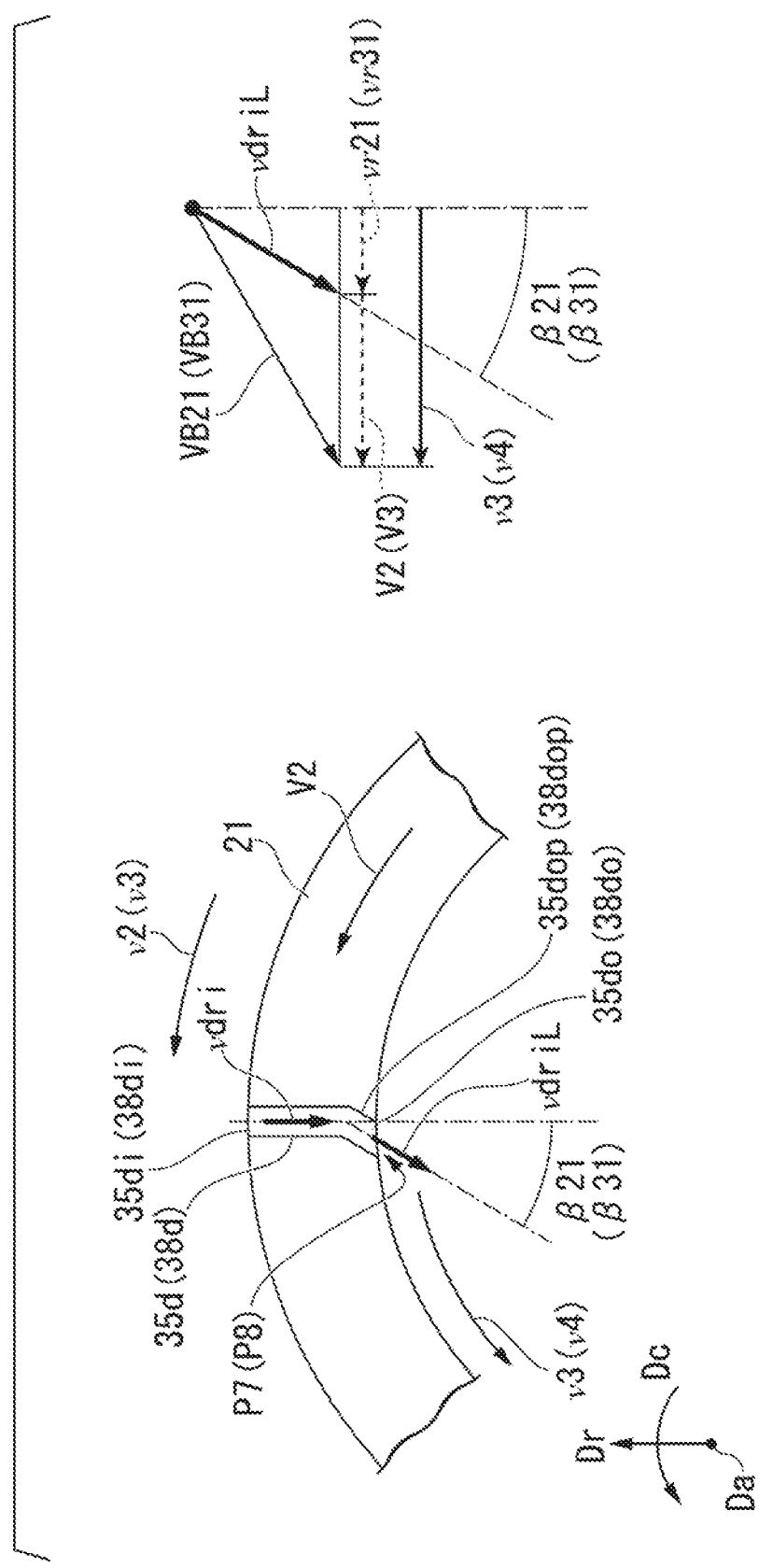
FIG. 23 is a schematic view showing details around the position P7 or P8 in FIG. 14 in a second modified example of the second embodiment according to the present invention.
Figure 24:
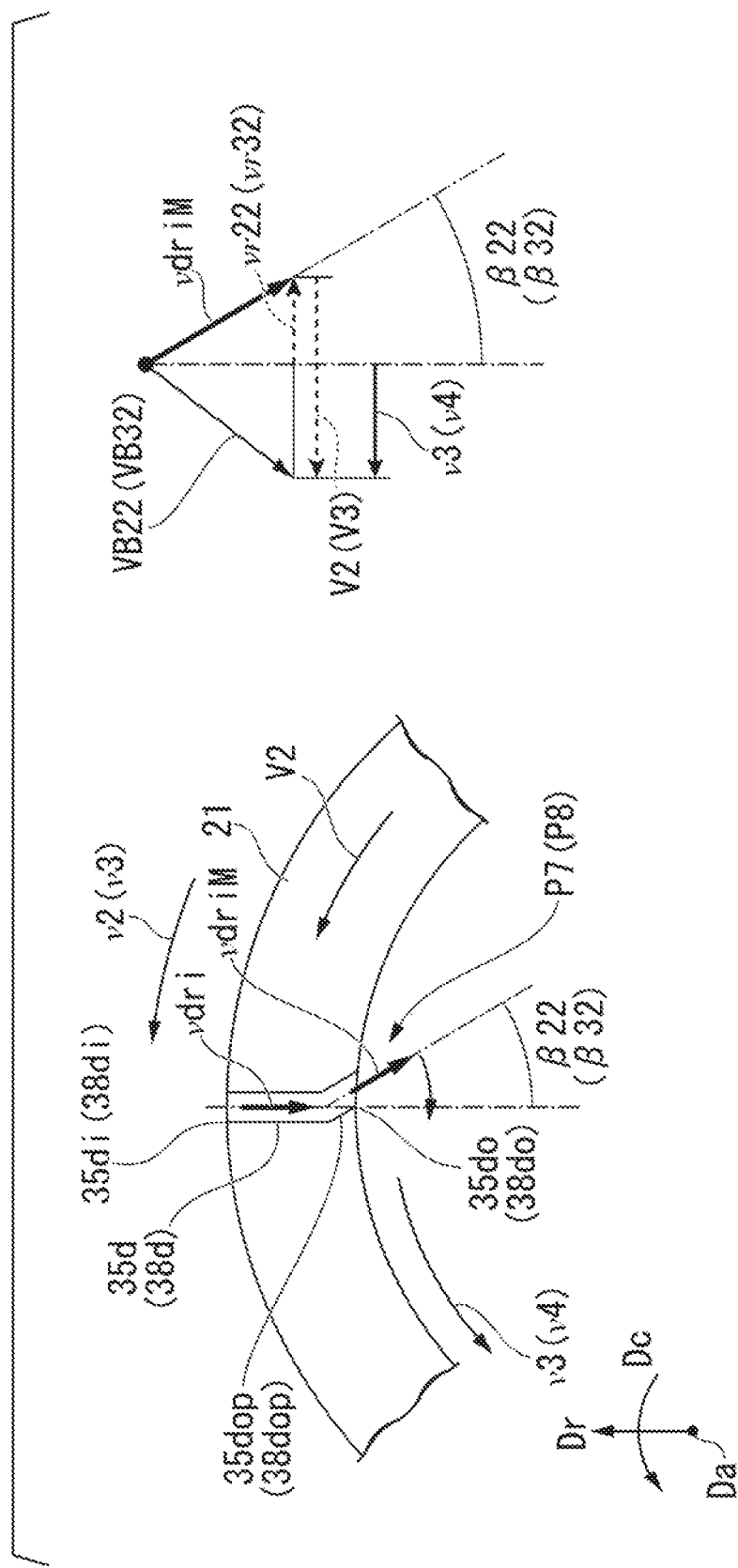
FIG. 24 is a schematic view showing details around the position P7 or P8 in FIG. 14 in another example of the second modified example of the second embodiment according to the present invention.

FIG. 23 shows an example in which an outlet-side part 35*dop* including an outlet opening 35*do* on the radially inner side of the radially intermediate flow passage 35*d* of the downstream-side cavity group 22*d* is inclined toward the rotation direction side. FIG. 24 shows an example in which the outlet-side part 35*dop* including the outlet opening 35*do* of the radially intermediate flow passage 35*d* is inclined toward the counter rotation side opposite from the rotation direction side. FIG. 23 and FIG. 24 are schematic views showing details around the position P7 of the outlet opening 35*do* of the radially intermediate flow passage 35*d* in FIG. 14.

As shown in FIG. 23, if the outlet-side part 35*dop* of the radially intermediate flow passage 35*d* is inclined relative to the other part of the radially intermediate flow passage 35*d* at an inclination angle β21 toward the rotation direction side, the air flowing through an intermediate part of the radially intermediate flow passage 35*d* flows at a circumferential velocity V2 and a radial velocity vdri. With the outlet-side part 35*dop* of the radially intermediate flow passage 35*d* thus inclined at the inclination angle β21 toward the rotation direction side, the axial velocity at the inclined outlet-side part 35*dop* (the velocity in the axial direction of the flow passage at the outlet-side part 35*dop*) becomes vdriL. A velocity component (relative circumferential velocity) vr21 in the circumferential direction Dc of the axial velocity vdriL of the outlet-side part 35*dop* is added to the circumferential velocity V2 of the air. Thus, at the outlet-side part 35*dop* of the radially intermediate flow passage 35*d*, the circumferential velocity of the air becomes V3 (V2+vr21). Specifically, the air immediately after flowing from the outlet-side part 35*dop* into the intermediate cavity 25 (axial communication cavity) flows toward the inner side in the radial direction Dr at the circumferential velocity V3 that is higher by the difference in circumferential velocity vr21 from the intermediate cavity 25. As the air flows through the intermediate cavity 25 toward the inner side in the radial direction Dr, the circumferential velocity of the air increases by the law of conservation of angular momentum. Thus, as the air flows toward the inner side in the radial direction Dr, the difference in circumferential velocity from the intermediate cavity 25 increases and the pressure loss occurring when the air flows into the radially inner flow passage 38*d* increases, but the heat transfer coefficient between the air and the intermediate cavity 25 is increased and heat transfer is promoted.

By contrast, as shown in FIG. 24, if the outlet-side part 35*dop* of the radially intermediate flow passage 35*d* is inclined relative to the other part of the radially intermediate flow passage 35*d* at an inclination angle 1322 toward the counter rotation side, the air flowing through the intermediate part of the radially intermediate flow passage 35*d* flows at the circumferential velocity V2 and the radial velocity vdri. With the outlet-side part 35*dop* on the inner side in the radial direction Dr of the radially intermediate flow passage 35*d* thus inclined at the inclination angle β22 toward the counter rotation side in the opposite direction from the rotation direction side, the axial velocity at the inclined outlet-side part 35*dop* (the velocity in the axial direction of the flow passage at the outlet-side part 35*dop*) becomes vdriM. At the outlet-side part 35*dop*, the circumferential velocity of the air decreases by a velocity component (relative circumferential velocity) vr22 in the circumferential direction Dc of the axial velocity vdriM of the outlet-side part 35*dop*. Thus, at the outlet-side part 35*dop* of the radially intermediate flow passage 35*d*, the circumferential velocity of the air becomes V3 (V2−vr22). Specifically, the air immediately after flowing from the outlet-side part 35*dop* into the intermediate cavity 25 (axial communication cavity) flows toward the inner side in the radial direction Dr at a circumferential velocity that is lower than the circumferential velocity V2 of the air inside the radially intermediate flow passage 35*d* by the difference in circumferential velocity vr22 from the intermediate cavity 25. As the air flows through the intermediate cavity 25 toward the inner side in the radial direction Dr, the circumferential velocity of the air increases by the law of conservation of angular momentum. On the other hand, the circumferential velocity of the intermediate cavity 25 decreases toward the inner side in the radial direction Dr. Thus, in the process of the air flowing through the intermediate cavity 25 toward the inner side in the radial direction Dr, the difference in circumferential velocity between the air and the intermediate cavity 25 decreases gradually. As the difference in circumferential velocity between the air and the intermediate cavity 25 decreases, the heat transfer coefficient between the air and the intermediate cavity 25 decreases. However, if a position at which the difference in the circumferential velocities of the intermediate cavity 25 and the air become low in the inlet opening 38*di* of the radially inner flow passage 38*d* into which the air flows from the intermediate cavity 25 is selected, the pressure loss occurring when the air flows from the intermediate cavity 25 into the inlet opening 38*di* of the radially inner flow passage 38*d* can be significantly reduced.

FIG. 23 also shows an example in which an outlet-side part 38*dop* including an outlet opening 38*do* of the radially inner flow passage 38*d* is inclined relative to the other part of the radially inner flow passage 38*d* at an inclination angle β31 toward the rotation direction side. In FIG. 23, reference signs related to the radially inner flow passage 38*d* are indicated in parentheses. The parts in the parentheses of FIG. 23 are those of a schematic view showing details around the position P8 of the outlet opening 35*do* outlet opening 38*do* of the radially intermediate flow passage 35*d* radially inner flow passage 38*d* in FIG. 14. The concept of the circumferential velocity of the air flowing from the radially inner flow passage 38*d* into the inner cavity 26 is the same as that of the flow of air flowing through the radially intermediate flow passage 35*d*. The heat transfer coefficient increases as the difference in circumferential velocity between the air and the inner cavity 26 increases in the process in which the air having flowed from the radially inner flow passage 38*d* into the inner cavity 26 flows toward the inner side in the radial direction Dr. This is the same effect as the effect produced by the flow of air flowing from the radially intermediate flow passage 35*d* into the intermediate cavity 25.

FIG. 24 also shows an example in which the outlet-side part 38*dop* of the radially inner flow passage 38*d* is inclined relative to the other part of the radially inner flow passage 38*d* at an inclination angle β32 toward the counter rotation direction side. In FIG. 24, reference signs related to the radially inner flow passage 38*d* are indicated in parentheses. The parts in the parentheses of FIG. 24 are those of a schematic view showing details around the position P8 of the outlet opening 35*do* of the radially intermediate flow passage 35*d* in FIG. 14. The concept of the circumferential velocity of the air flowing from the radially inner flow passage 38*d* into the inner cavity 26 in this case is the same as that of the flow of air flowing through the radially intermediate flow passage 35d. The pressure loss is reduced as the circumferential velocity of the air changes when the air flows into the axial flow passage 39. This is the same effect as the effect produced by the flow of air flowing from the radially intermediate flow passage 35d into the intermediate cavity 25.

Figure 25:
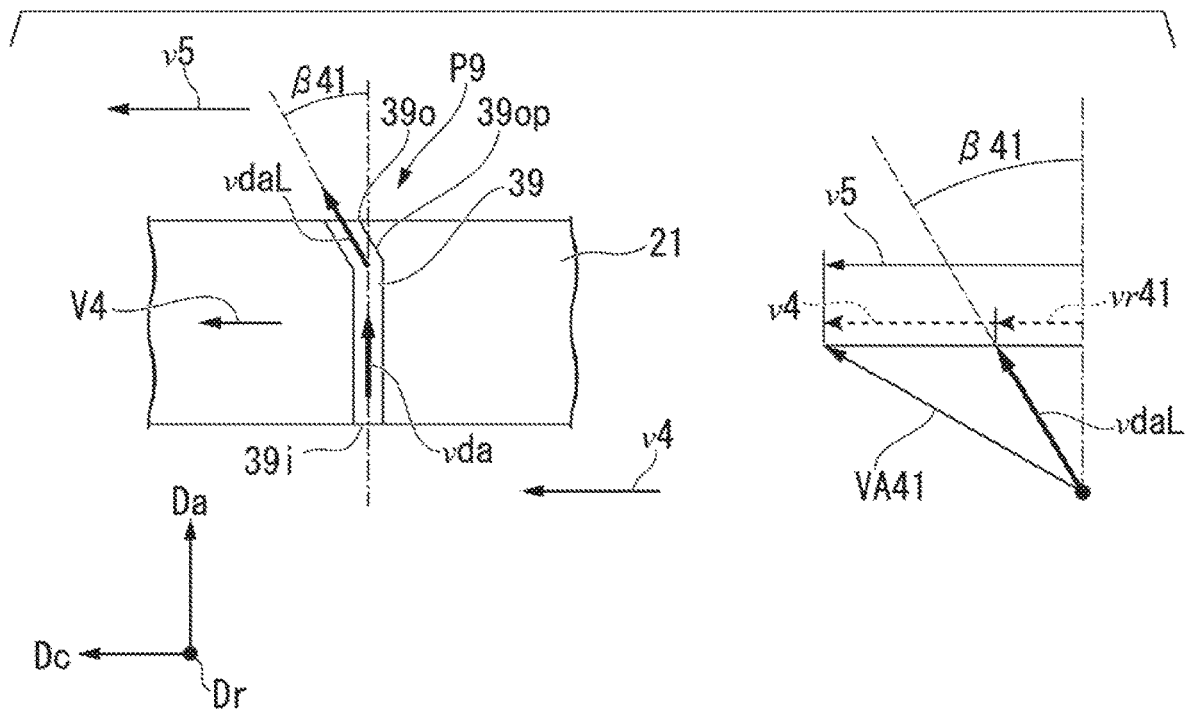
FIG. 25 is a schematic view showing details around the position P9 in FIG. 15 in the second modified example of the second embodiment according to the present invention.
Figure 26:
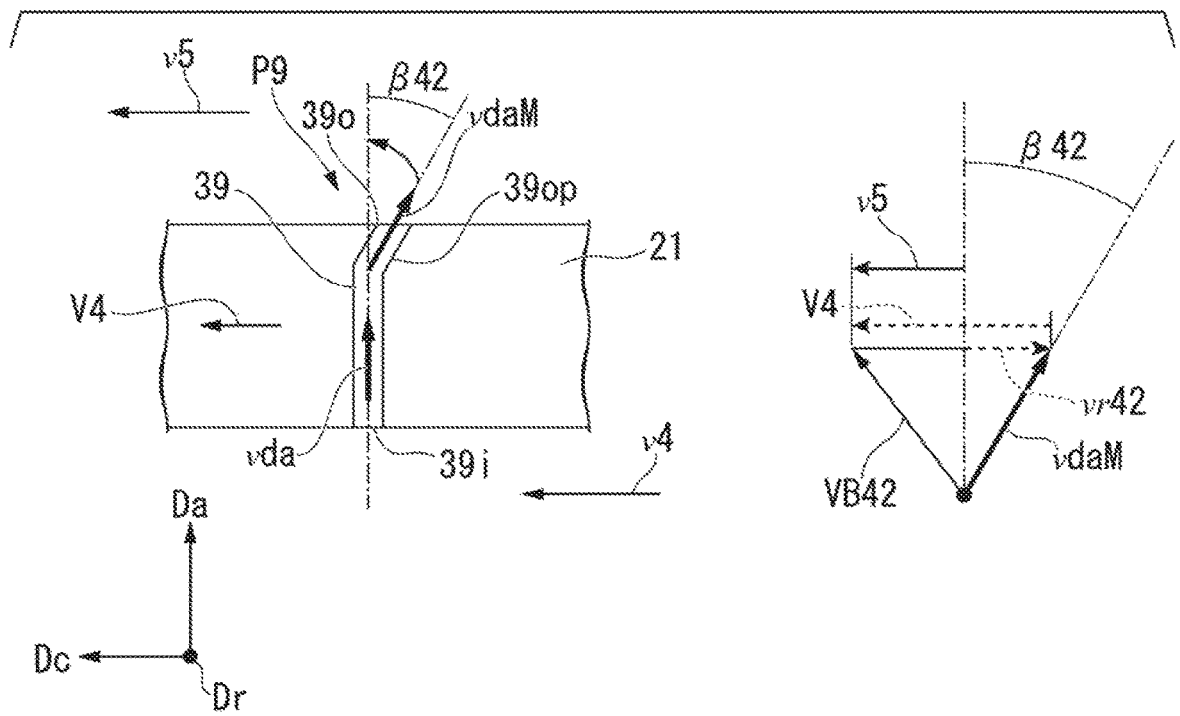
FIG. 26 is a schematic view showing details around the position P9 in FIG. 15 in another example of the second modified example of the second embodiment according to the present invention.

FIG. 25 shows an example in which an outlet-side part 39op including the outlet opening 39o on the upstream side (the upstream side in the axial direction Da) of the axial flow passage 39 of the downstream-side cavity group 22d is inclined toward the rotation direction side relative to the other part of the axial flow passage 39. FIG. 26 shows an example in which the outlet-side part 39op of the axial flow passage 39 is inclined toward the counter rotation side opposite from the rotation direction side. FIG. 25 and FIG. 26 are schematic views showing details around the position P9 of the outlet opening 39o of the axial flow passage 39 in FIG. 15.

As shown in FIG. 25, if the outlet-side part 39op of the axial flow passage 39 is inclined relative to the other part of the axial flow passage 39 at an inclination angle β41 toward the rotation direction side, the air flowing through an intermediate part of the axial flow passage 39 flows at a circumferential velocity V4 and an axial velocity (the velocity inside the flow passage in the axial direction Da) vda. With the outlet-side part 39op of the axial flow passage 39 thus inclined at the inclination angle β41 toward the rotation direction side, the axial velocity of the air at the inclined outlet-side part 39op (the velocity in the flow passage direction inside the flow passage at the outlet-side part 35dop) becomes vdaL. A velocity component (relative circumferential velocity) vr41 in the circumferential direction Dc of the axial velocity vdaL of the outlet-side part 39op is added to the circumferential velocity V4 of the air. Thus, at the outlet-side part 39op of the axial flow passage 39, the circumferential velocity of the air becomes V5 (V4+vr41). Specifically, the air immediately after flowing from the outlet-side part 39op into the inner cavity 26 flows through the inner cavity 26 toward the outer side in the radial direction Dr at the circumferential velocity V5 that is higher by the difference in circumferential velocity vr41 from the inner cavity 26. As the air flows through the inner cavity 26 toward the outer side in the radial direction Dr, the circumferential velocity of the air decreases gradually by the law of conservation of angular momentum. On the other hand, the circumferential velocity of the inner cavity 26 increases toward the outer side in the radial direction Dr. Thus, in the process of the air flowing through the inner cavity 26 toward the outer side in the radial direction Dr, the difference in circumferential velocity between the air and the inner cavity 26 decreases gradually. As the difference in circumferential velocity between the air and the inner cavity 26 decreases, the heat transfer coefficient between the air and the inner cavity 26 decreases. However, if a position of the radially inner flow passage 38d at which the difference in circumferential velocity between the inner cavity 26 and the air becomes small in the inlet opening 38ui of the radially inner flow passage 38u into which the air flows from the inner cavity 26 is selected, the pressure loss occurring when the air flows from the inner cavity 26 into the inlet opening 38ui of the radially inner flow passage 38u can be significantly reduced.

By contrast, as shown in FIG. 26, if the outlet-side part 39op of the axial flow passage 39 is inclined relative to the other part of the axial flow passage 39 at an inclination angle β42 toward the counter rotation side, the air flowing through the intermediate part of the axial flow passage 39 flows at the circumferential velocity V4 and the axial velocity (the velocity inside the flow passage in the axial direction Da) vda. With the outlet-side part 39op of the axial flow passage 39 thus inclined at the inclination angle β42 toward the counter rotation side, the axial velocity of the air at the inclined outlet-side part 39op (the velocity in the flow passage direction inside the flow passage at the outlet-side part 39o) becomes vdaM. The circumferential velocity of the air decreases by a velocity component (relative circumferential velocity) vr42 in the circumferential direction Dc of the axial velocity vdaM of the outlet-side part 39o. Thus, at the outlet-side part 39op of the axial flow passage 39, the circumferential velocity of the air becomes V5 (V4−vr42). Specifically, the air immediately after flowing from the outlet-side part 39o of the axial flow passage 39 into the inner cavity 26 flows through the inner cavity 26 toward the outer side in the radial direction Dr at a circumferential velocity that is lower than the circumferential velocity V4 of the air inside the axial flow passage 39 by the difference in circumferential velocity vr42 from the inner cavity 26. As the air flows through the inner cavity 26 toward the outer side in the radial direction Dr, the circumferential velocity of the air decreases by the law of conservation of angular momentum. On the other hand, the circumferential velocity of the inner cavity 26 increases toward the outer side in the radial direction Dr. Accordingly, in the process of the air flowing through the inner cavity 26 toward the outer side in the radial direction Dr, the difference in circumferential velocity between the air and the inner cavity 26 increases. Thus, as the air flows toward the outer side in the radial direction Dr, the difference in circumferential velocity between the air and the inner cavity 26 increases and the pressure loss occurring when the air flows into the radially inner flow passage 38u increases, but the heat transfer coefficient between the air and the inner cavity 26 is increased and heat transfer is promoted.

Figure 27:
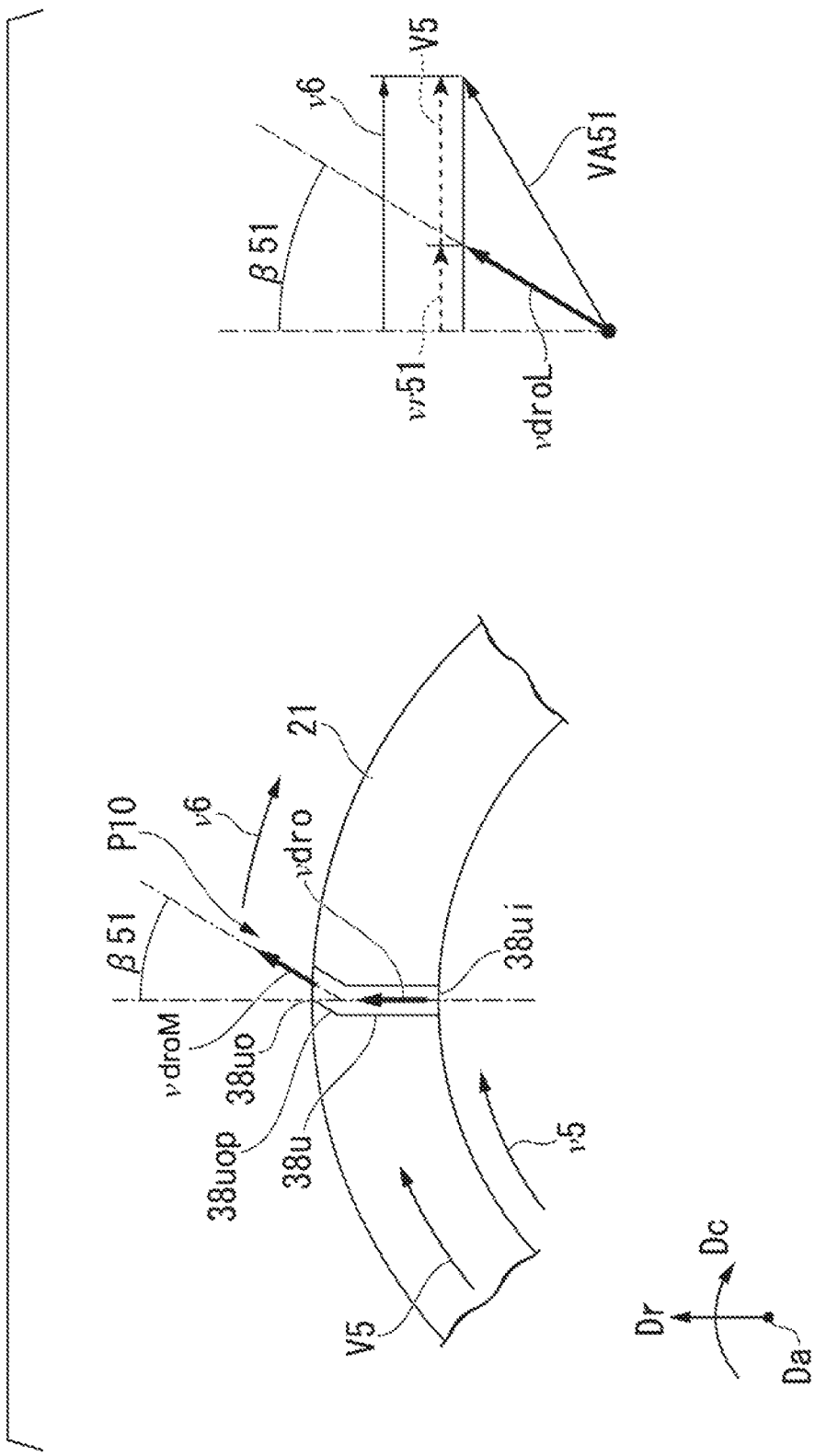
FIG. 27 is a schematic view showing details around the position P10 in FIG. 15 in the second modified example of the second embodiment according to the present invention.
Figure 28:
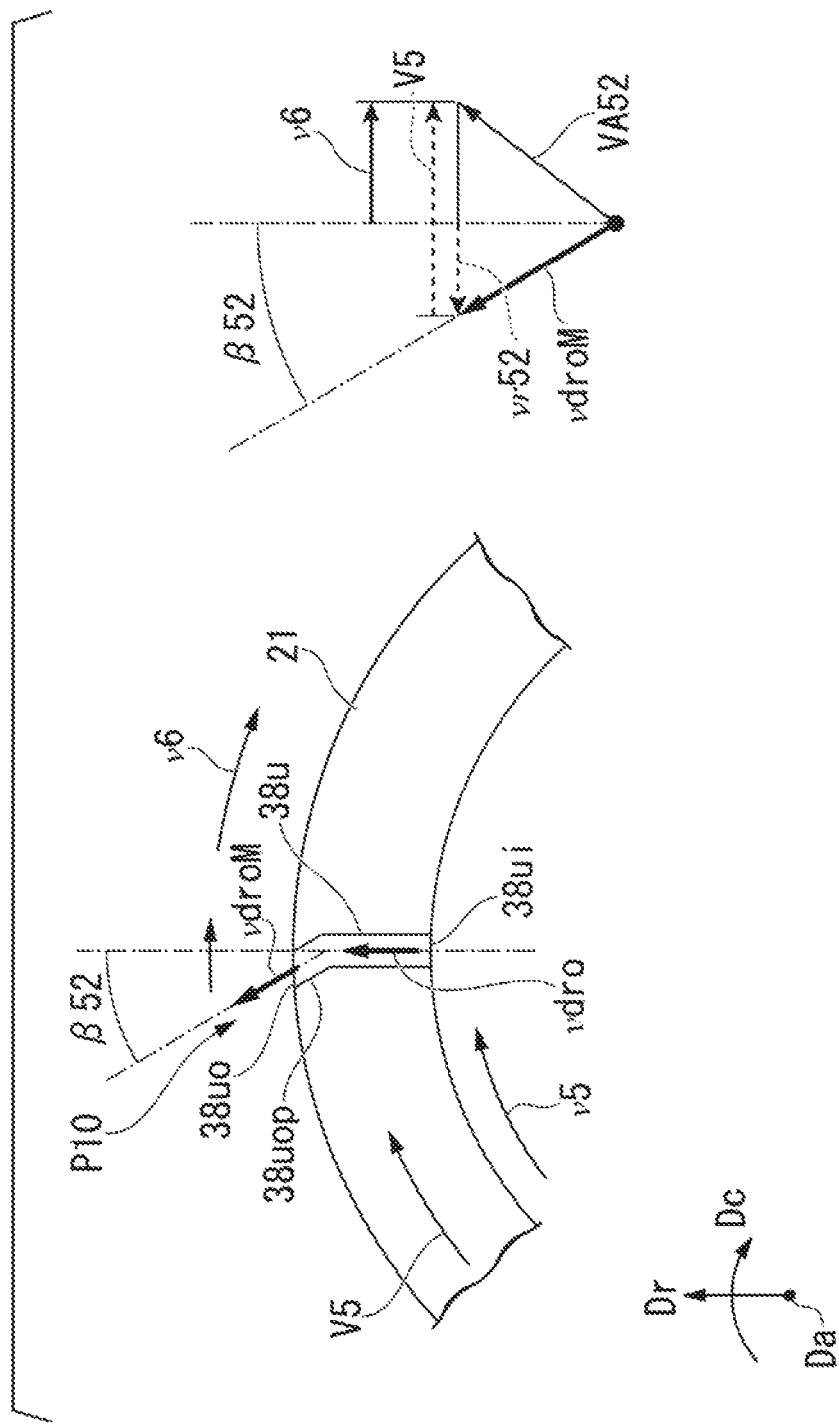
FIG. 28 is a schematic view showing details around the position P10 in FIG. 15 in another example of the second modified example of the second embodiment according to the present invention.

FIG. 27 shows an example in which an outlet-side part 38uop including an outlet opening 38uo of the radially inner flow passage 38u of the upstream-side cavity group 22u is inclined toward the rotation direction side relative to the other part of the radially inner flow passage 38u. FIG. 28 shows an example in which the outlet-side part 38uop of the radially inner flow passage 38u is inclined toward the counter rotation side opposite from the rotation direction side relative to the other part of the radially inner flow passage 38u. FIG. 27 and FIG. 28 are schematic views showing details around the position P10 of the outlet opening 38uo of the radially inner flow passage 38u in FIG. 15.

As shown in FIG. 27, if the outlet-side part 38uop of the radially inner flow passage 38u is inclined relative to the other part of the radially inner flow passage 38u at an inclination angle β51 toward the rotation direction side, the air flowing through an intermediate part of the radially inner flow passage 38u flows at a circumferential velocity V5 and a radial velocity vdro. With the outlet-side part 38uop of the radially inner flow passage 38u thus inclined at the inclination angle β51 toward the rotation direction side, the axial velocity of the air at the inclined outlet-side part 38uop (the velocity in the flow passage direction inside the flow passage at the outlet-side part 38uop) becomes vdroM. A velocity component (relative circumferential velocity) vr51 in the circumferential direction Dc of the axial velocity vdroM of the outlet-side part 38uop is added to the circumferential velocity V5 of the air. Thus, at the outlet-side part 38uop of the radially inner flow passage 38u, the circumferential velocity of the air becomes V6 (V5+vr51). Specifically, the air immediately after flowing from the outlet-side part 38*uop* into the intermediate cavity 25 (axial communication cavity) flows toward the outer side in the radial direction Dr at the circumferential velocity V6 that is higher by the difference in circumferential velocity vr51 from the intermediate cavity 25. As the air flows through the intermediate cavity 25 toward the outer side in the radial direction Dr, the circumferential velocity of the air decreases by the law of conservation of angular momentum. On the other hand, the circumferential velocity of the intermediate cavity 25 increases toward the outer side in the radial direction Dr. Thus, in the process of the air flowing through the intermediate cavity 25 toward the outer side in the radial direction Dr, the difference in circumferential velocity between the air and the intermediate cavity 25 decreases gradually. As the difference in circumferential velocity between the air and the intermediate cavity 25 decreases, the heat transfer coefficient between the air and the intermediate cavity 25 decreases. However, if a position of the radially intermediate flow passage 35*u* at which the difference in circumferential velocity between the intermediate cavity 25 and the air becomes small in the inlet opening 35*ui* of the radially intermediate flow passage 35*u* into which the air flows from the intermediate cavity 25 is selected, the pressure loss occurring when the air flows from the intermediate cavity 25 into the inlet opening 35*ui* of the radially intermediate flow passage 35*u* can be significantly reduced.

By contrast, as shown in FIG. 28, if the outlet-side part 38*uop* of the radially inner flow passage 38*u* is inclined relative to the other part of the radially inner flow passage 38*u* at an inclination angle β52 toward the counter rotation side, the air flowing through the intermediate part of the radially inner flow passage 38*u* flows at the circumferential velocity V5 and the radial velocity vdro. With the outlet-side part 38*uop* of the radially inner flow passage 38*u* thus inclined at the inclination angle β52, the axial velocity of the air at the inclined outlet-side part 38*uop* (the velocity in the flow passage direction inside the flow passage at the outlet-side part 38*uop*) becomes vdroM. The circumferential velocity of the air decreases by a velocity component (relative circumferential velocity) vr52 in the circumferential direction Dc of the axial velocity vdroM of the outlet-side part 38*uop*. Thus, at the outlet-side part 38*uop* of the radially inner flow passage 38*u*, the circumferential velocity of the air becomes V6 (V5−vr52). Specifically, the air immediately after flowing from the outlet-side part 38*uop* of the radially inner flow passage 38*u* into the intermediate cavity 25 flows through the inner cavity 26 toward the outer side in the radial direction Dr at the circumferential velocity V6 that is lower than the circumferential velocity V5 of the air inside the radially inner flow passage 38*u* by the difference in circumferential velocity vr52 from the intermediate cavity 25. As the air flows through the intermediate cavity 25 toward the outer side in the radial direction Dr, the circumferential velocity of the air decreases by the law of conservation of angular momentum. On the other hand, the circumferential velocity of the intermediate cavity 25 increases toward the outer side in the radial direction Dr. Accordingly, as the air flows through the intermediate cavity 25 toward the outer side in the radial direction Dr, the difference in circumferential velocity between the air and the intermediate cavity 25 increases. Thus, as the air flows through the intermediate cavity 25 toward the outer side in the radial direction Dr, the difference in circumferential velocity between the air and the intermediate cavity 25 increases and the pressure loss occurring when the air flows into the radially intermediate flow passage 35*u* increases, but the heat transfer coefficient between the air and the intermediate cavity 25 is increased and heat transfer is promoted.

Figure 29:
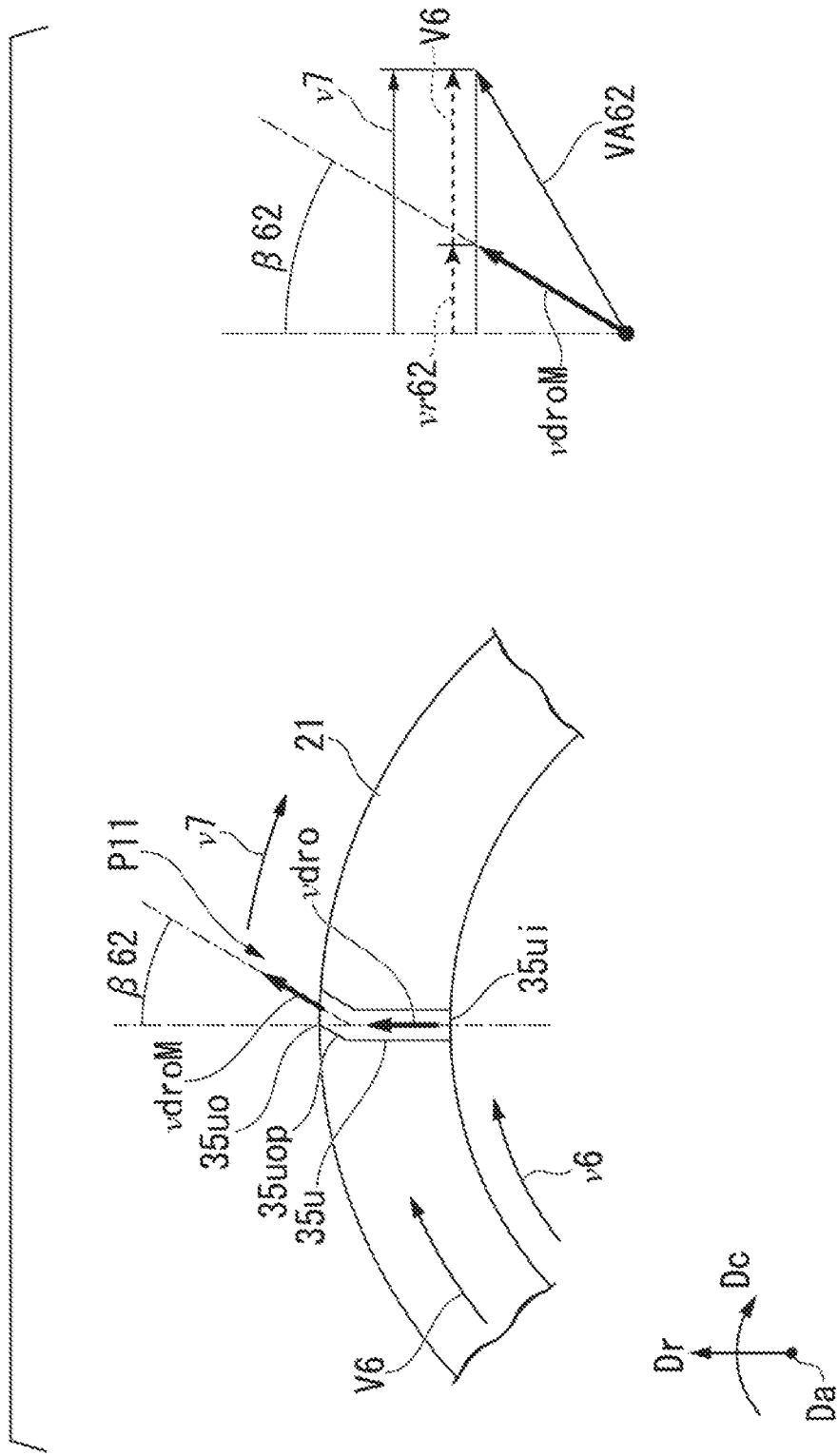
FIG. 29 is a schematic view showing details around the position P11 in FIG. 15 in the second modified example of the second embodiment according to the present invention.

FIG. 29 shows an example in which an outlet-side part 35*uop* including an outlet opening 35*uo* of the radially intermediate flow passage 35*u* of the upstream-side cavity group 22*u* is inclined toward the rotation direction side relative to the other part of the radially intermediate flow passage 35*u*. FIG. 29 is a schematic view showing details around the position P11 of the outlet opening 35*uo* of the radially intermediate flow passage 35*u* in FIG. 15.

As shown in FIG. 29, if the outlet-side part 35*uop* of the radially intermediate flow passage 35*u* is inclined relative to the other part of the radially intermediate flow passage 35*u* at an inclination angle β62 toward the counter rotation side, the air flowing through the intermediate part of the radially inner flow passage 38*u* flows at a circumferential velocity V6 and a radial velocity vdro. With the outlet-side part 35*uop* of the radially intermediate flow passage 35*u* thus inclined at the inclination angle β62 toward the counter rotation side in the opposite direction from the rotation direction side, the axial velocity of the air at the inclined outlet-side part 35*uop* (the velocity in the flow passage direction inside the flow passage at the outlet-side part 35*uop*) becomes vdroM. The circumferential velocity of the air decreases by a velocity component (relative circumferential velocity) vr62 in the circumferential direction Dc of the axial velocity vdroM of the outlet-side part 35*uop*. Thus, at the outlet-side part 35*uop* of the radially intermediate flow passage 35*u*, the circumferential velocity of the air becomes V7 (V6−vr62). Specifically, the air immediately after flowing from the outlet-side part 35*uop* of the radially intermediate flow passage 35*u* into the outer cavity 24 flows through the outer cavity 24 toward the outer side in the radial direction Dr at the circumferential velocity V7 that is lower than the circumferential velocity V6 of the air inside the radially intermediate flow passage 35*u* by the difference in circumferential velocity vr62 from the outer cavity 24. As the air flows through the outer cavity 24 toward the outer side in the radial direction Dr, the circumferential velocity of the air decreases by the law of conservation of angular momentum. On the other hand, the circumferential velocity of the outer cavity 24 increases toward the outer side in the radial direction Dr. Accordingly, as the air flows through the outer cavity 24 toward the outer side in the radial direction Dr, the difference in circumferential velocity between the air and the outer cavity 24 increases. Thus, as the air flows through the outer cavity 24 toward the outer side in the radial direction Dr, the difference in circumferential velocity between the air and the outer cavity 24 increases, so that the heat transfer coefficient between the air and the outer cavity 24 is increased and heat transfer is promoted.

As has been described above, the effect produced by inclining the outlet part of the radial flow passage in either direction relative to the rotation direction (toward the rotation direction side or the counter rotation direction side) differs between the upstream-side cavity group 22*u* and the downstream-side cavity group 22*d*. Specifically, in the case where the outlet-side part 35*dop* of the radially intermediate flow passage 35*d* or the outlet-side part 38*dop* of the radially inner flow passage 38*d* of the downstream-side cavity group 22*d* is inclined toward the rotation direction side, the difference in circumferential velocity between the air and the intermediate cavity 25 or the inner cavity 26 increases. Thus, in this case, heat transfer is promoted between the air and the intermediate cavity 25 or the inner cavity 26, so that the thermal responsiveness of the intermediate cavity 25 or the inner cavity 26 can be improved.

In the case where the outlet-side part 35$dop$ of the radially intermediate flow passage 35$d$ or the outlet-side part 38$dop$ of the radially inner flow passage 38$d$ of the downstream-side cavity group 22$d$ is inclined toward the counter rotation side, the difference in circumferential velocity between the air and the intermediate cavity 25 or the inner cavity 26 decreases. Thus, in this case, the pressure loss occurring when the air flows from the intermediate cavity 25 into the inlet opening 38$di$ of the radially inner flow passage 38$d$ or from the inner cavity 26 into the inlet opening 39$i$ of the axial flow passage 39 can be significantly reduced.

By contrast, in the case where the outlet-side part 38$uop$ of the radially inner flow passage 38$u$ of the upstream-side cavity group 22$u$ or the outlet-side part 39$op$ of the axial flow passage 39 is inclined toward the rotation direction side, the difference in circumferential velocity between the air and the intermediate cavity 25 or between the air and the inner cavity 26 decreases. Thus, in this case, the pressure loss occurring when the air flows from the intermediate cavity 25 into the inlet opening 35$ui$ of the radially intermediate flow passage 35$u$ or from the inner cavity 26 into the inlet opening 38$ui$ of the radially inner flow passage 38$u$ can be significantly reduced.

In the case where the outlet-side part 35$uop$ of the radially intermediate flow passage 35$u$ of the upstream-side cavity group 22$u$, the outlet-side part 38$uop$ of the radially inner flow passage 38$u$ of the upstream-side cavity group 22$u$, or the outlet-side part 39$op$ of the axial flow passage 39 is inclined toward the counter rotation side, the difference in circumferential velocity between the air and the outer cavity 24, between the air and the intermediate cavity 25, or between the air and the inner cavity 26 increases. Thus, in this case, heat transfer is promoted between the air and the outer cavity 24, the intermediate cavity 25, or the inner cavity 26, so that the thermal responsiveness of the outer cavity 24, the intermediate cavity 25, or the inner cavity 26 can be improved.

Thus, the combination of the direction and the angle of inclination, relative to the rotation direction, of the inlet-side part or the outlet-side part of the radial flow passages (the radially intermediate flow passages 35$d$, 35$u$ and the radially inner flow passages 38$d$, 38$u$) of the upstream-side cavity group 22$u$ and the downstream-side cavity group 22$d$ and those of the axial flow passages 37, 39 can be appropriately selected, with the performance and the structure of the compressor taken into account, so that the highest thermal responsiveness can be achieved.

Although this modified example is a second modified example of the second embodiment, the same modifications may be made to the first embodiment. In addition, the first modified example and the second modified example may be appropriately combined.

Third Modified Example of Second Embodiment

Figure 30:
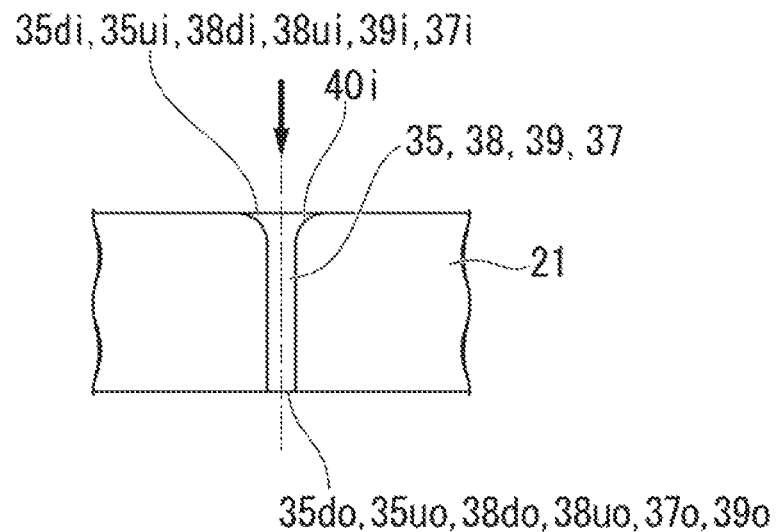
FIG. 30 is a sectional view of a radial flow passage or an axial flow passage in a third modified example of the second embodiment according to the present invention.
Figure 31:
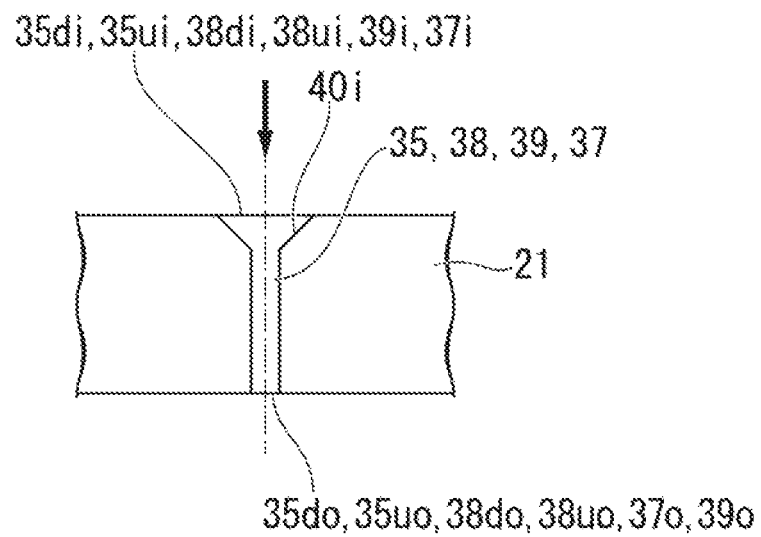
FIG. 31 is a sectional view of the radial flow passage or the axial flow passage in another example of the third modified example of the second embodiment according to the present invention.

According to FIG. 30 and FIG. 31, the inlet-side parts of the radial flow passages (the radially intermediate flow passages 35$d$, 35$u$ and the radially inner flow passages 38$d$, 38$u$) or the axial flow passages 37, 39 may be formed so that the flow passage inside diameter decreases in a direction from the inlet opening toward the outlet opening. Specifically, FIG. 30 shows these flow passages having a bell-mouthed inlet, of which a surface defining an inlet flow passage is an inclined surface 40$i$ that is curved when seen in a cross-section parallel to a longitudinal direction of the flow passage. FIG. 31 shows these flow passages having a funnel-shaped inlet, of which a surface defining the inlet shape is an inclined surface 40$i$ that is linearly inclined when seen in a cross-section parallel to the longitudinal direction of the flow passage. If the inlet has such shapes, no disturbance occurs in the flow of air when the air flows into the flow passage, so that the pressure loss can be reduced.

Although this modified example is a third modified example of the second embodiment, the same modifications may be made to the first embodiment. In addition, the first modified example, the second modified example, and the third modified example may be appropriately combined.

Other Modified Examples of First Embodiment

Other modified examples of the first embodiment will be described with reference to FIG. 32.

In the first and second embodiments, two cavity groups 22 adjacent to each other in the axial direction Da make a set. However, three or more cavity groups 22 adjacent to one another in the axial direction Da may make a set.

Figure 32:
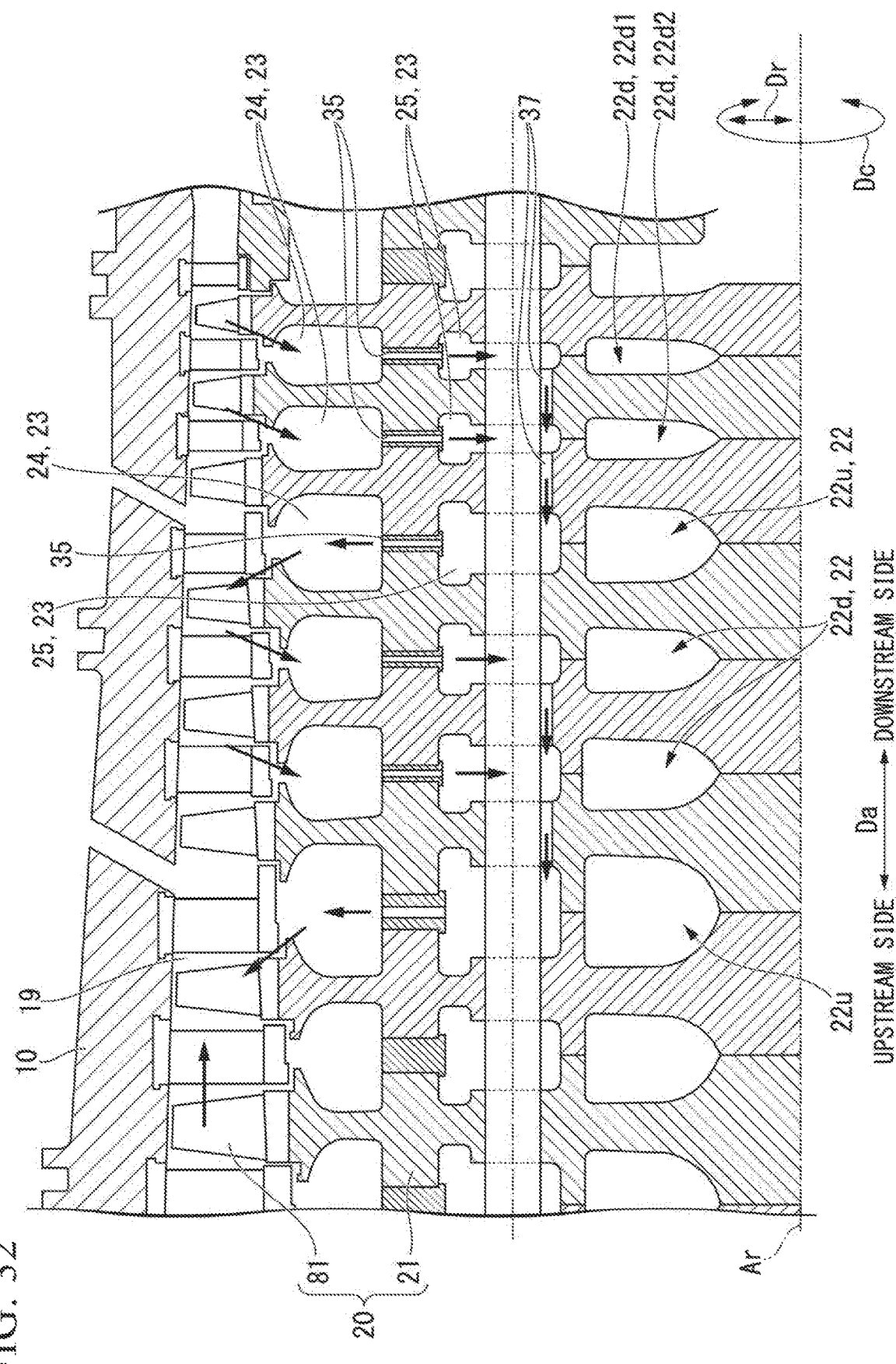
FIG. 32 is a view illustrating a flow of gas inside a compressor in another modified example of the first embodiment according to the present invention.

For example, in the case where three cavity groups 22 adjacent to one another in the axial direction Da make a set, as shown in FIG. 32, of the three cavity groups 22 composing this set, the cavity group 22 located farthest on the upstream side may constitute the upstream-side cavity group 22$u$, and the other two cavity groups 22 may constitute the downstream-side cavity groups 22$d$.

In this case, the intermediate cavities (axial communication cavities) 25 of a first downstream-side cavity group 22$d$1, located on the downstream side, and a second downstream-side cavity group 22$d$2, located on the upstream side, of the two downstream-side cavity groups 22$d$ communicate with each other through the axial flow passages 37, and the intermediate cavities (axial communication cavities) 25 of the second downstream-side cavity group 22$d$2 and the upstream-side cavity group 22$u$ communicate with each other through the axial flow passages 37.

In the case where four cavity groups 22 adjacent to one another in the axial direction Da make a set, of the four cavity groups 22 composing this set, the cavity group 22 located farthest on the upstream side may constitute the upstream-side cavity group, and the other three cavity groups 22 may constitute the downstream-side cavity groups. Alternatively, of the four cavity groups 22 composing this set, two cavity groups 22 located on the upstream side may constitute the upstream-side cavity groups, and the other two cavity groups 22 may constitute the downstream-side cavity groups.

In the case where three or more cavity groups 22 adjacent to one another in the axial direction Da make a set as has been described above, for example, if the air does not flow toward the upstream side through the axial flow passage 37 that provides communication between the axial communication cavities of the cavity group 22 located farthest on the downstream side and the cavity group 22 adjacent thereto in the axial direction Da, the air from the air compression flow passage 19 does not return to the air compression flow passage 19. It is therefore necessary to appropriately determine the flow passage resistance in the flow passages including the axial flow passage 37 so that the air flows through the axial flow passage 37 toward the upstream side.

Although this modified example is a modified example of the first embodiment, the same modifications may be made to the second embodiment and the modified examples thereof.

Other Modified Examples

In all the above embodiments and modified examples, the present invention is applied to the cavity groups 22 from the first cavity group 22 located farthest on the downstream side inside the rotor shaft 21 to the sixth cavity group 22 located on the upstream side. However, the present invention may instead be applied to the cavity groups 22 from the first cavity group 22 located farthest on the downstream side inside the rotor shaft 21 to, for example, an eighth cavity group 22 on the upstream side, or the present invention may be applied to all the cavity groups 22 located on the upstream side from the first cavity group 22 located farthest on the downstream side. Alternatively, for example, the present invention may be applied to the cavity groups 22 from the first cavity group 22 located farthest on the downstream side inside the rotor shaft 21 to the fourth cavity group 22 on the upstream side, or the present invention may be applied to the cavity groups 22 from the first cavity group 22 located farthest on the downstream side inside the rotor shaft 21 to the second cavity group 22 on the upstream side.

In short, the present invention can be applied to a plurality of cavity groups 22 that are adjacent to one another in the axial direction Da and include the first cavity group 22 located farthest on the downstream side inside the rotor shaft 21. Thus, the cavity groups 22 to which the present invention is applied include the first cavity group 22 farthest on the downstream side inside the rotor shaft 21. This is because, in the air compression flow passage 19, the pressure at the position in the axial direction Da at which the first cavity group 22 is present is higher than the pressure at the other positions, and changes in temperature at that position inside the rotor shaft 21 are larger than at the other positions.

Although all the above embodiments and modified examples are the compressor of the gas turbine, the present invention is not limited thereto. Thus, the gas flowing into the compressor in the present invention is not limited to air.

In all the above embodiments and modified examples, part of the air in the compression process flowing through the air compression flow passage 19 of the compressor 1 is introduced into the rotor shaft 21, and the inside of the cavities of the rotor shaft 21 is ventilated with this air. Instead of this method, another method is also conceivable in which outlet air that flows out from the air compression flow passage 19 of the compressor 1 and is present inside the gas turbine casing 9 is introduced into the rotor shaft 21, and the inside of the cavities of the rotor shaft 21 is ventilated with this air. In this method, however, the air of which the pressure has risen to a target pressure and which has flowed out of the air compression flow passage 19 is used to ventilate the inside of the cavities of the rotor shaft 21, a larger amount of energy is consumed to increase the pressure of the air used for ventilation than in the above embodiments and modified examples. Moreover, since the temperature of the air used for ventilation is higher than the temperature of the part of the rotor shaft 21 where the vane rows 11 are provided, the ventilation effect is smaller than in the above embodiments and modified examples. Therefore, again, it is preferable that part of the air in the compression process flowing through the air compression flow passage 19 of the compressor 1 be introduced into the rotor shaft 21, and that the inside of the cavities of the rotor shaft 21 be ventilated with this air, as in the above embodiments and modified examples.

INDUSTRIAL APPLICABILITY

According to one aspect of the present invention, the thermal responsiveness of the rotor shaft to changes in temperature of gas flowing through the gas compression flow passage can be further enhanced.

REFERENCE SIGNS LIST

1 Compressor
2 Combustor
3 Turbine
10 Compressor casing
11 Vane row
12 Vane
19 Air compression flow passage (gas compression flow passage)
20 Compressor rotor
21 Rotor shaft
22 Cavity group
22*d* Downstream-side cavity group
22*u* Upstream-side cavity group
23 Cavity
24 Outer cavity
25 Intermediate cavity (axial communication cavity)
26 Inner cavity (axial communication cavity)
34 Radially outer flow passage
34*d* Inlet flow passage
34*u* Outlet flow passage
35, 35*d*, 35*u* Radially intermediate flow passage
35*di*, 35*ui*, 37*i*, 39*i* Inlet opening
37, 37*a* Axial flow passage
35*do*, 37*o*, 38*do*, 38*uo*, 39*o* Outlet opening
35*dop*, 38*dop*, 38*uop*, 39*op* Outlet-side part
38 Radially inner flow passage
39 Axial flow passage
41 Rotor disc
48 Bolt through-hole
48*s* Gap
51 Spindle bolt
55, 55*d*, 55*u* Torque pin
56, 56*d*, 56*u* Through-hole
81 Blade row
82 Blade

The invention claimed is:

1. A compressor rotor configured to rotate along an axis, the compressor rotor comprising:
    a rotor shaft that extends along the axis in an axial direction, wherein the rotor shaft has a plurality of rotor discs stacked in the axial direction; and
    a plurality of blade rows fixed to an outer circumference of the rotor shaft and arrayed in the axial direction;
    wherein:
    a plurality of cavity groups is defined between the plurality of blade rows along the axial direction, wherein each of the plurality of cavity groups includes a plurality of cavities separated from each other in a radial direction with respect to the axis, and wherein each of the plurality of cavity groups is defined in an annular shape having the axis as a center;
    a gas compression flow passage is located on an outer circumferential side of the rotor shaft where the plurality of blade rows is present in the axial direction, wherein a pressure of gas flowing through the gas compression flow passage is lower at an upstream side of the gas compression flow passage in the axial direction than at a downstream side of the gas compression flow passage in the axial direction opposite to the upstream side of the gas compression flow passage;
    in each of the plurality cavity groups, a first of the plurality of cavities is located farthest on a radially outer side of the rotor shaft and is an outer cavity, and a second of the plurality of cavities is located on a radially inner side of the outer cavity and is an axial communication cavity;

at least a first of the plurality of cavity groups is an upstream-side cavity group located on an upstream side of the plurality of cavity groups, and at least a second of the plurality of cavity groups is a downstream-side cavity group located on a downstream side of the plurality of cavity groups;

wherein the rotor shaft includes:

an inlet flow passage through which the gas flowing among the plurality of blade rows along the axial direction inside the gas compression flow passage flows into the outer cavity of the downstream-side cavity group, wherein the inlet flow passage opens at a position to face the gas compression flow passage;

a downstream-side radial flow passage that extends in the radial direction, and provides communication between the outer cavity of the downstream-side cavity group to the axial communication cavity of the downstream-side cavity group such that the gas which has flowed into the outer cavity of the downstream-side cavity group reaches the axial communication cavity of the downstream-side cavity group;

an axial flow passage that extends in the axial direction, and provides communication between the axial communication cavity of the downstream-side cavity group and the axial communication cavity of the upstream-side cavity group;

an upstream-side radial flow passage that extends in the radial direction, and provides communication between the axial communication cavity of the upstream-side cavity group to the outer cavity of the upstream-side cavity group such that the gas inside the axial communication cavity of the upstream-side cavity group reaches the outer cavity of the upstream-side cavity group;

an outlet flow passage through which the gas inside the outer cavity of the upstream-side cavity group flows out into the gas compression flow passage;

a downstream torque pin that extends in the radial direction and is configured to engage with each of a downstream pair of the plurality of rotor discs adjacent to each other in the axial direction so as to restrain the downstream pair of the plurality of rotor discs from rotating relative to each other, wherein the downstream torque pin is positioned between the plurality of cavities of the downstream-side cavity group, and wherein the downstream torque pin has a through-hole that extends through the downstream torque pin in the radial direction, and the through-hole of the downstream torque pin defines the downstream-side radial flow passage; and an upstream torque pin that extends in the radial direction and is configured to engage with each of an upstream pair of the plurality of rotor discs adjacent to each other in the axial direction so as to restrain the upstream pair of the plurality of rotor discs from rotating relative to each other, wherein the upstream torque pin is positioned between the plurality of cavities of the upstream-side cavity group, and wherein the upstream torque pin has a through-hole that extends through the upstream torque pin in the radial direction, and the through-hole of the upstream torque pin defines the upstream-side radial flow passage;

wherein:

the axial flow passage has an inlet opening to the axial communication cavity of the downstream-side cavity group and an outlet opening to the axial communication cavity of the upstream-side cavity group;

a radially outer-side edge of the inlet opening of the axial flow passage is located on a radially inner side of a radially outer-side inner circumferential surface of a plurality of inner circumferential surfaces defining the axial communication cavity of the downstream-side cavity group; and a radially outer-side edge of the outlet opening of the axial flow passage is located on a radially inner side of a radially outer-side inner circumferential surface of a plurality of inner circumferential surfaces defining the axial communication cavity of the upstream-side cavity group.

2. The compressor rotor according to claim 1, wherein:
the radially outer-side edge of the inlet opening of the axial flow passage is located on the radially inner side of a center position in the radial direction of the axial communication cavity of the downstream-side cavity group; and
the radially outer-side edge of the outlet opening of the axial flow passage is located on the radially inner side of a center position in the radial direction of the axial communication cavity of the upstream-side cavity group.

3. The compressor rotor according to claim 1, wherein:
the axial flow passage is one of a plurality of axial flow passages separated from one another in a circumferential direction around the axis.

4. The compressor rotor according to claim 1, wherein at least one of:
an inlet-side part of the upstream-side radial flow passage includes an inlet opening that is at a radially inner side of the upstream-side radial flow passage and is inclined toward a rotation direction side of the rotor shaft; and
an inlet-side part of the axial flow passage includes an inlet opening that is inclined toward an opposite side from the rotation direction side of the rotor shaft.

5. The compressor rotor according to claim 1, wherein:
the plurality of cavities of the downstream-side cavity group further includes an intermediate cavity;
the downstream-side radial flow passage is a first downstream-side radial flow passage between the outer cavity of the downstream-side cavity group and the intermediate cavity of the downstream-side cavity group;
the rotor shaft further includes a second downstream-side radial flow passage that provides communication between the intermediate cavity of the downstream-side cavity group and the axial communication cavity of the downstream-side cavity group; and
an inlet-side part of the second downstream-side radial flow passage includes an inlet opening that is at a radially outer side of the second downstream-side radial flow passage and is inclined toward an opposite side from a rotation direction side of the rotor shaft.

6. The compressor rotor according to claim 1, wherein:
at least one of a first outlet-side part, a second outlet-side part and a third outlet-side part is inclined toward a rotation direction side of the rotor shaft or toward an opposite side from the rotation direction side of the rotor shaft;
the first outlet-side part is an outlet-side part of the downstream-side radial flow passage including an outlet opening that is at a radially inner side of the downstream-side radial flow passage;

the second outlet-side part is an outlet-side part of the upstream-side radial flow passage including an outlet opening that is at a radially outer side of the upstream-side radial flow passage; and the third outlet-side part is an outlet-side part of the axial flow passage including the outlet opening of the axial flow passage.

7. The compressor rotor according to claim 1, wherein a flow passage inside diameter of the axial flow passage decreases in a direction from the inlet opening of the axial flow passage toward the outlet opening of the axial flow passage.

8. The compressor rotor according to claim 1, further comprising:
- a spindle bolt that extends in the axial direction through the plurality of rotor discs, the axial communication cavity of the downstream-side cavity group, and the axial communication cavity of the upstream-side cavity group;

wherein:
- a bolt through-hole is defined in at least one of the plurality of rotor discs between the axial communication cavity of the downstream-side cavity group and the axial communication cavity of the upstream-side cavity group;
- the spindle bolt extends through the bolt through-hole;
- a gap extends in the axial direction between the spindle bolt and the bolt through-hole; and
- the gap in the bolt through-hole defines the axial flow passage.

9. The compressor rotor according to claim 8, wherein the gap is located on a radially inner side of the spindle bolt.

10. The compressor rotor according to claim 1, wherein at least one of:
- the axial communication cavity of the downstream-side cavity group is located farthest on a radially inner side of the plurality of cavities of the downstream-side cavity group; and
- the axial communication cavity of the upstream-side cavity group is located farthest on a radially inner side of the plurality of cavities of the upstream-side cavity group.

11. The compressor rotor according to claim 1, wherein the upstream-side cavity group and the downstream-side cavity group are adjacent.

12. A compressor comprising:
the compressor rotor according to claim 1; and
a compressor casing;
wherein the compressor rotor is inside the compressor casing.

13. A gas turbine comprising:
the compressor according to claim 12;
a combustor configured to generate combustion gas by combusting fuel in air compressed by the compressor; and
a turbine configured to be driven by the combustion gas.

* * * * *